United States Patent
Tanaka

(10) Patent No.: US 8,629,916 B2
(45) Date of Patent: Jan. 14, 2014

(54) CAMERA WITH IMAGING UNIT AND IMAGING UNIT FOR CAMERA

(75) Inventor: Masahide Tanaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 230 days.

(21) Appl. No.: 13/057,853

(22) PCT Filed: Aug. 19, 2009

(86) PCT No.: PCT/JP2009/064518
§ 371 (c)(1),
(2), (4) Date: Feb. 7, 2011

(87) PCT Pub. No.: WO2010/021342
PCT Pub. Date: Feb. 25, 2010

(65) Prior Publication Data
US 2011/0134293 A1  Jun. 9, 2011

(30) Foreign Application Priority Data

| Aug. 19, 2008 | (JP) | 2008-210455 |
| Aug. 19, 2008 | (JP) | 2008-210456 |
| Sep. 1, 2008 | (JP) | 2008-223077 |
| Sep. 2, 2008 | (JP) | 2008-224964 |
| Mar. 26, 2009 | (JP) | 2009-076335 |
| Mar. 31, 2009 | (JP) | 2009-085838 |

(51) Int. Cl.
*H04N 5/228*  (2006.01)
(52) U.S. Cl.
USPC ........ 348/222.1; 348/294; 348/298; 348/302; 348/308

(58) Field of Classification Search
USPC .............. 348/222.1, 294, 298, 302, 308, 312; 356/5.04, 5.06; 382/104
See application file for complete search history.

(56) References Cited

U.S. PATENT DOCUMENTS

| 4,602,861 | A | 7/1986 | Taniguchi et al. |
| 6,753,984 | B1 | 6/2004 | Wada |
| 7,545,466 | B2 * | 6/2009 | Lee ............................... 349/114 |
| 2001/0019361 | A1 * | 9/2001 | Savoye ......................... 348/222 |
| 2003/0007087 | A1 | 1/2003 | Hakamata et al. |
| 2003/0130562 | A1 | 7/2003 | Barbato et al. |
| 2003/0208125 | A1 * | 11/2003 | Watkins ......................... 600/473 |
| 2004/0057712 | A1 | 3/2004 | Sato et al. |
| 2004/0092794 | A1 | 5/2004 | Chin et al. |

(Continued)

FOREIGN PATENT DOCUMENTS

| CN | 1893562 | 1/2007 |
| CN | 101116186 A | 1/2008 |

(Continued)

OTHER PUBLICATIONS

SIPO of People's Republic of China Patent Office, Office Action in Chinese Patent Application No. 200980132125.7 (dated Sep. 20, 2012) (with English translation ).

*Primary Examiner* — Yogesh Aggarwal
(74) *Attorney, Agent, or Firm* — Fish & Richardson P.C.

(57) ABSTRACT

The camera according to the present invention has an imaging unit, a sensor having a quantum efficiency of 60% or higher in a visible light range for detecting a focal point adjustment state in the imaging unit, and a control unit for outputting a control signal for adjusting the focal point on the imaging unit on the basis of the output from the sensor.

16 Claims, 29 Drawing Sheets

(56) References Cited

U.S. PATENT DOCUMENTS

| | | |
|---|---|---|
| 2005/0124858 A1 | 6/2005 | Matsuzawa et al. |
| 2005/0215859 A1 | 9/2005 | Chin et al. |
| 2006/0017826 A1 | 1/2006 | Sekimoto et al. |
| 2006/0052710 A1 | 3/2006 | Miura et al. |
| 2006/0291847 A1 | 12/2006 | Terada |
| 2007/0019939 A1 | 1/2007 | Takase et al. |
| 2007/0027362 A1 | 2/2007 | Handa et al. |
| 2007/0047939 A1 | 3/2007 | Inoue et al. |
| 2007/0148263 A1 | 6/2007 | Antony |
| 2007/0257998 A1 | 11/2007 | Inoue |
| 2007/0298164 A1 | 12/2007 | Ogata et al. |
| 2008/0067330 A1 | 3/2008 | Yamamoto |
| 2008/0072962 A1 | 3/2008 | Ishizuka et al. |
| 2008/0087800 A1 | 4/2008 | Toda |
| 2008/0111894 A1 | 5/2008 | Tanimoto |
| 2008/0122925 A1 | 5/2008 | Sekimoto et al. |
| 2008/0165248 A1 | 7/2008 | Wang et al. |
| 2008/0187304 A1 | 8/2008 | Hirose |
| 2009/0194150 A1 | 8/2009 | Aoki |
| 2009/0215220 A1 | 8/2009 | Toda |
| 2009/0217969 A1 | 9/2009 | Matsushima et al. |
| 2009/0301558 A1 | 12/2009 | Takaoka et al. |
| 2010/0102368 A1 | 4/2010 | Matsushima et al. |
| 2010/0217045 A1 | 8/2010 | Antony |
| 2010/0261303 A1 | 10/2010 | Ogata et al. |
| 2011/0092603 A1 | 4/2011 | Antony |
| 2012/0220666 A1 | 8/2012 | Antony |

FOREIGN PATENT DOCUMENTS

| | | |
|---|---|---|
| CN | 101179742 A | 5/2008 |
| CN | 101236347 | 8/2008 |
| EP | 1 950 811 | 7/2008 |
| JP | 59-116626 | 7/1984 |
| JP | 63-260526 | 10/1988 |
| JP | 63-289514 | 11/1988 |
| JP | 10-192893 | 7/1998 |
| JP | 10-268186 | 10/1998 |
| JP | 11-253398 | 9/1999 |
| JP | 2000-171682 | 6/2000 |
| JP | 2000-253284 | 9/2000 |
| JP | 2002-051971 | 2/2002 |
| JP | 2003-015024 | 1/2003 |
| JP | 2003-019112 | 1/2003 |
| JP | 2003-116783 | 4/2003 |
| JP | 2004-094050 | 3/2004 |
| JP | 2004-109690 | 4/2004 |
| JP | 2004-228662 | 8/2004 |
| JP | 2004-344258 | 12/2004 |
| JP | 2005-515001 | 5/2005 |
| JP | 2005-253511 | 9/2005 |
| JP | 2006-026234 | 2/2006 |
| JP | 2006-033716 | 2/2006 |
| JP | 2006-505348 | 2/2006 |
| JP | 2006-068488 | 3/2006 |
| JP | 2006/084558 | 3/2006 |
| JP | 2006084558 A * | 3/2006 |
| JP | 2006-099017 | 4/2006 |
| JP | 2006-102481 | 4/2006 |
| JP | 2006/301149 | 11/2006 |
| JP | 2007-021084 | 2/2007 |
| JP | 2007-25569 | 2/2007 |
| JP | 2007-065324 | 3/2007 |
| JP | 2007-075366 | 3/2007 |
| JP | 2007-117192 | 5/2007 |
| JP | 2007-123720 | 5/2007 |
| JP | 2007-123721 | 5/2007 |
| JP | 2007-184840 | 7/2007 |
| JP | 2007-189376 | 7/2007 |
| JP | 2007-201304 | 8/2007 |
| JP | 2007-263563 | 10/2007 |
| JP | 2008-076084 | 4/2008 |
| JP | 2008-078619 | 4/2008 |
| JP | 2008-091753 | 4/2008 |
| JP | 2008-119025 | 5/2008 |
| JP | 2008-514304 | 5/2008 |
| JP | 2008-177738 | 7/2008 |
| JP | 2009-244854 | 10/2009 |
| WO | 2006-064564 | 6/2006 |
| WO | 2008-085644 | 7/2008 |
| WO | 2008/093834 | 8/2008 |

* cited by examiner

CAMERA WITH IMAGING UNIT AND IMAGING UNIT FOR CAMERA

TECHNICAL FIELD

The present invention relates to a camera (a camera capable of live view, an autofocus camera, or an endoscope or the like capable of observing, recording, diagnosing, and otherwise processing images in a body) that uses a photoelectric conversion sensor.

BACKGROUND ART

Photoelectric conversion sensors with various characteristics are constantly being proposed. For example, in Patent Documents 1 and 2 and the like noted below, there are proposals related to photoelectric conversion sensors that use a CIGS thin film.

Patent Documents 3 to 7 are provided as examples of other related art.

PRIOR ART LITERATURE

Patent Document

[Patent Document 1] Japanese Laid-open Patent Application No. 2007-123720
[Patent Document 2] Japanese Laid-open Patent Application No. 2007-123721
[Patent Document 3] Japanese Laid-open Patent Application No. 2004-94050
[Patent Document 4] Japanese Laid-open Patent Application No. 2008-76084
[Patent Document 5] International Publication Pamphlet 2008/093834
[Patent Document 6] Japanese Laid-open Patent Application No. 10-192893
[Patent Document 7] Japanese Laid-open Patent Application No. 2007-117192

SUMMARY OF INVENTION

Technical Problem

However, the various characteristics being considered in photoelectric conversion sensors cannot be said to be sufficiently utilized, and there are many problems that require further research.

An object of the present invention is to provide a camera (a camera capable of live view, an autofocus camera, or an endoscope or the like capable of observing, recording, diagnosing, and otherwise processing images in a body) in which the various characteristics being considered in photoelectric conversion sensors can be adequately utilized.

Solution to Problem

In order to achieve the objects described above, the camera according to the present invention is configured (first aspect) comprising an imaging unit, a sensor having a quantum efficiency of 60% or higher in a visible light range for detecting a focal point adjustment state in the imaging unit, and a control unit for outputting a control signal for adjusting the focal point on the imaging unit on the basis of the output from the sensor.

The camera according to the first aspect is preferably configured (second aspect) so that the sensor has a quantum efficiency of 60% or higher even in an infrared region, and has an infrared cut-off filter for cutting off the incident light of the infrared region.

The camera according to the second aspect is preferably configured (third aspect) so that the infrared cut-off filter can be removed from the optical path of the sensor, and the quantum efficiency of 60% or more in the infrared region of the sensor is used when the infrared cut-off filter is removed.

The camera according to the third aspect is preferably configured (fourth aspect) comprising a visible light cut-off filter that is used in place of the infrared cut-off filter.

The camera according to the first aspect is preferably configured (fifth aspect) comprising an optical finder, an imaging sensor having a quantum efficiency of 60% or higher in the visible light region, optical splitting means for splitting light in the visible light region from a photographic object in order to observe the photographic object by the optical finder and form an image by the imaging sensor, and a display unit for displaying the photographic object for live viewing on the basis of the output of the imaging sensor.

The camera according to the present invention is configured (sixth aspect) comprising an optical finder, an imaging sensor having a quantum efficiency of 60% or higher in a visible light region, optical splitting means for splitting light in the visible light region from a photographic object in order to observe the photographic object by the optical finder and form an image by the imaging sensor, and a display unit for displaying the photographic object for live viewing on the basis of the output of the imaging sensor.

The camera according to the sixth aspect is preferably configured (seventh aspect) comprising a recording imaging unit for forming an image in order to record light in the visible light region from the photographic object.

The camera according to the seventh aspect is preferably configured (eighth aspect) so that light from the photographic object is not incident on the recording imaging unit when the light from the photographic object is incident on the imaging sensor.

The camera according to the sixth aspect is preferably configured (ninth aspect) so that the imaging sensor has a quantum efficiency of 60% or higher even in the infrared region, and the optical splitting means has wavelength selectivity for directing light in the infrared region from the photographic object to the imaging sensor.

The camera according to the sixth aspect is preferably configured (tenth aspect) comprising an infrared cut-off filter for preventing light in the infrared region from being incident on the imaging sensor.

The camera according to the tenth aspect is preferably configured (eleventh aspect) comprising a visible light cut-off filter for preventing light in the visible light region from being incident on the imaging sensor that can be used in place of the infrared cut-off filter.

The camera according to the present invention is configured (twelfth aspect) comprising a lens optical system; an imaging unit for receiving light from the lens optical system, the imaging unit having a wide sensitivity range from the visible light region to infrared; a focal position detection unit for detecting the position of the lens optical system adapted to form a visible light image on the imaging sensor when the imaging unit forms an image in the visible light region, and for detecting the position of the lens optical system adapted to form an infrared light image on the imaging unit when the imaging unit forms an image in the infrared region; and a control unit for switching, in a coordinated manner, the functions of the imaging unit and the functions of the focal position detection unit between forming a visible light image and forming an infrared light image.

The camera according to the twelfth aspect is preferably configured (thirteenth aspect) so that the focal position detection unit comprises a sensor having a wide sensitivity region from the visible light region to infrared, an infrared cut-off filter capable of being inserted into the optical path to the sensor, and a visible light cut-off filter capable of being inserted into the optical path to the sensor; and the control unit inserts the infrared cut-off filter into the optical path to the sensor when the imaging unit forms an image in the visible light region, and inserts the visible light cut-off filter into the optical path to the sensor when the imaging unit forms an image in the infrared region.

The camera according to the twelfth aspect is preferably configured (fourteenth aspect) so that the imaging unit has a quantum efficiency of 60% or higher in the visible light region.

The camera according to the twelfth aspect is preferably configured (fifteenth aspect) so that the sensor of the focal position detection unit has a quantum efficiency of 60% or higher in the visible light region.

The camera according to the twelfth aspect is preferably configured (sixteenth aspect) so that the imaging unit comprises a plurality of photoelectric conversion units arrayed in an orderly fashion, each having a quantum efficiency of 60% or higher in the visible light region; a first color filter provided to each member of a first group selected in an orderly fashion from the plurality of photoelectric conversion units; and a second color filter provided to each member of a second group selected in an orderly fashion from the plurality of photoelectric conversion units, the second color filter having a smaller light-transmitting surface area than the first color filter.

The camera according to the twelfth aspect is preferably configured (seventeenth aspect) so that the imaging unit comprises a plurality of photoelectric conversion units arrayed in an orderly fashion, each having a quantum efficiency of 60% or higher in the visible light region and in the infrared region; a first visible light transmitting color filter provided to each member of a first group selected in an orderly fashion from the plurality of photoelectric conversion units; an infrared light transmitting filter provided to each member of a second group selected in an orderly fashion from the plurality of photoelectric conversion units; and an interpolation unit for adding the data of the second photoelectric conversion units to the output from the photoelectric conversion units of the first group when the visible light data in positions that correspond to the photoelectric conversion units of the second group are interpolated.

The camera according to the twelfth aspect is preferably configured (eighteenth aspect) so that the imaging unit comprises a plurality of photoelectric conversion units arrayed in an orderly fashion, each having a quantum efficiency of 60% or higher in the visible light region and in the infrared region; a green transmitting color filter provided to each member of a first group selected in an orderly fashion from the plurality of photoelectric conversion units; a red transmitting filter provided to each member of a second group selected in an orderly fashion from the plurality of photoelectric conversion units; a blue transmitting filter provided to each member of a third group selected in an orderly fashion from the plurality of photoelectric conversion units; and an infrared light transmitting filter provided to each member of a fourth group selected in an orderly fashion from the plurality of photoelectric conversion units so that the density is less than the second group.

The camera according to the twelfth aspect is preferably configured (nineteenth aspect) so that the imaging unit comprises a plurality of photoelectric conversion units arrayed in an orderly fashion, each having a quantum efficiency of 60% or higher in the visible light region; a first color filter provided to each member of a first group selected in an orderly fashion from the plurality of photoelectric conversion units asymmetrically about some directions; and a second color filter provided to each member of a second group selected in an orderly fashion from the plurality of photoelectric conversion units asymmetrically about all directions.

The camera according to the twelfth aspect is preferably configured (twentieth aspect) so that the imaging unit comprises a plurality of photoelectric conversion units arrayed in an orderly fashion, each having a quantum efficiency of 60% or higher in the visible light region; a first color filter provided to each member of a first group selected in an orderly fashion from the plurality of photoelectric conversion units; a second color filter provided to each member of a second group selected in an orderly fashion from the plurality of photoelectric conversion units; and an interpolation unit for weighting and interpolating the output from the photoelectric conversion units of the first group when the color data of the first color filter in positions that correspond to the photoelectric conversion units of the second group are interpolated.

Advantageous Effects of the Invention

In accordance with the present invention, it is possible to provide a camera (a camera capable of live view, an autofocus camera, or an endoscope or the like capable of observing, recording, diagnosing, and otherwise processing images in a body) in which the various characteristics being considered in photoelectric conversion sensors can be adequately utilized.

DESCRIPTION OF EMBODIMENTS

Embodiment 1

Figure 1:
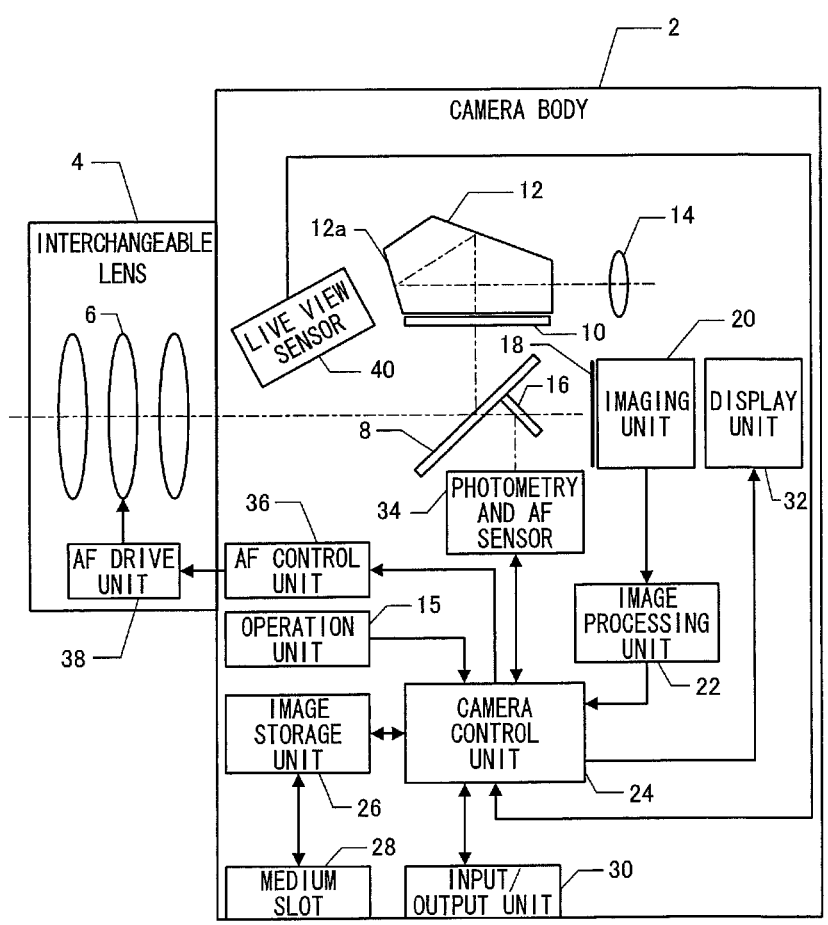
FIG. 1 is a block diagram showing the first embodiment of the present invention (Embodiment 1)

FIG. 1 is a block diagram showing the first embodiment of an autofocus digital single-lens reflex camera according to embodiments of the present invention. The autofocus digital single-lens reflex camera has a camera body 2 and an interchangeable lens 4 interchangeably mounted thereon. Light from a photographic object incident from a lens optical system 6 of the interchangeable lens 4 is reflected upward at a mirror 8 in an observation position and forms an image in the position of a focus plate 10. The image is reflected at a pentaprism 12 and then observed in an eyepiece 14, and the camera composition or the like is adjusted for imaging.

The mirror 8 retracts to an imaging position together with an autofocus sub-mirror 16 when the shutter release button of an operating unit 15 is operated during imaging, a focal plane shutter 18 opens, and light from the photographic object incident from the lens optical system 6 of the interchangeable lens 4 is formed on the recording unit 20 and imaged. The image information imaged by the imaging unit 20 is processed in an image processing unit 22, and then stored in an image storage unit 26 by control of a camera control unit 24. The image information stored in the image storage unit 26 is transferred to a memory card or another storage medium suitably inserted in a medium slot 28. The image information stored in the image storage unit 26 can be suitably transferred from an input/output unit 30 to the exterior. The operator can confirm the captured image because the image information immediately after imaging is sent from the camera control unit 24 to a display unit 32 and automatically displayed.

The image information stored in the image storage unit 26 or the medium slot 28 is read by the camera control unit 24 by operation of the operating unit 15 during image replay, and is displayed on the display unit 32 composed of a liquid crystal or the like provided to the back surface of the camera body 2. The description above pertains to the basic configuration and basic function related to imaging and replay in the autofocus digital single-lens reflex camera of FIG. 1. From the description above, it is apparent that a real-time photographic object observable in the eyepiece 14 is not displayed on the display unit 32 and can only be confirmed after imaging because imaging of a photographic object is not carried out by the imaging unit 20 when the mirror 8 is in the observation position. This point is a special characteristic of a digital single-lens reflex camera and is the point that differs from an ordinary compact digital camera in which the composition can be adjusted while the image of the display unit 32 is being observed.

Described next are the configuration and functions related to autofocus in an autofocus digital single-lens reflex camera of FIG. 1. A portion of the light from a photographic object that incident from the lens optical system 6 of the interchangeable lens 4 passes through a semitransparent section in the center of the mirror 8 in the observation position, is reflected downward by the sub-mirror 16, and directed to a photometry and autofocus (hereinafter referred to as "AF") sensor 34. The photometry and AF sensor 34 reforms the light incident from the sub-mirror 16 into an image on the AF sensor, carries out an analysis, and sends the results to the camera control unit 24. The analysis is carried out by analyzing the offset direction and magnitude of the position in which the image formed by the imaging surface of the imaging unit 20 and the lens optical system 6 by using phase-difference detection or the like as carried out by well-known pupil division, for example. The camera control unit 24 sends to an AF control unit 36 information about the drive distance and direction of the lens optical system 6 for eliminating displacement of the image formation position, on the basis of information about the displacement direction and magnitude of the image formation position produced by the lens optical system 6 and obtained from the photometry and AF sensor 34. An AF drive unit 38 carries out auto-focusing by driving the lens optical system 6 on the basis of the drive distance and drive direction information transmitted from the AF control unit 36 by a mechanical and electrical interface between the camera body 2 and the interchangeable lens 4. The details of the configuration of the photometry and AF sensor 34 are described below.

A live view sensor 40 provides a "live view" function in a digital single-lens reflex camera in which the composition can be adjusted while an image on the display unit 32 is observed in the same manner as an ordinary compact digital camera. The entire reflective surface 12a of the pentaprism 12 is semitransparent, and the live view sensor 40 is capable of imaging the entire image of the focus plate 10 by reforming the image of the focus plate 10 on a CIGS imaging sensor. The CIGS imaging sensor is a light sensor composed of copper (Cu), indium (In), gallium (Ga), and selenium (Se); a detailed description is provided hereinbelow.

The reflective surface 12a of the pentaprism 12 has spectral transmission characteristics in which substantially all light is transmitted except for light in the visible light region, and in the visible light region, most of the light is reflected except for a small amount of light that is transmitted. The image essentially never darkens when the image on the focus plate 10 is observed with the eyepiece 14. The image of the focus plate 10 in the visible light region can be sufficiently imaged even when the light transmittance of the reflective surface 12a is at a low level in the visible light region because the CIGS image sensor used in the live view sensor 40 has high sensitivity in the visible light region as described below. When the distribution of visible light to the live view sensor 40 has reached a level of darkness at which it is difficult to optically observe the photographic object through the eyepiece 14, imaging for live viewing using the CIGS imaging sensor is also set to a level at which quantity of light is insufficient. The live view sensor 40 in which the CIGS imaging sensor is used is described in detail hereinbelow. The image captured by the live view sensor 40 is sent to the camera control unit 24 and displayed on the display unit 32. Therefore, as long as the photographic object is of ordinary brightness, the autofocus digital single-lens reflex camera of FIG. 1 allows composing to be performed while the image of the display unit 32 is being observed, in the same manner as an ordinary compact digital camera.

Figure 2:
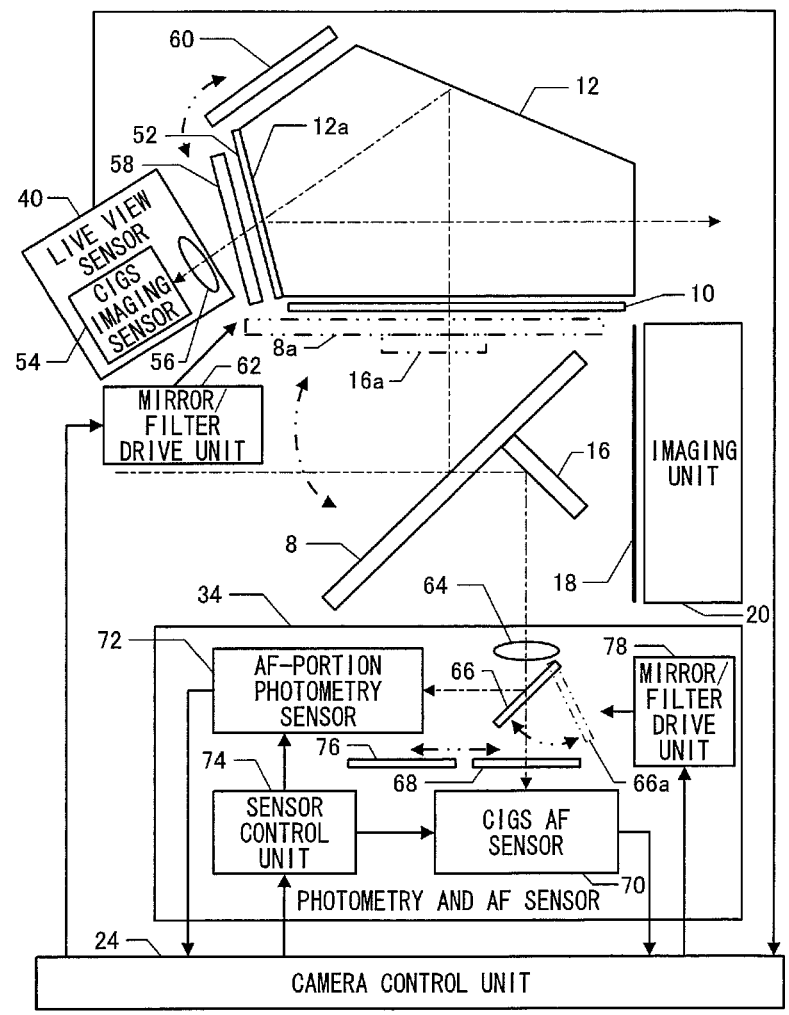
FIG. 2 is a block diagram showing in detail the configuration of the photometry and AF sensor and live view sensor of FIG. 1 and related portions.

FIG. 2 is a block diagram showing in detail the configuration of the photometry and AF sensor 34, the live view sensor 40, and portions related thereto in the first embodiment of the autofocus digital single-lens reflex camera of FIG. 1. As noted above, the reflective surface 12a of the pentaprism 12 has spectral transmission characteristics in which substantially all light is transmitted except for light in the visible light region, and in the visible light region, most of the light is reflected except for a small amount of light that is transmitted. In order to achieve such spectral transmission characteristics, a multilayer film 52 is applied to the reflective surface 12a.

The live view sensor 40 is provided with an image reforming lens 56 for reforming an image on the imaging surface of the CIGS imaging sensor 54 by using the luminous flux from the focus plate 10 and transmitted by the multilayer film 52. An infrared cut-off filter 58 substantially cuts off light outside of the visible light region that has been transmitted through the multilayer film 52, and approximates the wavelength sensitivity characteristics of the CIGS imaging sensor 54 to the wavelength sensitivity characteristics of the imaging unit 20. A photographic object matched to visual sensitivity is imaged and sent to the camera control unit 24, making live viewing possible on the display unit 32 of FIG. 1. The term "infrared light" as used in the present invention mainly refers to infrared rays relatively near to visible light, which is referred to as "near infrared," but since agreement on a definition thereof has yet to be reached by the relevant academic authorities, the term "infrared light" will be used hereinbelow.

The live view sensor 40 is capable of full-screen photometry, whereby the brightness on the focus plate 10 is measured. In other words, the image information outputted from the CIGS imaging sensor 54 is processed by the camera control unit 24 as photometric information for the entire screen, and is combined and processed with the output of the AF-portion photometry sensor 72 as required. Automatic exposure control is carried out for controlling the aperture diameter of the interchangeable lens 4, the shutter speed of the focal plane shutter 18, and sensitivity or the like of the imaging unit 20 on the basis of these processing results.

A visible light cut-off filter 60 is inserted into the optical path to the CIGS imaging sensor 54 in place of the infrared cut-off filter 58, and is used in the "long-wavelength mode." Since almost all light is transmitted through the multilayer film 52 except for light in the visible light region, light in wavelength regions having a greater wavelength than visible light is incident on the CIGS imaging sensor 54 when the visible light cut-off filter 60 has been inserted into the optical path in place of the infrared cut-off filter 58 in the long-wavelength mode setting. The CIGS imaging sensor 54 has a spectral sensitivity that extends to 1300 nm on the long-wavelength side, as described below. Therefore, by inserting the visible light cut-off filter 60, the live view sensor 40 becomes an imaging sensor advantageous for imaging with light in these long-wavelength regions. Image output in such long-wavelength regions can be observed in real time on the display unit 32 and recorded in the image storage unit 26.

A mirror/filter drive unit 62 drives the switching action between the visible light cut-off filter 60 and the infrared cut-off filter 58 under the control of the camera control unit 24 in response to the mode switching by the operating unit 15. In FIG. 2, a mirror 8a and a sub-mirror 16a retracted to the imaging position are indicated by a two-dot chain line, and the driving of the mirror 8 and the sub-mirror 16 between the observation position and the imaging position is carried out by the mirror/filter drive unit 62 under the control of the camera control unit 24.

An image reforming lens 64 of the photometry and AF sensor 34 reforms the image of the photographic object light that has entered from the interchangeable lens 4, transmitted through a semitransparent portion in the center of the mirror 8 in the observation position, and reflected downward at the sub-mirror 16. The luminous flux from the image reforming lens 64 passes through a movable semitransparent mirror 66 and an infrared light cut-off filter 68 that do not have wavelength selectivity, and is formed into an image on a CIGSAF sensor 70. The CIGSAF sensor has high sensitivity in the visible light region as described below, and autofocus detection is possible without auxiliary light, even with a dark photographic object. The infrared light cut-off filter 68 cuts off light having a wavelength in the harmful infrared region in order to cause the CIGSAF sensor 70 to act as an AF sensor, and the characteristics are not necessarily the same as the infrared cut-off filter 58 for the CIGS imaging sensor 54. For example, the infrared light cut-off filter 68 is set to narrower transmission spectral characteristics than the infrared cut-off filter 58.

Accordingly, the movable semitransparent mirror 66 is inserted in the position shown in the drawing in order to dim the light when the photographic object has ordinary brightness, the quantity of light incident on the CIGSAF sensor 70 is matched to the dynamic range of sensitivity of the CIGSAF sensor 70. On the other hand, when the photographic object has reached a level of darkness that requires an auxiliary light using an ordinary AF sensor, the movable semitransparent mirror is retracted to the position of 66a and an image of the photographic object is formed on the CIGSAF sensor 70 without the light being dimmed. At this point, the length of the optical path must be compensated for depending on the presence of the movable semitransparent mirror 66. For example, when the movable semitransparent mirror 66 is retracted, a completely transparent parallel flat plate having an optical path that is equal length to that of the movable semitransparent mirror is substituted into the optical path. Naturally, photometry by the AF-portion photometry sensor 72 is no longer possible in the state in which the movable semitransparent mirror 66 has been retracted to the position of 66a.

When the movable semitransparent mirror 66 is inserted into the image reformation optical path in order to dim the light to the CIGSAF sensor 70, the light reflected thereby is incident on the AF-portion photometry sensor 72. The AF-portion photometry sensor 72 measures the brightness of the portion in which focus detection is being carried out by the CIGSAF sensor 70, and the brightness of the portion of the entire screen that is the object of focus detection is selectively measured and thereby used as information for controlling automatic exposure so that the portion of greatest interest in the photograph is appropriately exposed. Thus, the reduced portion of light entering the CIGSAF sensor 70, which is excessive when the photographic object is bright, is not discarded, but is instead efficiently used as photometric information.

The partial photometric information from the AF-portion photometry sensor 72 is combined with the photometric information related to the entire screen and obtained from the CIGS imaging sensor 54 of the live view sensor 40, is processed by the camera control unit 24, and is ultimately used for controlling the aperture diameter of the interchangeable lens 4, the shutter speed of the focal plane shutter 18, and sensitivity or the like of the imaging unit 20.

A sensor control unit 74 controls autofocus adjustments by controlling the integral light-receiving time of the CIGSAF sensor 70, the gain control, and the like, in the case that the movable semitransparent mirror 66 has been inserted or has been retracted. The information as to whether the movable semitransparent mirror 66 has been inserted or retracted is also used in order to control integral light-receiving time, gain control, and the like. The sensor control unit 74 issues instructions to the CIGSAF sensor 70 and the AF-portion photometry sensor 72, carries out control for bringing about conformity between the portion of the entire screen that is the target of focus detection and the portion in which light is to be selectively measured, and causes corresponding focus detection information and photometric information to be outputted to the camera control unit 24.

On the other hand, in the case that the live view sensor 40 has been set to the "long-wavelength mode" and the visible light cut-off filter 60 has been inserted into the optical path in place of the infrared cut-off filter 58 in the optical path from the multilayer film 52 to the CIGS imaging sensor 54, a corresponding filter is replaced in the photometry and AF sensor 34 as well. Specifically, in the case of the "long-wavelength mode," the infrared light cut-off filter 68 is replaced by a visible light cut-off filter 76 with the movable semitransparent mirror 66 having been retracted. Focus detection for imaging in the long-wavelength region by the CIGS imaging sensor 54 is thereby carried out by the CIGSAF sensor 70 without dimming. At this point, not only is the wavelength sensitivity adjusted, but compensation is also made for changes in the length of the optical path due to a different wavelength, for differences in chromatic aberration during focus detection, and for other reasons.

The movement of the movable semitransparent mirror 66 and replacement of infrared light cut-off filter 68 and the visible light cut-off filter 76 described above are carried out by a mirror/filter drive unit 78 under the control of the camera control unit 24 based on the mode switching operation of the operating unit 15.

The first embodiment of FIGS. 1 and 2 provides a "combined AF function" in addition to basic functions such as those described above. When the "combined AF function" is selected by operation of the operating unit 15, the live view function is stopped and the "combined AF function" is started. Specifically, when the "combined AF function" is selected by operation of the operating unit 15, the camera control unit 24 instructs the mirror/filter drive unit 62 to set the visible light cut-off filter 60 in the optical path to the CIGS imaging sensor 54 in place of the infrared cut-off filter 58, and live view display on the display unit 32 based on the output of the CIGS imaging sensor 54 is stopped.

In lieu of the above, the image signals of the CIGS imaging sensor 54, which has been set in a long-wavelength sensitivity region by the visible light cut-off filter 60 are combined with the output of the CIGSAF sensor, which has been set in a visible light sensitivity region by the infrared light cut-off filter 68, and the "combined AF function" is carried out. Specifically, analysis of the image of the photographic object is carried out by image processing on the basis of the image signals of the CIGS imaging sensor 54, and the focus detection region for the CIGSAF sensor 70 is determined based on the results.

Figure 3:
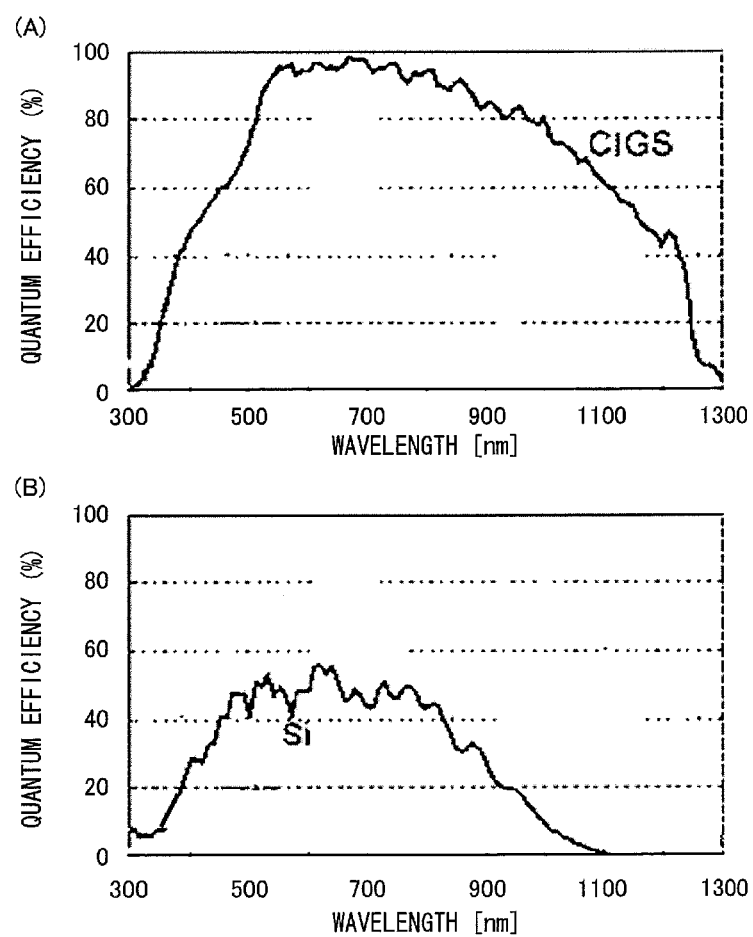
FIG. 3 is a graph comparing the spectral sensitivity of a silicon CMOS sensor and the CIGS sensor used in the CIGS imaging sensor and the CIGSAF sensor of FIG. 2.

FIG. 3 shows a comparison of the spectral sensitivity (quantum efficiency) of a silicon CMOS sensor and the CIGS sensor used in the CIGS imaging sensor 54 and the CIGSAF sensor 70 of FIG. 2. FIG. 3(A) shows the quantum efficiency (%) of the CIGS sensor at each wavelength, and clearly shows high sensitivity and a wide band in comparison with the same quantum efficiency (%) for the silicon CMOS sensor in FIG. 3(B). Specifically, the CIGS sensor of FIG. 3(A) has a large sensitivity range that extends to a wavelength of nearly 1300 nm. The graph also shows that the CIGS sensor has a spectral sensitivity that exceeds 50% in terms of quantum efficiency across a large wavelength region from the vicinity of 400 nm to the vicinity of 1200 nm, and that the quantum efficiency is particularly high in the visible light region and the adjacent infrared region. The high sensitivity and wideband spectral sensitivity characteristics having a quantum efficiency of 60% or higher in the visible light region and the infrared region cannot be expected in a silicon CMOS sensor such as that shown in FIG. 3(B).

Figure 4:
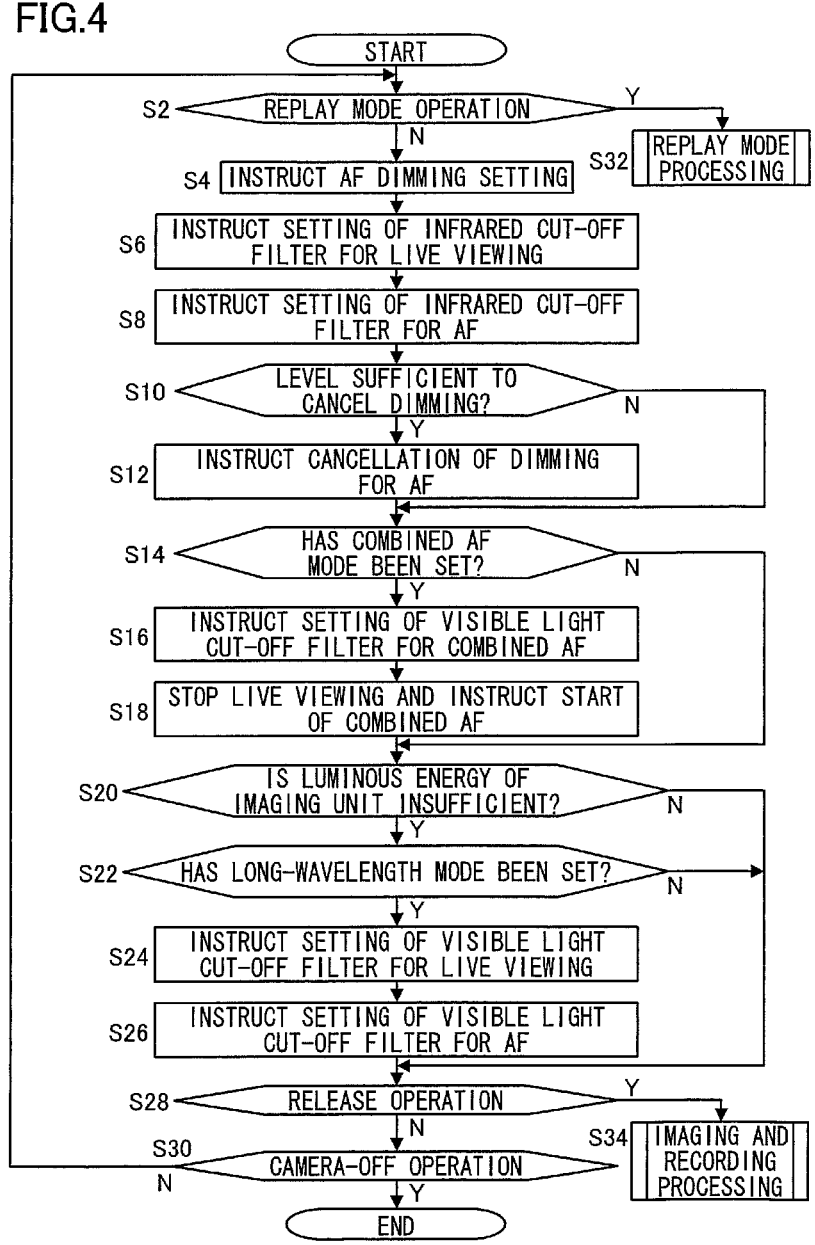
FIG. 4 is a flowchart of the operation of the camera control unit in the first embodiment.

FIG. 4 is a flowchart of the operation of the camera control unit 24 in the first embodiment of FIGS. 1 and 2. The flow starts when the camera main switch is switched on by the operating unit 15, and in step S2, a check is made to determine whether the autofocus digital single-lens reflex camera has been set in the replay mode by the operating unit 15. If the replay mode is not detected, the camera is in the imaging mode and the process therefore proceeds to step S4. The movable semitransparent mirror 66 is set in the optical path to the CIGSAF sensor 70 and the mirror/filter drive unit 78 is instructed to dim the quantity of incident light.

A delay interval is provided by the mirror/filter drive unit 78 for the mechanical execution of the movable semitransparent mirror 66 setting in response to the instruction of step S4. For example, in the state in which the movable semitransparent mirror 66 has been set in the optical path to the CIGSAF sensor 70, the mirror/filter drive unit 78 does not actually carry out the driving of the movable semitransparent mirror 66 and the state in which the movable semitransparent mirror 66 is set in the optical path is maintained for the case in which an instruction to cancel dimming in which the movable semitransparent mirror 66 is to be retracted from the optical path has been issued, and during the delay interval thereafter, an instruction is subsequently issued for setting the movable semitransparent mirror 66 into the optical path as a cancellation of the preceding instruction. In other words, the mirror/filter drive unit 78 drives the movable semitransparent mirror 66 only after the instruction to drive the movable semitransparent mirror 66 to a different state has been repeated within the delay interval. When the instruction of step S4 has been issued in a state in which the movable semitransparent mirror 66 has already be set in the optical path of the CIGSAF sensor 70, the mirror/filter drive unit 78 will naturally not carry out any driving of the movable semitransparent mirror 66. The above applies to various "instructions" in the steps described below.

The process next proceeds to step S6 and the mirror/filter drive unit 62 is instructed to set the infrared cut-off filter 58 for live viewing in the optical path to the CIGS imaging sensor 54. A delay interval is also provided to the execution of driving instructions in relation to the mirror switching operations of the mirror/filter drive unit 62 in the same manner as described for mirror/filter drive unit 78.

Next, in step S8, the mirror/filter drive unit 78 is instructed to set the infrared light cut-off filter 68 for AF in the optical path to the CIGSAF sensor 70. The process then proceeds to step S10 and a check is made to determine whether the photographic object is dark enough to cancel dimming on the basis of the output of the CIGSAF sensor 70. In such instances, the process proceeds to step S12, an instruction is issued to cancel dimming and to retract the movable semitransparent mirror 66 from the optical path, and the process proceeds to step S14. On the other hand, in the case that the photographic object is sufficiently bright, the process proceeds directly to step S14.

In step S14, a check is made to determine whether the "combined AF function" has been selected by the operating unit 15. If such is the case, the process proceeds to step S16, and the mirror/filter drive unit 62 is instructed to set the visible light cut-off filter 60 in the optical path to the CIGS imaging sensor 54 in place of the infrared cut-off filter 58 in order to perform combined AF. In step S18, an instruction is issued to stop live view display on the display unit 32 based on the output of the CIGS imaging sensor 54 and to start the "combined AF function" combining the image signals of the CIGS imaging sensor 54, which has been set in the long-wavelength sensitivity region, with the output of the CIGSAF sensor 70, which has been set in a visible light sensitivity region. The process then proceeds to step S20. On the other hand, in the case that selection of the "AF mode" is not detected in step S14, the process proceeds directly to step S20.

In step S20, a check is made to determine whether the image produced by the imaging unit 20 is sufficiently dark to constitute a light quantity deficiency. Ordinarily, when the photographic object darkens to such a level, photography requires the use of a flash or another auxiliary light. When light quantity is detected to be insufficient in step S20, the process proceeds to step S22, and a check is made to determine whether the "long-wavelength mode" has been selected by operation of the operating unit 15. If such is the case, the process proceeds to step S24, and the mirror/filter drive unit 62 is instructed to set the visible light cut-off filter 60 for live viewing in the optical path to the CIGS imaging sensor 54 in place of the infrared cut-off filter 58. In step S26, the mirror/filter drive unit 78 is instructed to set the visible light cut-off filter 76 for AF in the optical path to the CIGSAF sensor 70 in place of the infrared light cut-off filter 68, and the process proceeds to step S28.

On the other hand, the process proceeds directly to step S28 in the case that the light quantity of the imaging unit 20 is not detected to be insufficient in step S20. Thus, in the case that it is not dark enough to constitute a light quantity deficiency in the imaging unit 20, the process will not normally be able to proceed to step S22 and the "long-wavelength mode" will be disabled. This prevents any conflict in settings. However, it is possible for the process to proceed to step S22 by special operation of the operating unit 15 in the case that the "long-wavelength mode" in particular is desired even when the photographic object is bright. The process proceeds directly to step S28 in the case that the "long-wavelength mode" setting is not detected in step S22.

In step S28, a check is made to determine whether a release operation has been carried out using the shutter release button of the operating unit 15. If a shutter operation cannot be detected, the process proceeds to step S30, and a check is made to determine whether an operation has been carried out using the operating unit 15 to switch off the main switch of the camera. If a camera-off operation is not detected, the flow returns to step S2, and steps S2 to S30 are repeated until the replay mode operation is detected in step S2 or as long as the release operation is not detected in step S28.

The above is repeated at sufficiently high speed and for several cycles within the delay interval provided to the mirror/filter drive units 62, 78 described above. Therefore, when the detection results change on the basis of steps S10, S14, S20, and S22, the same instructions are repeated on the basis of these changes within the delay interval of the mirror/filter drive units 62, 78, and suitable instructions are carried out by the mirror/filter drive units 62, 78. This makes it possible to smoothly carry out setting/cancellation of dimming and switching of the wavelength region cut-off filter on the basis of changes in the brightness of the photographic object, as well as switching of the wavelength region cut-off filter on the basis of mode switching.

When the replay-mode-setting operation by the operating unit 15 has been detected in step S2, the process proceeds to the replay mode processing of step S32. When the imaging mode has been selected by a function within the replay mode processing, the flow returns to step S4. The flow ends when a camera-off operation has been detected by a function within the replay mode processing.

On the other hand, when a release operation by the operating unit 15 using the shutter release button has been detected in step S28, the process proceeds to the imaging and recording processing performed in step S34. The flow automatically returns to step S2 upon the conclusion of image recording and displaying of the imaging results on the display unit. The flow of FIG. 4 ends when a camera-off operation has been detected in step S30.

Embodiment 2

Figure 5:
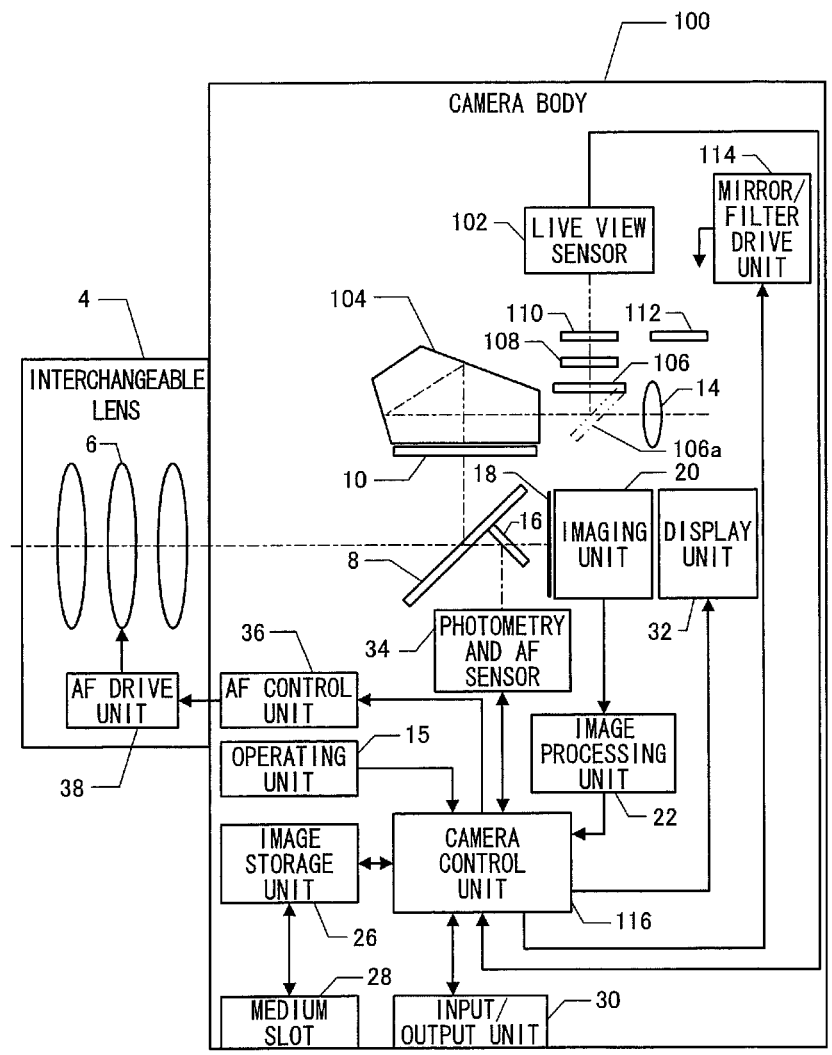
FIG. 5 is a block diagram showing the second embodiment of the present invention (Embodiment 2)

FIG. 5 is a block diagram showing the second embodiment of the autofocus digital single-lens reflex camera according to the embodiments of the present invention. Most of the configuration is the same as that of the first embodiment of FIG. 1, and the same reference numerals are therefore used for the same portions and a description thereof is omitted unless particularly required. The difference between the second embodiment of FIG. 5 and the first embodiment of FIG. 1 is the camera body 100, and more particularly, the live view sensor 102 and the configuration and functions related thereto are different from the first embodiment.

The live view sensor 40 of the first embodiment is configured to receive light via the semitransparent reflective surface 12a, and light in the visible light region that passes through the reflective surface 12a is reduced. This configuration is intended to allow a photographic object to be optically observed in an unobstructed manner and to allow constant simultaneous live viewing using the eyepiece 14. Since a CIGS imaging sensor is used as the live view sensor 40, the level of light is sufficient for live viewing of a photographic object with ordinary brightness, even if light in the visible light region that passes through the reflective surface 12a is reduced. Nevertheless, the quantity of light is insufficient even in the live view sensor 40 in the case of a dark photographic object that cannot be sufficiently observed using the eyepiece 14. In response whereto, the second embodiment of FIG. 5 is configured so that live viewing is possible using the CIGS imaging sensor used as the live view sensor 102, even in the case of a dark photographic object that cannot be sufficiently observed using the eyepiece 14. The detailed structure of the live view sensor 102 of FIG. 5 is substantially the same as the live view sensor 40 in FIG. 2, and has an image reforming optical system and a CIGS imaging sensor. However, since the arrangement location of the live view sensor 102 is different in relation to the pentaprism 104, the image reforming optical system is different from the image reforming lens 56 of FIG. 2.

In view of the above, an ordinary pentaprism 104 is used in the second embodiment, and all the light from the pentaprism 104 is directed to the eyepiece in the case that the camera is not set in the live view mode. At this point, a movable total reflection mirror 106 is retracted from the optical path to the eyepiece 14 as shown in FIG. 5. Therefore, live viewing is not possible in this state.

When the live view mode is selected by operation of the operating unit 15, the total reflection mirror is lowered to the position of 106a and all the light from the pentaprism 104 is reflected in the direction of the live view sensor 102. Therefore, observation of an optical finder image is no longer possible using the eyepiece 14. A moveable dimming filter 108 is inserted into the optical path to the live view sensor 102 as shown in FIG. 5 when the photographic object has ordinary brightness, and the quantity of light incident on the live view sensor 102 is matched to the dynamic range of sensitivity of the CIGS imaging sensor. On the other hand, when the photographic object has darkened to a point at which observation is difficult using the eyepiece 14, the moveable dimming filter 108 is retracted from the optical path to the live view sensor 102, and the photographic object image is directed to the live view sensor 102 without dimming. At this point, the length of the optical path must be compensated for depending on the presence of the moveable dimming filter 108. For example, when the moveable dimming filter 108 is retracted, a completely transparent parallel flat plate having an optical path that has the same length as that of the moveable dimming filter is substituted into the optical path. In this manner, live viewing using the CIGS imaging sensor is made possible in the case of the second embodiment of FIG. 5, even when the photographic object is sufficiently dark to make optical view difficult. Not only can the image in the visible light region from the live view sensor 102 be viewed in the display unit 32, the image can also be recorded in the image storage unit 26.

An infrared light cut-off filter 110 cuts off light outside of the visible light region that has been reflected from a movable total reflection mirror 106a in the live view mode, and approximates the wavelength sensitivity characteristics of the CIGS imaging sensor to the wavelength sensitivity characteristics of the imaging unit 20. A photographic object matched to visual sensitivity is imaged and sent to the camera control unit 116, making natural live viewing possible.

A visible light cut-off filter 112 is inserted into the optical path to the live view sensor 102 in place of the infrared light cut-off filter 110, and is used in the "long-wavelength mode." Since the movable total reflection mirror 106a reflects substantially all light including light outside the visible light region, light in wavelength regions having a greater wavelength than visible light is incident on the CIGS imaging sensor of the live view sensor 102 when the visible light cut-off filter 112 has been inserted into the optical path to the live view sensor 102 in place of the infrared light cut-off filter 110 in the long-wavelength mode setting. Therefore, the image output for an image in the long-wavelength region can be observed in real time on the display unit 32 and recorded in the image storage unit 26 in the same manner as the first embodiment. In the long-wavelength mode using the visible light cut-off filter 112, the moveable dimming filter 108 is retracted from the optical path to the live view sensor 102. The driving of the total reflection mirror 106, the moveable dimming filter 108, the infrared light cut-off filter 110, and the visible light cut-off filter 112 is carried out by a mirror/filter drive unit 114 under the control of the camera control unit 116.

Figure 6:
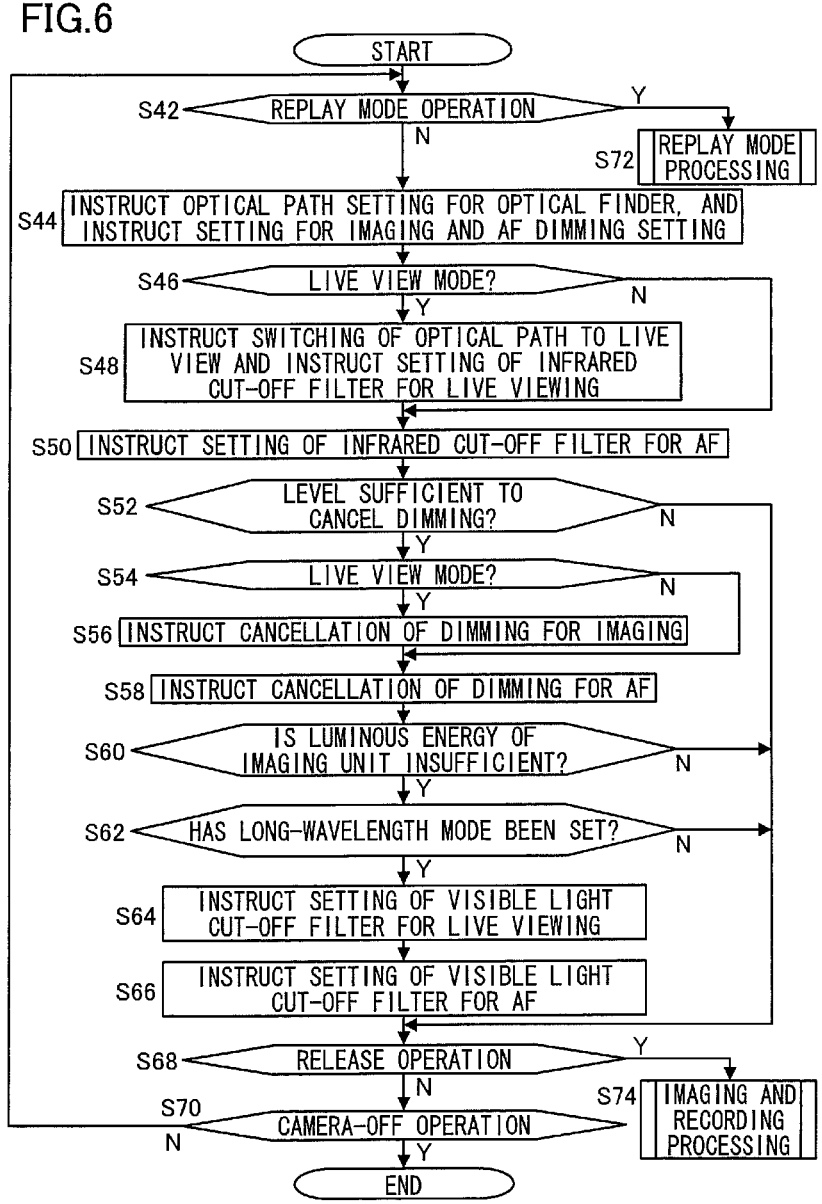
FIG. 6 is a flowchart of the operation of the camera control unit in the second embodiment.

FIG. 6 is a flowchart of the operation of the camera control unit 116 in the second embodiment of FIG. 5. In the same manner as the first embodiment, the flow starts when the camera main switch is switched on by the operating unit 15, and in step S42, a check is made to determine whether the autofocus digital single-lens reflex camera has been set in the replay mode by the operating unit 15. If the replay mode is not detected, the camera is in the imaging mode. The process therefore proceeds to step S44 and instruction is issued for setting the optical path optical finder. Specifically, the mirror/filter drive unit 114 is instructed to retract the total reflection mirror 106 from the optical path to the eyepiece 14. Furthermore, in step S44, the mirror/filter drive unit 114 is instructed to insert the moveable dimming filter 108 into the optical path to the live view sensor 102 to dim the quantity of incident light, and the mirror/filter drive unit 78 is instructed to set the movable semitransparent mirror 66 in FIG. 2 in the optical path to the CIGSAF sensor 70 to dim the quantity of incident light.

Next, the process proceeds to step S46, and a check is made to determine whether the "live view mode" has been set by the operating unit 15. If such is the case, the process proceeds to step S48 and an instruction is issued to switch the optical path to live viewing. Specifically, the mirror/filter drive unit 114 is instructed to move the total reflection mirror 106 into the optical path to the eyepiece 14, and the process proceeds to step S50. When this instruction is carried out, the finder image can no longer be optically observed from the eyepiece 14, but in lieu thereof, live viewing is made possible using the display unit 32 on the basis of the output of the live view sensor 102. Furthermore, in step S48, the mirror/filter drive unit 114 is instructed to set the infrared light cut-off filter 110 for live viewing in the optical path of the live view sensor 102. A delay interval is also provided to driving execution by the mirror/filter drive unit 114 in response to the instruction in the same manner as described in the first embodiment. On the other hand, the process proceeds to step S50 in the case that setting in the "live view mode" is not detected in step S46.

In step S50, the mirror/filter drive unit 78 is instructed to set the infrared light cut-off filter 68 for AF in the optical path to the CIGSAF sensor 70. The process proceeds to step S52, and a check is made to determine whether the photographic object is sufficiently dark to cancel dimming on the basis of the output of the CIGSAF sensor 70. If such is the case, the process proceeds to step S54, and a check is made to determine whether the "live view mode" has been set by the operating unit 15. In such is the case, the process proceeds to step S56, an instruction is issued to cancel dimming and to retract the moveable dimming filter 108 from the optical path to the live view sensor 102, and the process proceeds to step S58. The process proceeds directly to step S58 if the "live view mode" setting is not detected in step S54. In step S58, an instruction is issued to retract the movable semitransparent mirror 66 from the optical path to the CIGSAF sensor 70 to cancel dimming for AF. In this manner, dimming for AF is cancelled regardless of the "live view mode" setting in the case that the photographic object has been detected to be dark in step S52.

Next, in step S60, a check is made to determine whether the image produced by the imaging unit 20 is sufficiently dark to constitute a light quantity deficiency. If such is the case, the process proceeds to step S62, and a check is made to determine whether the long-wavelength mode has been selected by operation of the operating unit 15. If such is the case, the process proceeds to step S64, and the mirror/filter drive unit 114 is instructed to set the visible light cut-off filter 112 for live viewing in the optical path to the live view sensor 102 in place of the infrared light cut-off filter 110. Furthermore, in step S66, the mirror/filter drive unit 78 is instructed to set the visible light cut-off filter 76 for AF in the optical path to the CIGSAF sensor 70 in place of the infrared light cut-off filter 68.

Having passed through the steps described above, the flow proceeds to step S68. On the other hand, the process proceeds directly to step S68 in the case that the photographic object has not been detected to be sufficiently dark to require cancellation of dimming in step S52; in the case that the photographic object has not been detected in step S60 to be sufficiently dark such that the image produced by the imaging unit 20 has an insufficient quantity of light; and in the case that selection of the long-wavelength mode has not been detected in step S62.

In step S68, a check is made to determine whether a release operation has been carried out using the shutter release button of the operating unit 15. If a shutter operation cannot be detected, the process proceeds to step S70, and a check is made to determine whether an operation has been carried out using the operating unit 15 to switch off the main switch of the camera. If a camera-off operation is not detected, the flow returns to step S42, and steps S42 to S70 are repeated until the replay mode operation is detected in step S42 or as long as the release operation is not detected in step S68.

In the same manner as the first embodiment, the above is repeated at sufficiently high speed, and is repeated several cycles within the delay interval provided to the mirror/filter drive units 78, 114 described above. Therefore, when the detection results change on the basis of steps S46, S52, S54, S60, and S62, the same instructions are repeated on the basis of these changes within the delay interval of the mirror/filter drive units 78, 114, and suitable instructions are carried out by the mirror/filter drive units 78, 114. This will make it possible to smoothly carry out setting/cancellation of dimming and switching of the wavelength region cut-off filter on the basis of changes in the brightness of the photographic object, as well as switching of the wavelength region cut-off filter on the basis of mode switching.

When the replay-mode-setting operation performed by the operating unit 15 has been detected in step S42, the process proceeds to the replay mode processing performed in step S72 in the same manner as the first embodiment. When the imaging mode has been selected by a function within the replay mode processing, the flow returns to step S44. The flow ends when a camera-off operation has been detected by a function within the replay mode processing.

When a release operation by the operating unit 15 using the shutter release button has been detected in step S68, the process proceeds to the imaging and recording processing performed in step S74. The flow automatically returns to step S42 upon the conclusion of image recording and displaying of the imaging results on the display unit. The flow of FIG. 6 ends when a camera-off operation has been detected in step S70.

The various characteristics of the present invention described above can be widely used without limitation to the embodiments. For example, in the first embodiment, the "combined AF function" was described as being carried out by combining the output of the CIGS imaging sensor 54, which has sensitivity in the long-wavelength region due to the visible light cut-off filter 60, and the CIGSAF sensor 70, which has sensitivity to visible light due to the infrared light cut-off filter 68. However, the implementation of the "combined AF function" is not limited to such a configuration. For example, the movable semitransparent mirror 66 of FIG. 2, which does not have wavelength selectivity, may be composed of a dichroic mirror; visible light may be allowed to pass and be directed onto the CIGSAF sensor 70; and the long-wavelength region may be reflected and directed to the AF-portion photometry sensor 72. A CIGS sensor may be used as the AF-portion photometry sensor 72 as well. In such a case, the infrared light cut-off filter 68 is not required.

With the configuration described above, it is possible to estimate the location in which a person is present in the AF portion using the AF-portion photometry sensor 72, which has sensitivity in the long-wavelength region, and it is possible for focus detection to be carried out by the CIGSAF sensor 70 for the estimated location.

Implementation of the "combined AF function" is not limited to the use of two CIGS sensor as described above. For example, in FIG. 2, it is possible to estimate the location in which a person is present in the AF portion using the CIGSAF sensor 70 itself, in a state in which the visible light cut-off filter 76 has been inserted into the optical path of the CIGSAF sensor 70. It is also possible for the CIGSAF sensor 70 to carry out focus detection in the estimated location in a state in which the infrared light cut-off filter 68 has been inserted into the optical path. In this manner, a single CIGS having a wide sensitivity region can be used in different sensitivity regions on a time sharing basis, and the "combined AF function" can be implemented by combining the time-shared outputs.

In the description of the embodiments above, a moveable semitransparent mirror or filter for dimming was inserted into and removed from the optical path, but adjustment of the quantity of incident light is not limited to such a two-stage configuration. Also possible is a configuration in which, e.g., a plurality of dimming filters that differ in transmissivity in a stepwise fashion are prepared, and the degree of dimming is finely varied in a stepwise fashion. Another possible configuration is to continuously vary the degree of dimming using dimming means for continuously varying transmissivity.

In the embodiments described above, a CIGS sensor is used as a sensor with high sensitivity and wideband spectral sensitivity characteristics and having a quantum efficiency of 60% or higher in the visible light region and the infrared region. The CIGS sensor is a photoelectric sensor that uses a polycrystalline CIGS thin film composed of copper, indium, gallium, and selenium, and the absorption wavelength region can be controlled by manipulating the composition of the thin film to vary the band gap. A thin film having zero gallium content is referred to as a "CIS thin film," and the term "CIS sensor" in the present specification refers to a photoelectric sensor that uses a "CIS thin film" that does not contain gallium.

Figure 7:
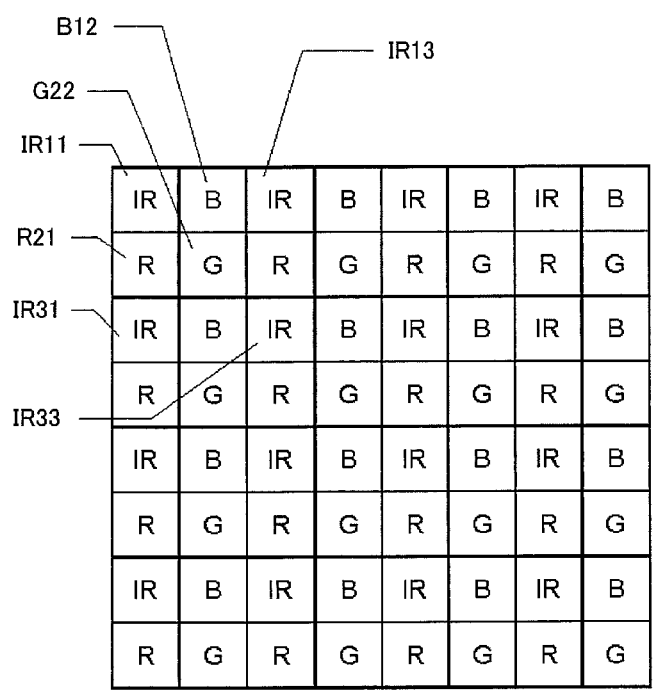
FIG. 7 is a first example of the color filter array of the CIGS imaging sensor used in the live view sensor of FIG. 2 or FIG. 5.

FIG. 7 is a first example of the color filter array of the CIGS imaging sensor used in the live view sensor 40 in the first embodiment of FIG. 2 or in the live view sensor 102 in the second embodiment of FIG. 5. In the first example, an infrared light transmitting filter IR11, a blue transparent filter B12, a green transparent filter G22, and a red transparent filter R21 are arrayed in the manner shown in the drawing, forming an array in which the filters are repeated as a single unit. The CIGS imaging sensor of the present invention has a wide spectral sensitivity region from the visible light region to the infrared light as shown in FIG. 3, and therefore visible light and infrared light color filters can be provided to a single sensor in this manner. The array of FIG. 7 has an infrared light transmitting filter added to the primary color filter, and the green light-receiving surface area is the same as that of red and blue, which is different from a typical Bayer array in a primary color filter. This point can be corrected by later circuit processing.

Interpolation of the infrared light image will be described here in relation to pixels for which an infrared light transmitting filter has not been arranged. First, the pixel corresponding to the blue transparent filter B12 is essentially interpolated using the average value of the pixel data corresponding to the infrared light transmitting filter IR11 and the infrared light transmitting filter IR13 on the two sides thereof. Interpolation of the infrared light image is the same for the pixels corresponding to other blue transparent filters. On the other hand, the pixel corresponding to the red transparent filter R21 is similarly interpolated using the average value of the pixel data corresponding to the infrared light transmitting filter IR11 and the pixel data corresponding to the infrared light transmitting filter IR31 located thereabove and below. Interpolation of the infrared light image is the same for the pixels corresponding to other red transparent filters. Also, the pixel corresponding to the green transparent filter G22 is interpolated using the average value of the surrounding pixel data, i.e., the pixel data corresponding to the infrared light transmitting filter IR11, the pixel data corresponding to the infrared light transmitting filter IR13, the pixel data corresponding to the infrared light transmitting filter IR33, and the pixel data corresponding to the infrared light transmitting filter IR31. Interpolation of the infrared light image is the same for the pixels corresponding to other green transparent filters.

With the simple interpolation described above, it is possible that an infrared light image that is different from the actual photographic object will be obtained. In order to prevent such an outcome, it is effective to carry out interpolation by additionally using visible light data that affects the pixels being interpolated, rather than merely carrying out interpolation of the infrared light image on the basis of only data that corresponds to nearby infrared light transmitting filters. For example, the data of the red light actually received by the pixel corresponding to the red transparent filter R21 is also used in the interpolation of the infrared light image for the pixel corresponding to the red transparent filter R21. The extent and existence of the use of such visible light data is determined on the basis of the mutual relationship between the visible light data and the infrared-light data, or the mutual relationship between the visible light data of surrounding pixels.

Figure 8:
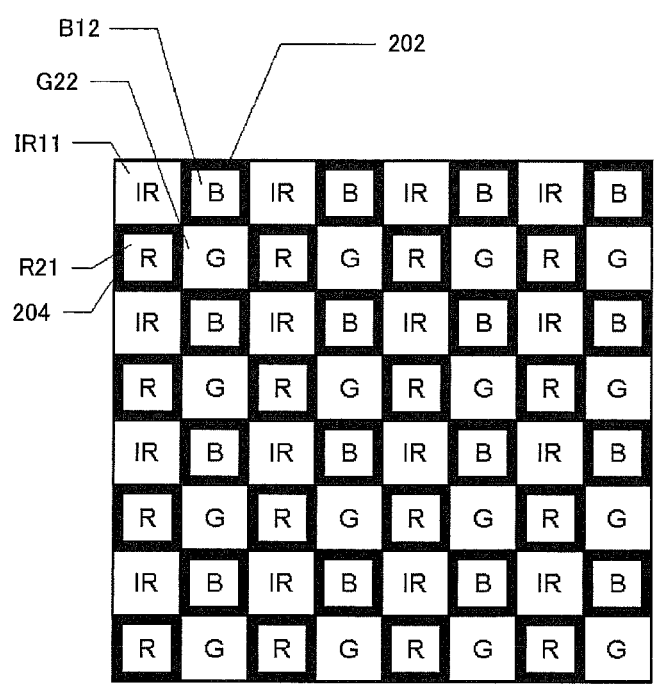
FIG. 8 is a second example of the filter array of the CIGS imaging sensor.

FIG. 8 is a second example of the filter array of the CIGS imaging sensor used in the live view sensor 40 in the first embodiment of FIG. 2 or the live view sensor 102 of the second embodiment of FIG. 5. In the second example, the color filter array is the same as the first example of FIG. 7, but the light-receiving surface area of the color filters is different. In other words, the infrared light transmitting filter IR11 and the green transparent filter G22 are given the maximum allowed light-receiving surface area for a pixel, but the blue transparent filter B12 has about half the light-receiving surface area of the green transparent filter G22 because a light-blocking portion 202 is provided. Similarly, the red transparent filter R21 also has about half the light-receiving surface area of the green transparent filter G22 because a light-blocking portion 204 is provided. This corresponds to the fact that visual sensitivity to red and blue in the human eye is about half the visual sensitivity to green.

The CIGS imaging sensor of the present invention has high sensitivity in the visible light region as shown in FIG. 3, and can therefore perform adequately even if the light-receiving surface area of the blue transparent filter B12 and the red transparent filter R21 is reduced. Since the light-receiving surface area can be varied for each pixel by the light-blocking portion, adjustments can be more finely carried out in comparison with approximation to human visual sensitivity by using the ratio of the number of pixels as in a Bayer array, and the light-receiving surface area ratio of the blue transparent filter B12 and the red transparent filter R21 can be varied as required.

Figure 9:
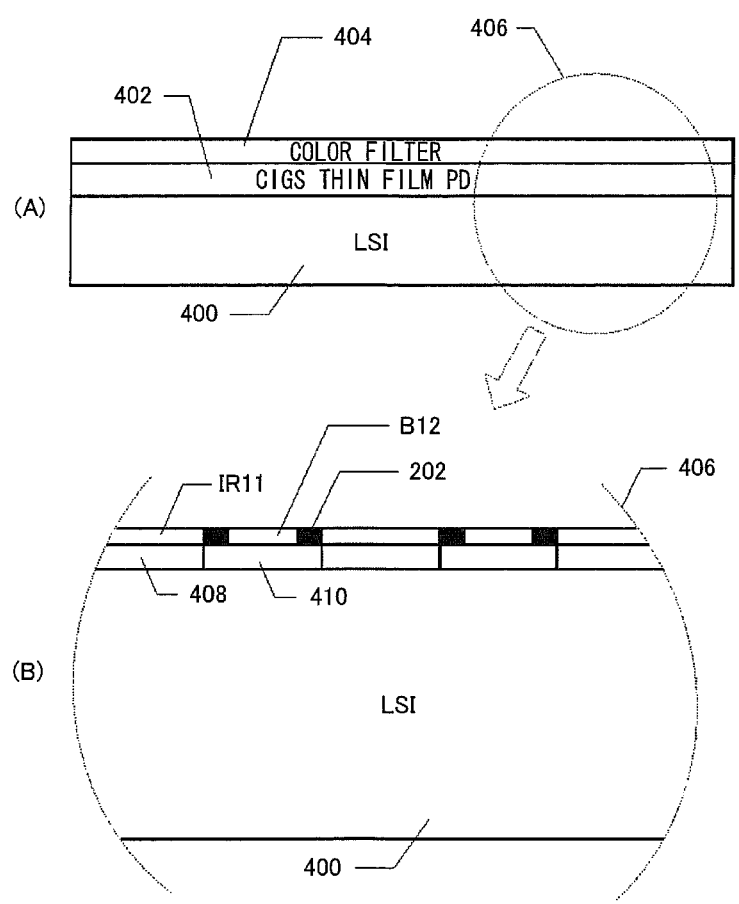
FIG. 9 is a schematic cross-sectional view of a CIGS sensor that uses the filter array of FIG. 8.

FIG. 9 is a schematic cross-sectional view of a CIGS sensor that uses the second example of the filter array of FIG. 8. The CIGS imaging sensor of the present invention has a structure in which a CIGS thin film 402 is layered on an LSI 400, as shown in FIG. 9(A), and the aperture ratio of a single pixel is very high. A color filter 404 is layered on the CIGS thin film. The basic structure as such in the schematic cross-sectional view of FIG. 9(A) is not limited to the second example of the filter array, and may be the same as the CIGS sensor of the present invention.

FIG. 9(B) is an enlarged schematic cross-sectional view of the portion 406 of FIG. 9(A) and shows a conceptual view of the cross section of the second example of the filter array of FIG. 8. In FIGS. 8 and 9(A), the same reference numerals are used for corresponding portions. It is apparent in FIG. 9(B) that the CIGS thin film 402 is divided into photodiodes 408, 410, and the like, which respectively form a pixel. The infrared light transmitting filter IR11 is disposed on the photodiode 408. The blue transparent filter B12 and the light-blocking portion 202 for reducing the light-receiving surface area are disposed on the photodiode 410.

Figure 10:
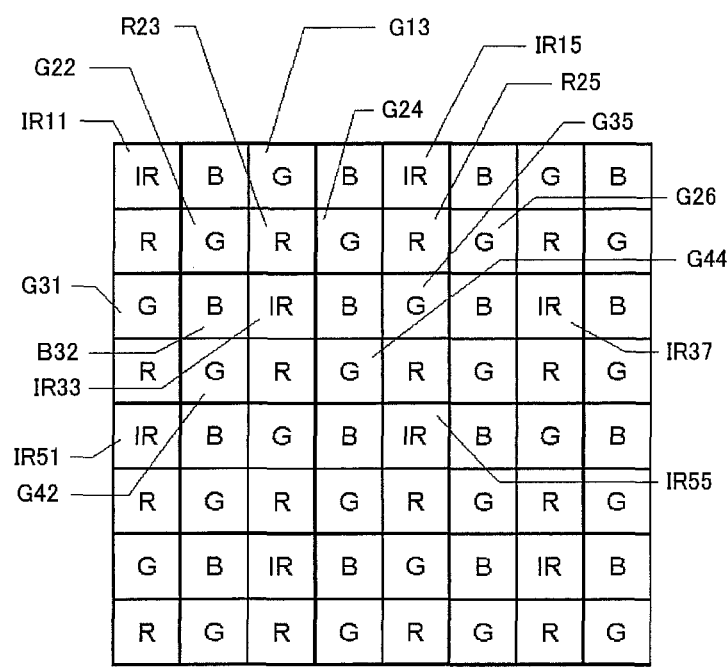
FIG. 10 is a third example of the filter array of the CIGS imaging sensor.

FIG. 10 is a third example of the filter array of the CIGS imaging sensor used as the live view sensor 40 in the first embodiment of FIG. 2 and the live view sensor 102 in the second embodiment of FIG. 5. This example is one in which the infrared light transmitting filters IR11, IR33, IR51, and the like are substituted in an orderly fashion in place of ¼ the total number of the green transparent filter in a Bayer array. The remaining ¾ is green transparent filters G13, G22, G31, G42, G44, G35, G24, and the like in the same manner as a Bayer array.

As a result, the ratio of the total number of green transparent filters G13, and so forth is 1.5 times the ratio of the total number of blue transparent filter B32, and so forth. The light-receiving surface area of the green transparent filter can thereby be increased and approximated to the visual sensitivity of the human eye by increasing the number of pixels that corresponds the green transparent filter in the same manner as a Bayer array. In the filter array of FIG. 10, the concept of the filter array of FIG. 8 is added; a light-blocking portion is provided to the red transparent filter R23, and so forth, and to the blue transparent filter B32, and so forth; and the light-receiving surface area of these filters is reduced to allow adjustments to be made to the light-receiving surface area to provide an approximation to visual sensitivity.

On the other hand, since the infrared light transmitting filter IR11, and so forth are arrayed in the manner described above, the arrangement is sparse and the ratio of the total number is half the ratio of the total number of red transparent filters R23 and blue transparent filter B32. The CIGS imaging sensor of the present invention has high sensitivity in the infrared region, as shown in FIG. 3, and can therefore sufficiently accommodate infrared light even if the ratio of the total number of pixels is low, and can also accommodate infrared light even when the pixel arrangement is more sparse than for visible light because infrared light has a long wavelength.

Described next is the interpolation of the infrared light image related to the pixels for which an infrared light transmitting filter has not been arranged in the filter array of FIG.

10. First, the pixel that corresponds to the green transparent filter G35 is interpolated using the average value of the pixel data corresponding to the infrared light transmitting filter IR15 located two pixels upward, the pixel data corresponding to the infrared light transmitting filter IR33 located two pixels leftward, the pixel data corresponding to the infrared light transmitting filter IR55 located two pixels downward, and the infrared light transmitting filter IR37 located two pixels rightward. The pixel corresponding to the green transparent filter G24 is interpolated using the average value of the pixel data corresponding to the infrared light transmitting filter IR15 located to the upper right, and the pixel data corresponding to the infrared light transmitting filter IR33 located to the lower left. The pixel corresponding to the green transparent filter G26 is interpolated using the average value of the pixel data corresponding to the infrared light transmitting filter IR15 located to the upper left, and the pixel data corresponding to the infrared light transmitting filter IR37 located to the lower right.

The pixel corresponding to the red transparent filter R25 is interpolated using the average value of the pixel data corresponding to the infrared light transmitting filter IR15 and to infrared-light image data related to the image that corresponds the green transparent filters G35, G24, G26, which were interpolated and obtained in the manner described above. In summary, the following is the weighted average of the infrared-light image data that correspond to IR15, IR33, IR55, and IR37.

$$\{(IR15+IR33+IR55+IR37)/4+(IR15+IR33)/2+(IR15+IR37)/2+IR15\}/4=(9IR15+3IR33+IR55+3IR37)/16)$$

The infrared-light image data of the pixels that correspond to the visible light filters are interpolated in the same fashion thereafter.

The interpolation of the green image related to the pixels for which a green transparent filter is not provided is carried out by first using the average of the pixels that correspond to the green transparent filters G22, G42, G44, G24 around the image that corresponds to the infrared light transmitting filter IR33. The average of the green image data related to an image that corresponds to the infrared light transmitting filter IR33 obtained by interpolation as described above and the green image data of the green transparent filters G22, G31, and G42 is calculated to interpolate the green image data in relation to the image that corresponds to the blue transparent filter B32 in the center of the noted filters. In summary, the following is the weighted average of G22, G31, G42, G44, and G24.

$$\{(G22+G42+G44+G24)/4+(G22+G31+G42)/4=(5G22+4G31+5G42+G44+G24)/16)$$

The green image data of the pixels that correspond to the infrared light transmitting filter, the red transparent filter, and the blue transparent filter are interpolated in the same fashion thereafter. Interpolation of the red image and blue image is the same as FIG. 7.

When interpolation is repeated in the case in which the arrangement is sparse such as in the red transparent filter described above is repeated, or when interpolation is carried out using data having an asymmetrical arrangement such as the green transparent filter described above, interpolation is further carried out using the data produced by the interpolations described above, and it is possible that an image that is different from the real subject will be obtained. In this case as well, it is effective to carry out interpolation using other color data that affects the pixels being interpolated, as described in FIG. 7, in addition to using interpolation using only pixel data that corresponds to an infrared light transmitting filter such as that described above, or interpolation using only image data that corresponds to the green transparent filter.

Figure 11:
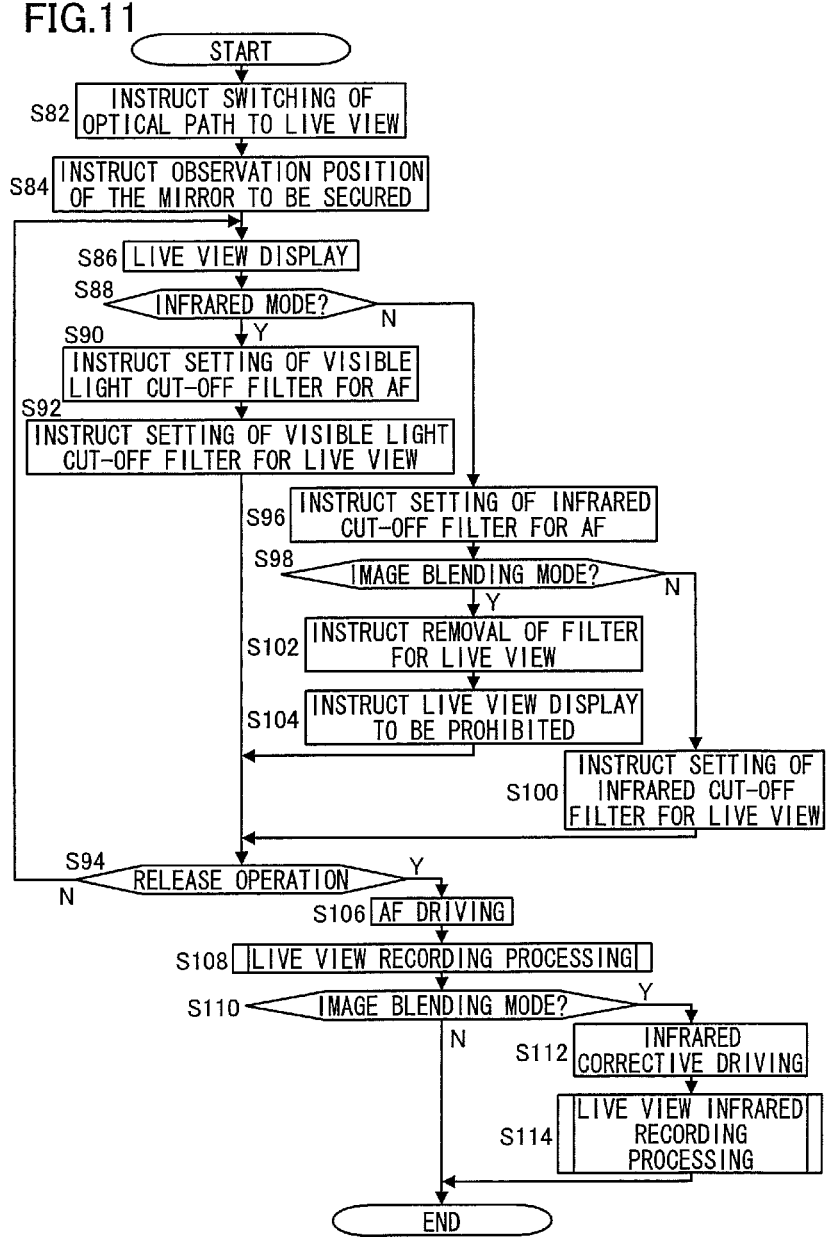
FIG. 11 is a flowchart showing the operation of the camera control unit when the image from the live view sensor is recorded in the second embodiment of FIG. 5.

FIG. 11 is a flowchart showing the operation of the camera control unit 116 when the image from the live view sensor 102 is recorded in the image storage unit 26 in the second embodiment. When the flow is started by carrying out an operation to select this function using the operating unit 15, first, the moveable total reflection mirror is lowered to the position of 106a in step S82, and an instruction is issued to switch the optical path so that all the light from the pentaprism 104 is reflected in the direction of the live view sensor 102. The mirror 8 is secured in the observation position in step S84 and is prevented from moving upward to the imaging position even if a release operation is performed. Display is furthermore carried out using the display unit 32 in step S86.

Next, in step S88, a check is made to determine whether the infrared mode has been selected, in which case the process proceeds to step S90 where the mirror/filter drive unit 78 is instructed to set the visible light cut-off filter 76 for AF in the optical path to the CIGSAF sensor 70. Furthermore, in step S92, the mirror/filter drive unit 114 is instructed to set the visible light cut-off filter 112 for live viewing in the optical path to the live view sensor 102, and the process proceeds to step S94.

On the other hand, in step S88, the process proceeds to step S96 when the infrared mode has not be selected, and the mirror/filter drive unit 78 is instructed to set the infrared light cut-off filter 68 for AF in the optical path to the CIGSAF sensor 70. The process then proceeds to step S98 and a check is made to determine whether the "image blending mode" has been selected. Vegetation growth or pest damage are known to be detected by blending infrared light images and visible light images of the same photographic object, and the "image blending mode" allows infrared light images and visible light images of the same photographic object to be acquired substantially simultaneously. It is therefore possible to obtain an infrared light image and a visible light image without mutual displacement, even when the photographic object is moving.

In the case that the "image blending mode" setting is not detected in step S98, this indicates that the visible light mode has been selected and the process proceeds to step S100. The mirror/filter drive unit 114 is instructed to set the infrared light cut-off filter 110 for live viewing in the optical path to the live view sensor 102, and the process proceeds to step S94.

Conversely, when the "image blending mode" setting is detected in step S98, the process proceeds to step S102, and the mirror/filter drive unit 114 is instructed to remove the infrared light cut-off filter 110 and the visible light cut-off filter 112 from the optical path to the live view sensor 102. This is because the infrared light image and the visible light image will be substantially simultaneously acquired by the live view sensor 102.

Next, in step S104, an instruction is issued to disable live view display on the display unit 32, and the process proceeds to step S94. Live view is disabled because the positions in which the visible light and infrared light are formed into images by the interchangeable lens 4 will be different, a focused image and an unfocused image are therefore superimposed when the infrared light image and the visible light image are displayed on the display unit 32, and the display is difficult to view. In step S104, an instruction may be issued to extract and display only the pixel information of the focused image (ordinarily the visible light image) among the infrared light image and the visible light image, in place of completely disabling display on the display unit 32. In this case, the filter has been removed; therefore, light of the image information that is not focused is also incident on the unfiltered pixels, but since the intensity of the light of the image information that is focused is higher, display is possible. It is also possible to allow advance selection of whether to completely disable display as described above or to disable display of only the pixel information for the unfocused image, and then to issue instructions for the option selected in step S104.

In step S94, a check is made to determine whether a release operation has been carried out. If a release operation has not been carried out, the process returns to step S86, and the steps S86 to S104 are repeated until a release operation is detected. Mode switching using the operating unit 15 can be managed thereby. As described in FIG. 4, since a delay interval is provided to the mechanical execution of an "instruction," the filter is not driven in FIG. 11 as well while the steps S86 to S104 are being repeated, as long as a mode switch is not actually carried out. This similarly applies to switching between display or disabled display on the display unit 32 in steps S86 and S104.

When a release operation is detected in step S94, the process proceeds to step S106, AF driving of the lens optical system 6 is carried out, and live viewing and recording in step S108 are carried out when the focusing is completed. The AF driving is used for the infrared light image as well as for the visible light image. Next, a check is made to determine whether the image blending mode has been set in step S110, and if such is not the case, the flow is immediately ended.

On the other hand, when it has been detected that the "image blending mode" has been set in step S110, the process proceeds to step S112, and the lens optical system 6 is driven by the AF control unit 36 for infrared light correction. In other words, when the "image blending mode" has been set, the AF driving in step S106 and the live viewing and recording processing in step S108 are carried out for the visible light image, and in step S112, the AF drive unit 38 drives the lens optical system 6 to carry out predetermined correction from the focal position of the visible light to the focal position of the infrared light. This corrective driving of infrared light is carried out in a very short period of time, and processing for live viewing and infrared light recording in step S114 is immediately started. When processing is completed, the flow is ended. The above functions are described in detail below, and essentially in the image blending mode, the visible light image is recorded in step S108, and the infrared light image is recorded substantially simultaneously in a sequential fashion in step S114.

Figure 12:
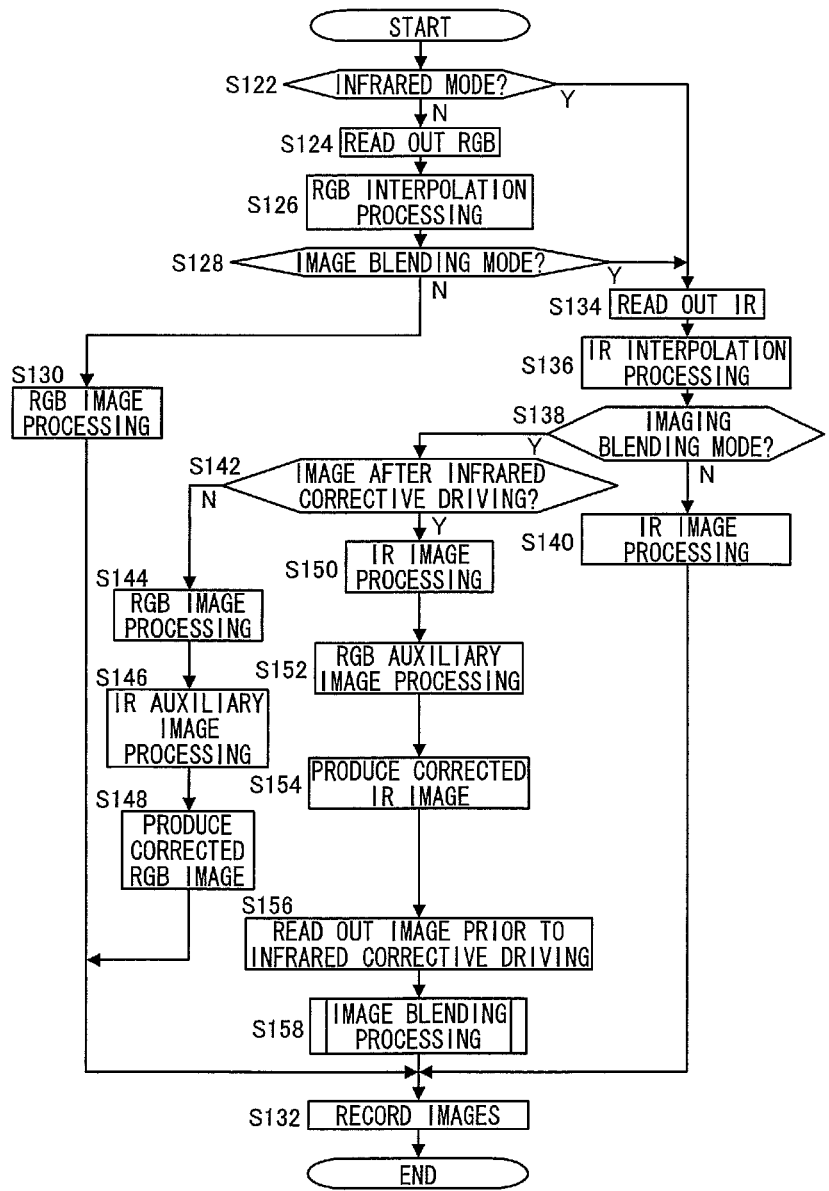
FIG. 12 is a flowchart showing the details of processing that can be used in step S108 and step S114 of FIG. 11.

FIG. 12 is a flowchart showing the details of processing for live viewing and recording in step S108 and live viewing and infrared light recording in step S114 of FIG. 11, and can be used for both processes. When the flow starts, a check is made to determine whether the infrared light imaging mode has been set in step S122. If such is not the case, the process proceeds to step S124, the pixel information of the visible light image is obtained by reading the RGB pixel data. RGB interpolation processing is carried out in step S126. Next, in step S128, a check is made to determine whether the image blending mode has been set, and if such is not the case, the process proceeds to step S130 and image processing is carried out for an RGB visible light color image. The process proceeds to step S132, the image is recorded in the image storage unit 26, and the flow is ended.

On the other hand, when it has been detected that the infrared light mode has been set in step S122, the process proceeds to step S134, and the pixel information of the infrared light image is obtained by reading the IR pixel data. IR interpolation processing is carried out in step S136. Next, in step S138, a check is made to determine whether the image blending mode has been set, but this will not be the case since infrared light mode has been enabled. Therefore, the process proceeds to step S140 and image processing is carried out for the infrared light image. The process proceeds to step S132, the image is recorded in the image storage unit 26, and the flow is ended.

In the case that the image blending mode setting has been detected in step S128, the process proceeds to step S134 and pixel information of the infrared light image is obtained by reading the IR pixel data. IR interpolation processing is carried out in step S136. Therefore, the infrared light image information can also be obtained in addition to the visible light image information in steps S124, S126. Next, a check is made in step S138 to determine whether the image blending mode has been set, and since the image blending mode will have been enabled, the process will proceed to step S142, and a check made to determine whether the infrared light image obtained by the processing of steps S134 and S136 is the result of driving for correcting the infrared light.

Described hereinbelow is what happens when the outcome of step S142 is affirmative or negative. First, a negative outcome in step S142 corresponds to the case in which the flow of FIG. 12 is being carried out in step S108 of FIG. 11. The visible light image obtained in steps S124 and S126 is focused by AF driving for visible light in step S106 of FIG. 11, and the infrared light image obtained in steps S134 and S136 is not in focus. On the other hand, an affirmative outcome in step S142 corresponds to the case in which the flow of FIG. 12 is being carried out in step S114 of FIG. 11. The infrared light image obtained in steps S134 and S136 is focused by the corrective driving of infrared light in step S112 of FIG. 112, and the visible light image obtained in steps S124 and S126 is not in focus.

In view of the above, when it has been determined in step S142 that the resulting image is not the image obtained after the corrective driving of infrared light, the process proceeds to step S144, and image processing is carried out using the focused RGB visible light image. Next, auxiliary image processing for the unfocused infrared light image is carried out in step S146. An image obtained by correcting the visible light image using the infrared light image information is produced in step S148. The image is essentially a visible light image, but the image quality of the visible light image is improved using a low-pass filter effect or the like by adding the information of the infrared light image, which is in a blurred and unfocused state. Having completed the processing described above, the process proceeds to step S132, and the images obtained in steps S144, S146, and S148 are recorded and flow is ended.

On the other hand, when it has been determined in step S142 that the resulting image is the image obtained after the corrective driving of infrared light, the process proceeds to step S150 and the focused infrared light image undergoes image processing. Next, auxiliary image processing for the unfocused RGB visible light image is carried out in step S152. An image obtained by correcting the infrared light image using the visible light image information is produced in step S156. The image is essentially an infrared light image, but the image quality of the infrared light image is improved using a low-pass filter effect or the like by adding the information of the visible light image, which is in a blurred and unfocused state.

step S156 involves reading the images that have not yet been subjected to the corrective driving of infrared light and that are recorded in step S108 of FIG. 11. As a result, the focused infrared light image, the focused visible light image, the unfocused infrared light image, the unfocused visible light image, the corrected infrared light image, and the corrected visible light image are obtained, and image-blending processing based on these images is carried out in the next step S158.

The image-blending processing of step S158 essentially involves blending the focused infrared light image and the focused visible light image, which thereby allows diagnostic imaging when judgment cannot be made using only one of the images. Instead of the above, diagnostic imaging can also be performed by blending the corrected infrared light image and the corrected visible light image. A compact soft-focus visible light image can be obtained by blending the focused visible light image and the unfocused visible light image. Similarly, a soft focus infrared-light image can be obtained by blending the focused infrared-light image and the unfocused infrared-light image. It is furthermore possible to obtain an image that conforms to the visible light image obtained using the infrared cut-off filter by correcting the focused visible light image using the focused infrared-light image. Conversely, it is also possible to obtain an image that conforms to the infrared-light image obtain using the visible light cut-off filter by correcting the focused infrared-light image using the focused visible light image. These processes can be selected using the operating unit 15, but may also be automatically selected in accordance with the photographic object.

When the processing of step S158 as described above is completed, the process arrives at step S132, the images obtained by the processing are recorded, and the flow is ended. The images recorded in step S132 may be all the images processed in step S158, or may be images selected in the processing of step S158 and ultimately judged to be required. The selection can be made using the operating unit 15 or can be automatically carried out in step S158 in accordance with the processing results.

The flowchart related to the image recording function of FIGS. 11 and 12 is not limited to the image recording of the live view sensor 102 of the single-lens reflex camera described in the second embodiment, and application can also be made to, e.g., a visible light/infrared light image recording camera designed specifically for image recording on a CIGS sensor. As shown in FIG. 5, such a visible light/infrared light image recording camera may be configured by removing the focus plate 10, the pentaprism 104, and the eyepiece 14, and other components of the optical finder system, and to arrange a CIGS imaging sensor in lieu of the imaging unit 20 in the imaging unit position. In such a case, the infrared light cut-off filter 110 and the visible light cut-off filter 112 are provided so as to allow insertion into and removal from the optical path in the direct line from the lens optical system 6 to the CIGS imaging sensors. In place of the movable mirror 8, a fixed half mirror is provided in which a majority of the incident light proceeds directly as the transparent component and the reflected light is directed downward to the photometry and AF sensor 34.

Embodiment 3

Figure 13:
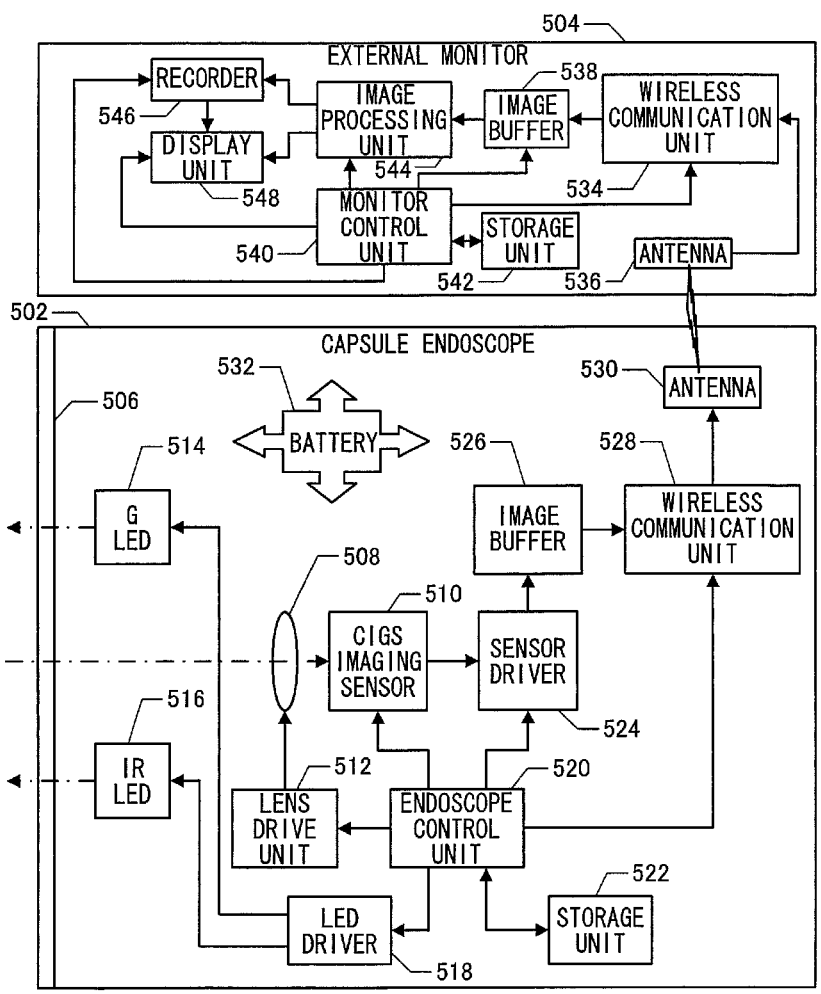
FIG. 13 is a block view showing the third embodiment of the present invention (Embodiment 3)

FIG. 13 is a block view of the third embodiment of the present invention and constitutes an endoscopic system. The endoscopic system has a capsule endoscope 502 that is swallowed into the body and used for photographing the interior of the digestive tract and transmitting image data to the exterior of the body; and an external monitor 504 for receiving the transmitted image data outside of the body. The capsule endoscope 502 has a sealed structure with a transparent protective window 506, and captures images inside the digestive tract that have passed through the protective window 506 and been formed into an image on the CIGS imaging sensor 510 by an imaging lens 508. The CIGS imaging sensor 510 has the spectral sensitivity described in FIG. 3, is capable of imaging with high sensitivity in the visible light region, and is also capable of imaging with high sensitivity in infrared light region. The angle of view and the focal position of the imaging lens 508 can be adjusted by a lens drive unit 512.

The CIGS imaging sensor 510 of the third embodiment does not have a color filter such as that shown in FIGS. 7 to 10, and light from the visible light region to the infrared region can be incident on all pixels. In other words, the division of light in the image of the third embodiment is not carried out using a color filter on the light-receiving side, but is rather carried out by switching the light on the light-source side. Specifically, red, green, blue, and infrared light-emitting diodes (occasionally referred to as "LED" below) are used as a light source, and these are made to sequentially emit light in a time-sharing fashion, whereby the imaging output of the CIGS imaging sensor 510 in each light-emission timing is image data for each color.

A large number of LEDs is provided in a concentric fashion about the optical axis of the imaging lens 508, but in order to simplify the description, a single green LED 514 and a single infrared LED 516 are shown as an example in FIG. 13. For example, the imaging output of the CIGS imaging sensor 510 when the green LED 514 is emitting light is green image data, and the CIGS imaging sensor 510 when the infrared LED 516 is emitting light is infrared image data. Since there is displacement between the imaging positions of the visible light and the infrared light, the lens drive unit 512 adjusts the image formation positions as required. The third embodiment is an endoscope, and the light of the light source can be divided in this manner in a time-sharing fashion because the interior of the body as the photographic object is sufficiently dark. The relevance to the light source, capturing images, the imaging lens, and the like is described further below.

An LED driver 518 controls the lighting timing of the LEDs 514, 516 on the basis of instructions from an endoscope control unit 520. The endoscope control unit 520 controls the entire capsule endoscope 502, and the functions of the endoscope control unit follow a program stored in a storage unit 522. The storage unit 522 temporarily stores data or the like required for the functions of the endoscope control unit 520 as required.

A sensor driver 524 controls the CIGS imaging sensor 510 on the basis of instructions from the endoscope control unit 520, and stores the raw data of each color image from the CIGS imaging sensor 510 in an image buffer 526. The image buffer 526 is capable of storing a predetermined number of imaging cycles of raw data of each color image, and a wireless communication unit 528 reads the raw data of each color image in the image buffer 526 in a FIFO format and transmits the data from an antenna 530 to the exterior of the body. A battery 532 is composed of a button cell or the like, which feeds power to the entire capsule endoscope 502.

The external monitor 504 has a wireless transmitter 534, receives the raw data of each color image transmitted from the capsule endoscope 502, and stores the data in an image buffer 538. These functions are controlled by a monitor control unit 540. The monitor control unit 540 provides overall control of the external monitor 504 in accordance with a program stored in a storage unit 542. The storage unit 542 temporarily stores data or the like required for the functions of the monitor control unit 540 as required.

An image processing unit 544 processes the raw data of each color stored in the image buffer 538 on the basis of instructions from the monitor control unit 540 to form an image signal; produces a color image signal from the red image signal, the green image signal, and the blue image signal; and records the signals in a recorder 546. The infrared light signal is also recorded in the recorder 546. The recorded data can be monitored as needed using the display unit 548. The color image signal or the infrared image signal from the image processing unit 544 can be directly monitored in real time using the display unit 548.

Figure 14:
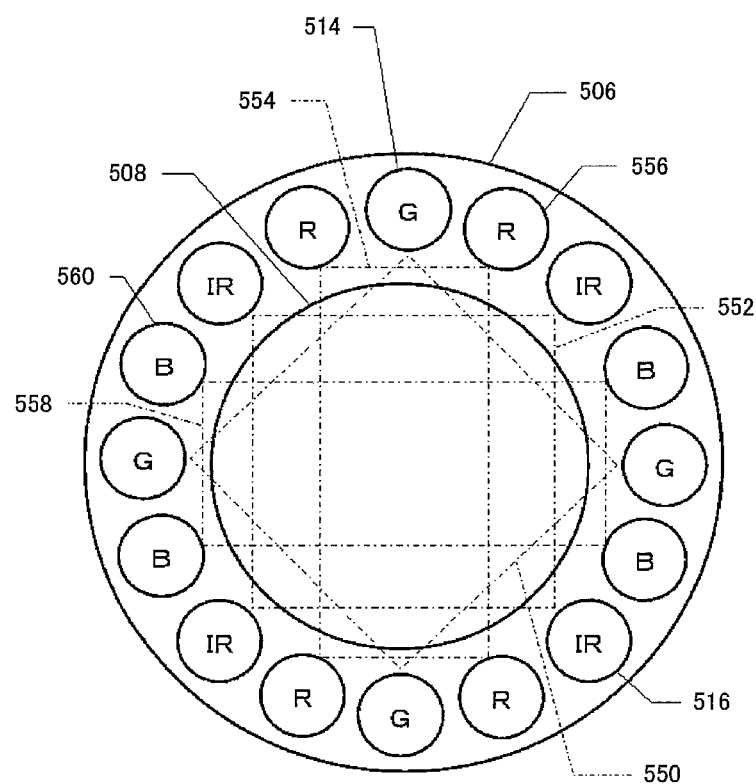
FIG. 14 is a front view showing a first example of an LED arrangement that can be used in the third embodiment.

FIG. 14 is a front view showing a first example of an LED arrangement that can be used in the capsule endoscope 502 of the third embodiment. The same reference numerals are used for the corresponding portions in FIG. 13. It is apparent from FIG. 14 that four green LEDs 514 are disposed in rotational symmetry 90° apart from each other about the periphery of the imaging lens 508 inside the transparent protective window 506. The line 550 connecting the LEDs form a square. Four infrared LEDs 516 are disposed in rotational symmetry 90° apart from each other at the apexes of a square 552 rotated 45° from the green LEDs 514. Furthermore, four red LEDs 556 are disposed at the apexes of a vertically oriented rectangle 554, and four blue LEDs 560 are disposed at the apexes of a horizontally oriented rectangle 558. As a result, the red, green, and blue LEDs are arranged in line symmetry in the vertical and horizontal directions as seen in FIG. 14. Illumination symmetry is maintained in the vertical and horizontal directions for each color.

Figure 15:
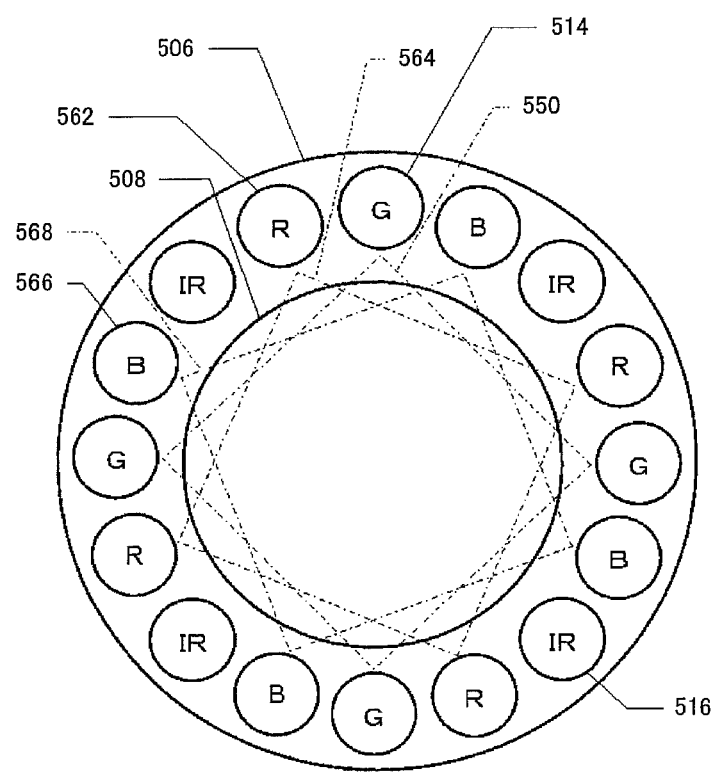
FIG. 15 is a front view showing a second example of an LED arrangement that can be used in the third embodiment.

FIG. 15 is a front view showing a second example of an LED arrangement that can be used in the capsule endoscope 502 of the third embodiment. In FIG. 15 as well, the same reference numerals are used for the corresponding portions in FIG. 13. The arrangement of the green LEDs 514 and the infrared LEDs 516 in FIG. 15 is the same as FIG. 14. In contrast, four red LEDs 562 are disposed in rotational symmetry 90° apart from each other about at the apexes of a square 564 rotated 22.5° leftward from the green LEDs 514. Four blue LEDs 566 are disposed in rotational symmetry 90° apart from each other about at the apexes of a square 568 rotated 22.5° rightward from the green LEDs 514. As a result, the red, green, and blue LEDs are arranged closely together in four directions, i.e., the up, down, left, and right directions as seen in FIG. 15, and illumination shading and coloring nonuniformities caused by the offset arrangement of the LED colors are reduced. Furthermore, each color is arranged at the apexes of a square and are therefore arranged in rotational symmetry to each other about the optical axis of the imaging lens 508.

Figure 16:
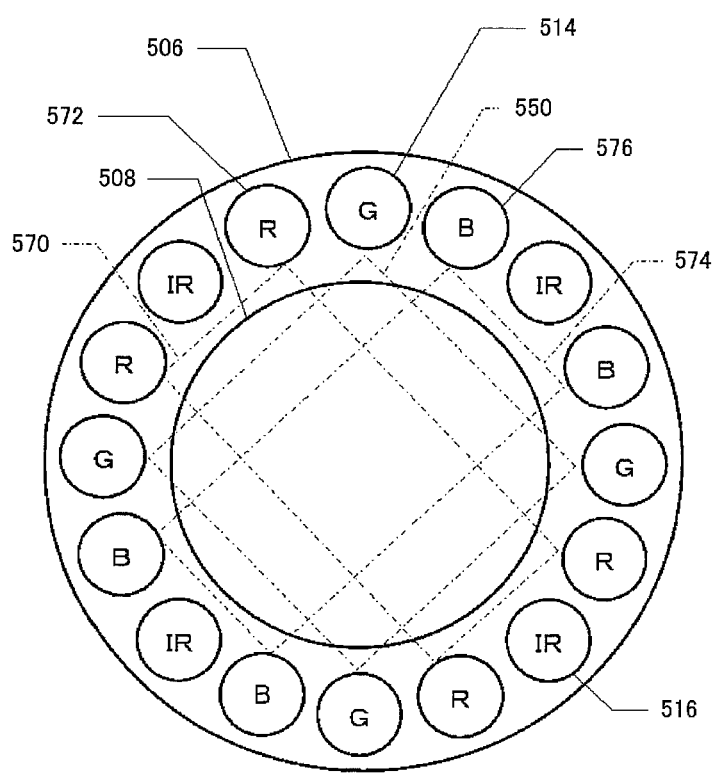
FIG. 16 is a front view showing a third example of an LED arrangement that can be used in the third embodiment.

FIG. 16 is a front view showing a third example of an LED arrangement that can be used in the capsule endoscope 502 of the third embodiment. In FIG. 16 as well, the same reference numerals are used for the corresponding portions in FIG. 13. The arrangement of the green LEDs 514 and the infrared LEDs 516 in FIG. 16 is the same as FIG. 14. In contrast, four red LEDs 572 are disposed at the apexes of a vertically oriented rectangle 570 tilted leftward 45°, and four blue LEDs 576 are disposed at the apexes of a vertically oriented rectangle 577 tilted rightward 45°. As a result, the red, green, and blue LEDs are arranged in linear symmetry in relation to the line tilted leftward 45° and the line tilted rightward 45° that connect opposing infrared LEDs as seen in FIG. 16. Illumination symmetry is maintained in the directions of each color. Furthermore, the red, green, and blue LEDs are arranged closely together in four directions, i.e., the up, down, left, and right directions as seen in FIG. 16, and illumination shading and coloring nonuniformities caused by the offset arrangement of the LED colors are reduced.

In the LED arrangement examples shown in FIGS. 14 to 16, the green LEDs are shown as being arranged up, down, left, and right, and the infrared LEDs arranged in positions rotated 45° from the green LEDs; however, the overall arrangement is not limited to this arrangement, it also being possible to employ an arrangement that is suitably rotated in relation to the cell direction of the pixel arrangement of the CIGS imaging sensor. For example, the LED arrangement examples shown in FIGS. 14 to 16 have the green LEDs arranged up, down, left, and right using the up, down, left, and right directions of the pixel arrangement of the CIGS imaging sensor as a reference, but this arrangement may be rotated 45° and the infrared LEDs may arranged up, down, left, and right in conformity with the cell directions of the pixel arrangement. In this case, the green LEDs are arranged in positions rotated 45° from the infrared LEDs.

Figure 17:
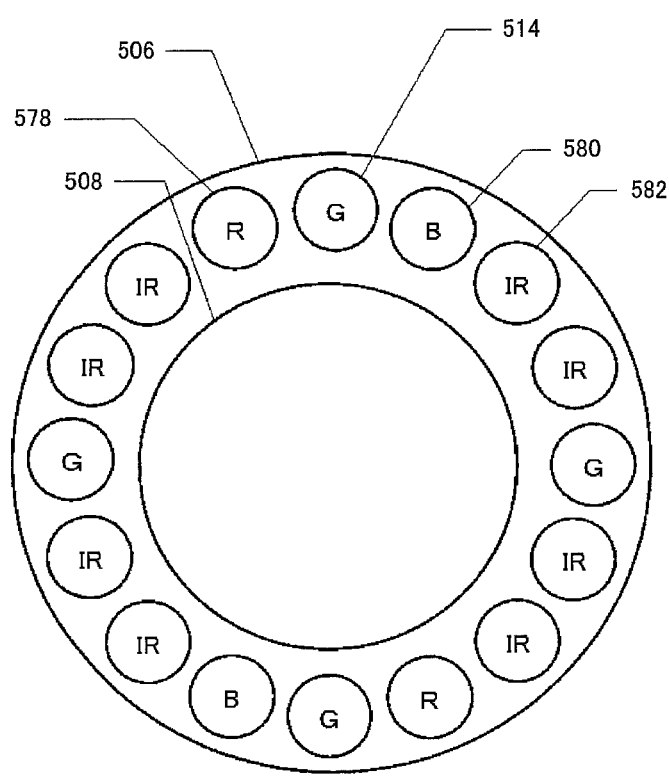
FIG. 17 is a front view showing a fourth example of an LED arrangement that can be used in the third embodiment.

FIG. 17 is a front view showing a fourth example of an LED arrangement that can be used in the capsule endoscope 502 of the third embodiment. In the case that the red, green, blue, and infrared LEDs are arranged about the optical axis of the imaging lens 508, all the LED colors are not limited to being mutually the same number. FIG. 17 is an example of such a configuration, and four green LEDs 514, two red LEDs 578, and two blue LEDs 580 are used. The number of green LEDs 514 is twice that of the red LEDs 578 and the blue LEDs 580 in order to increase the green luminous energy in relative terms and to match visual sensitivity. In FIG. 17, eight infrared LEDs 582 are arranged in order to increase the infrared luminous energy and to enhance the endoscopic observation capability using infrared light.

A total of 16 LEDS are used in FIGS. 14 to 17, but no limitation is imposed thereby. The total number of LEDs can be further increased to reduce illumination nonuniformities as long as such an arrangement is possible. It is also possible to use a simple configuration in which a single pair of LEDs is used for each color for a total of eight LEDs in order to maintain symmetry for minimum illumination. In this case, it is preferred that the line connecting the pair of green LEDs and the line connecting the pair of infrared LEDs intersect at 90° angles; the pair of red LEDs and the pair of blue LEDs be arranged so that the lines connecting the respective pairs of LEDs are rotated 45° to the left and right, respectively, of the line connecting the pair of green LEDs; and the red and blue LEDs be adjacent on the two sides of the green LEDs. As long as the arrangement space permits, it is also possible to place the red and blue LEDs in close proximity on the two sides of the greed LED in lieu of arranging the eight LEDs at equidistant intervals, and to reduce the positional offset between the red, green, and blue LEDs as much as possible.

Figure 18:
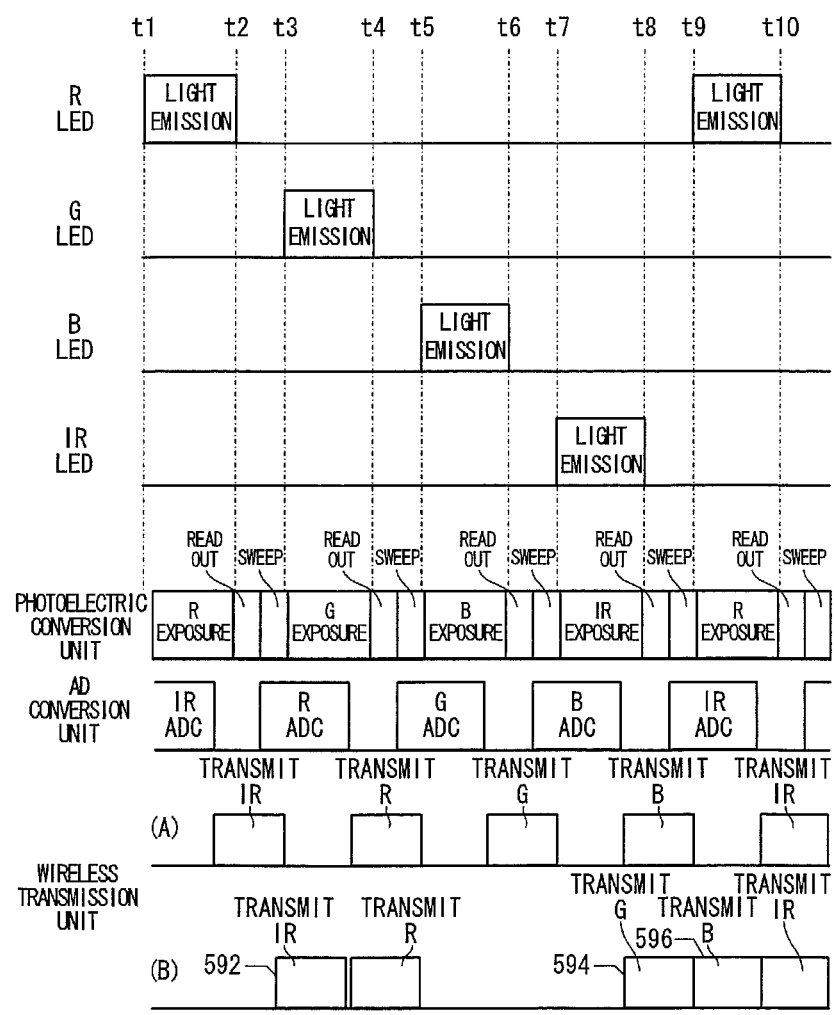
FIG. 18 is an operation timing chart in the color/infrared mode of the third embodiment.

FIG. 18 is a timing chart showing the relationship between the lighting timing of each LED color, the operation timing of the photoelectric conversion unit, the operation timing of the AD conversion unit, and the operation timing of the wireless communication unit, in the operation of the color/infrared mode in the capsule endoscope 502 of the third embodiment. In the color/infrared mode, a visible light color image and an infrared light image are acquired concurrently. It is apparent in FIG. 18 that all of the red LEDs are lighted from t1 to t2, all of the green LEDs are lighted from t3 to t4, all of the blue LEDS are lighted from t5 to t6, and all of the infrared LEDs are lighted from t7 to t8, with a timing in which each color is lighted in a time-sharing fashion without mutual overlap. When the lighting of the four LED colors has completed one cycle, all of the red LEDs are again lighted from t9 to t10, and so forth; the green, blue, and infrared LEDs are then lighted in the same manner; and the time-sharing lighting is repeated with the same cycle. The time from t1 to t8 is approximately equal to the time of a single frame of an ordinary color video, the luminous energy of each color is ¼ or less in comparison with a non-time-sharing configuration, but since the CIGS sensor has higher sensitivity and more pronounced wideband characteristics in comparison with an ordinary CMOS sensor, as shown in FIG. 3, the configuration produces sufficient light from the light source even with the luminous energy of short duration.

In the case that the visible light and the infrared light are to be substantially simultaneously lighted in the color/infrared mode, as shown in FIG. 18, the angle of view of the imaging lens 508 of FIG. 13 is set to a wide angle under the control of the lens drive unit 512, the focal depth is given a deeper setting, and the focal position is also set so as to form a pan focus to include visible light and infrared light by control of the lens drive unit 512. In this manner, the color/infrared mode is suitable for roughly observing the overall state inside a body.

It is apparent from the timing chart of the photoelectric conversion unit of FIG. 18 that the photoelectric conversion unit starts being exposed to red light and stores an electric charge immediately after the red LED begins emitting light. Since the charge-storing time is set to last until immediately prior to the end of red LED light emission, exposure is ended at this point and the charge is read out. When the charge has been read out, the residual charge is swept away. The subsequent green exposure is started when the charge sweeping has ended. It is apparent in FIG. 18 that the green LED starts emitting light immediately prior to green light exposure. After the charge-storing time has ended for exposure to green light as well, the charge is read out and the residual charge is then swept away. In similar fashion thereafter, blue and infrared charges are stored, the charges are read, and the residual charge is swept in synchronization with blue LED light emission and infrared LED light emission. These operations are repeated. In the description above, the function of the photoelectric conversion unit was described for each color, but the photoelectric conversion unit as such does not have a function for separating each color to carry out photoelectric conversion. The photoelectric conversion unit merely repeats the same operation of charge storage, charge reading, and residual charge sweeping. The charge thus read out holds the information of each color and depends entirely on the light source color during charge storage.

It is apparent from the timing chart of the AD conversion unit of FIG. 18 that the photoelectric conversion unit begins AD conversion immediately after the charge of each color is read out. For example, red AD conversion is started immediately after the red charge has been read out. The time interval during the subsequent green exposure is also used, and the red AD conversion is continued concurrently with green exposure. It is apparent from the timing chart (A) of the wireless communication unit of FIG. 18 that the wireless communication unit can begin transmitting the digital signal of the resulting color immediately after the photoelectric conversion of each color has been completed. For example, the transmission of the red digital signal is started immediately after red AD conversion has ended. The subsequent green AD conversion time interval is also used, and the red transmission is continued concurrently with green AD conversion. In similar fashion thereafter, AD conversion and transmission are carried out for green, blue, and infrared.

There may be cases in which transmission cannot be successfully carried out immediately after AD conversion depending on the relationship between the capsule endoscope 502 and the external monitor 504. In such a case, communication is carried out when the communication environment is acceptable, as indicated by the timing chart (B) of the wireless communication unit of FIG. 18. For example, an IR data transmission 592 is carried out more slowly than in the timing chart (A) and is performed immediately prior to the subsequent R data. The G data transmission 594 and the B data transmission 596 are also carried out in delayed fashion, but these communication times can be adjusted as long as the FIFO does not fail because the image buffer 526 of FIG. 13 has reached full capacity.

Figure 19:
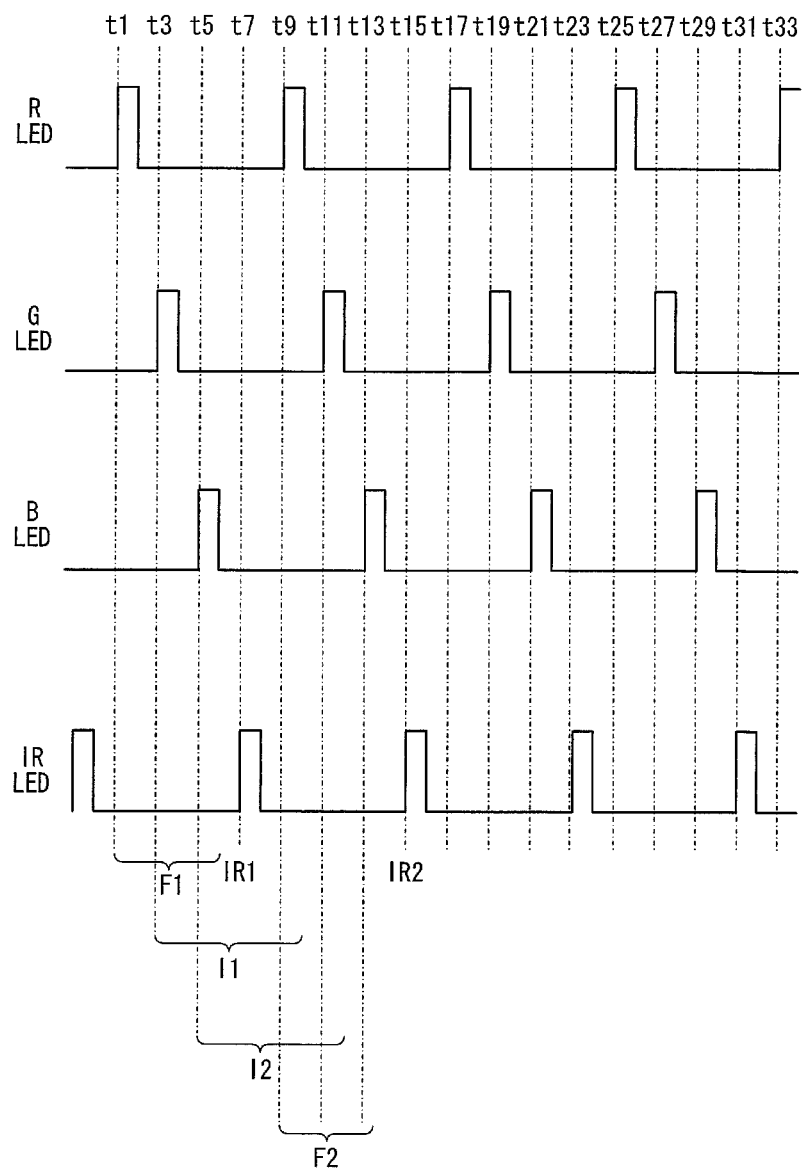
FIG. 19 is a timing chart showing the relationship between the operation of FIG. 18 and color image generation.

FIG. 19 is a timing chart showing the relationship between the timing of the LED lighting of each color and the generation of the color image in the operation of the capsule endoscope 502 of the third embodiment in the color/infrared mode shown in FIG. 18. A single-frame color image indicated by F1 is produced using a red image based on the red LED light emission started at t1, a green image based on the green LED light emission started at t3, and a blue image based on the blue LED light emission started at t5, as shown in FIG. 19. Strictly speaking, the image of each color does not occur at the same point in time because there is a time difference in the light emissions of each color, but the time difference is very slight and is therefore not a problem even when the image of each color is acquired on such a time-sharing basis as long as the photographic object does not move rapidly. In similar fashion, a single-frame color image indicated by F2 is produced using a red image based on the red LED light emission started at t9, a green image based on the green LED light emission started at t11, and a blue image based on the blue LED light emission started at t13. In similar fashion thereafter, a single-frame color image is produced, individual color videos can be recorded as still pictures, and the still pictures can be linked together and recorded as a color video. These colors are processed in the image processing unit 544 of the external monitor 504 shown in FIG. 13. Receiving the data of each color by the external monitor 504 is not necessarily at equal intervals, as shown in the timing chart (B) of the wireless communication unit of FIG. 18, and the relationship of FIG. 19 holds true because the image acquisition timing is determined by the light emission timing of each color LED.

As shown in FIG. 19, the green image based on the green LED light emission started at t3, the blue image based on the blue LED light emission started at t5, and the red image based on the red LED light emission started at t9 complete a set of tricolored RGB data, whereby a single frame of color interpolation data indicated by I1 is produced. Similarly, a single frame of color interpolation data indicated by I2 is produced by the blue image based on the blue LED light emission started at t5, the red image based on the red LED light emission started at t9, and the green image based on the green LED light emission started at t11. In these interpolated images, infrared LED light emission is interposed until a set of RGB colors is completed, the time required to complete an RGB set is slightly extended, and RGB light emission does not occur at equal intervals, resulting in a reduced quality of the color image. Therefore, an interpolated image is used in order to consistently obtain a smooth video.

On the other hand, the infrared image IR1 based on the infrared LED light emission started at t7, and the infrared image IR2 based on the infrared LED light emission started at t15, and so forth, can be recorded as infrared still pictures and can be connected together and recorded as a infrared video, as shown in FIG. 19. Since a color image and an infrared image can be acquired concurrently as described above in the color/infrared mode, the two images can be used concurrently in diagnostic endoscopy, and the two images can also be blended together. Also, when the two images are combined into a still picture, it is possible to use a color interpolated image that is combined with an infrared image because time for acquiring an infrared image is contained within the time intervals for acquiring the color interpolated images. Specifically, the time intervals for acquiring the color interpolated images I1 and I2 both contain time for acquiring an infrared image IR1. Therefore, the color interpolated images I1 and I2, or an average thereof, can be combined with the infrared image IR1.

Figure 20:
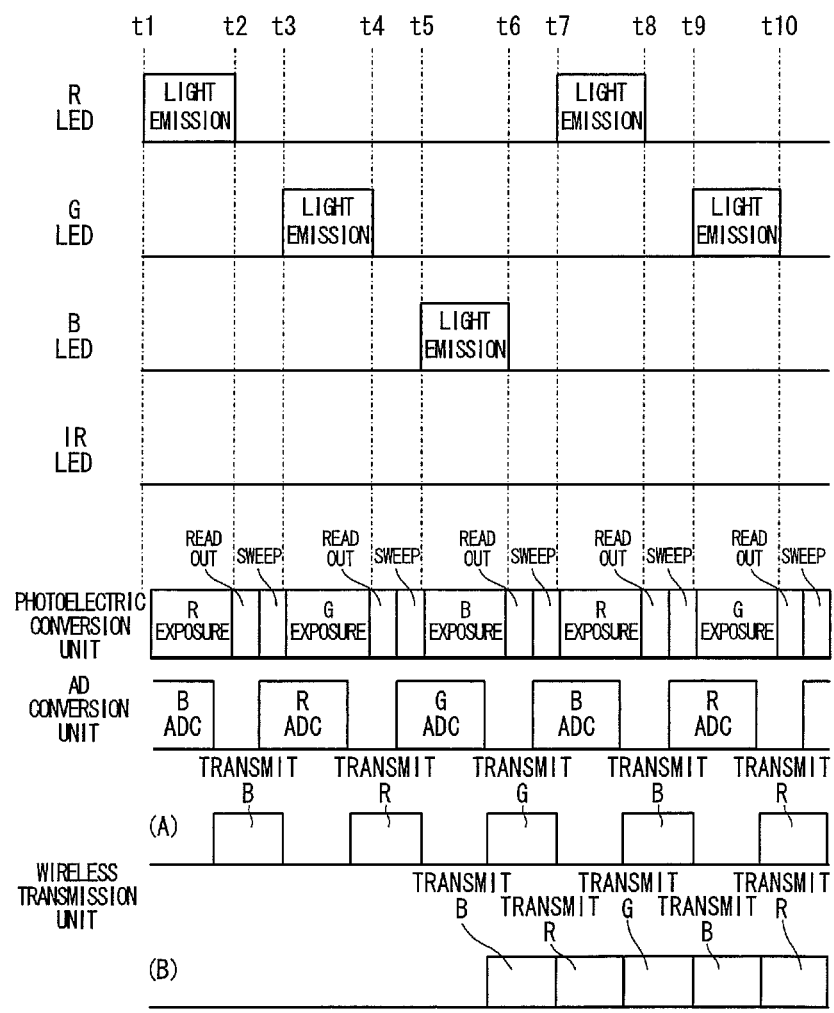
FIG. 20 is an operation timing chart in the fine color mode of the third embodiment.

FIG. 20 is a timing chart showing the relationship between the lighting timing of each LED color, the operation timing of the photoelectric conversion unit, the operation timing of the AD conversion unit, and the operation timing of the wireless communication unit in the operation of the capsule endoscope 502 in the fine color mode according to the third embodiment. In the fine color mode, only a visible light color image is acquired, and the infrared LEDs are not lighted. It is apparent from FIG. 20 that all of the red LEDs are lighted from t1 to t2, all of the green LEDs are lighted from t3 to t4, and all of the blue LEDS are lighted from t5 to t6 in a time-sharing fashion without mutual overlap in timing. When the lighting of the three RGB LED colors has completed one cycle, all of the red LEDs are again lighted from t7 to t8, the green and blue LEDs are then lighted in the same manner, and the time-sharing lighting is repeated with the same cycle. The time from t1 to t6 required to complete a single cycle in this case is shorter than t1 to t8 of FIG. 18, and the video has greater definition. The timing chart of the wireless communication unit (B) of FIG. 20 shows a state in which communication is carried out in a continuous fashion after the communication environment has not been in order for a period of time.

In the case that only visible light is emitted substantially simultaneously in a time-sharing fashion in the fine color mode, as shown in FIG. 20, the angle of view of the imaging lens 508 of FIG. 13 is set to a narrow angle (telescopic) by control of the lens drive unit 512, and the focal position is also set so that the focal point of the visible light is formed on the imaging surface by control of the lens drive unit 512. This is due to the fact that optimum focal positioning is possible because the displacement of the red, green, and blue focal positions is reduced and can be managed by aberration correction in the design of the imaging lens. In this manner, the fine color mode is suitable for observing the state inside a body in very high definition.

Figure 21:
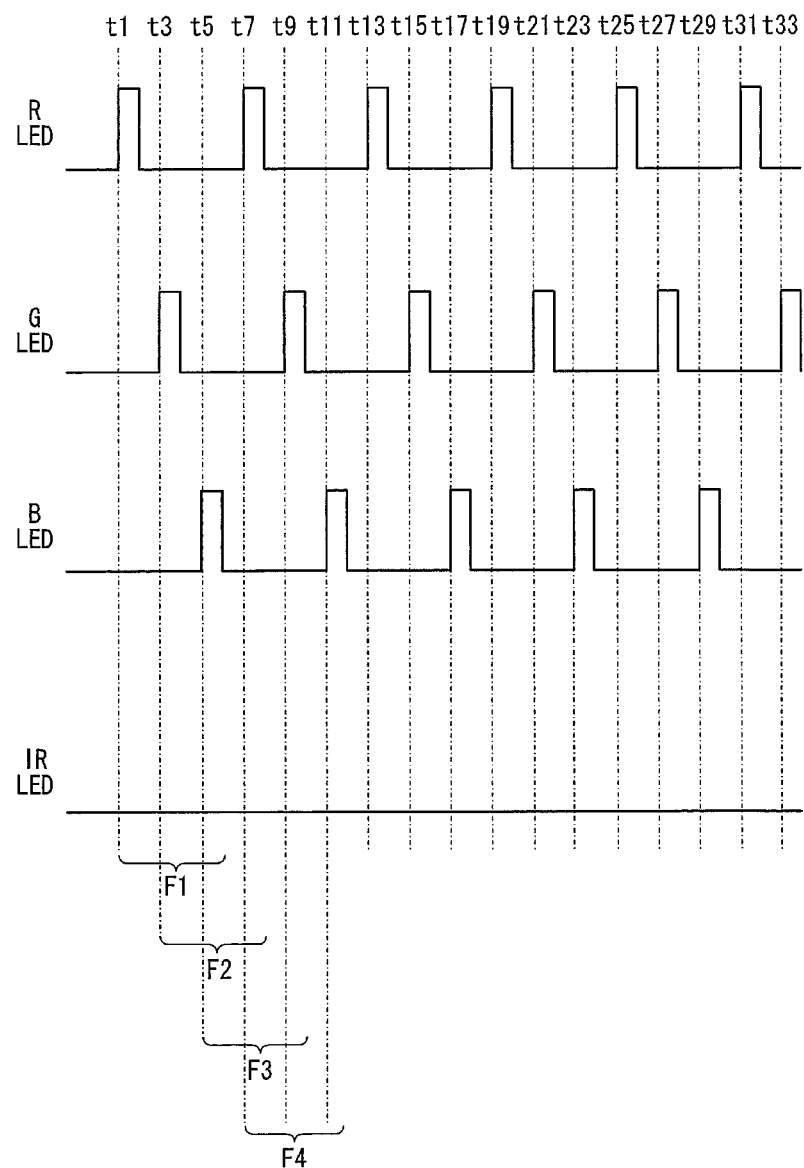
FIG. 21 is a timing chart showing the relationship between the operation of FIG. 20 and color image generation.

FIG. 21 is a timing chart showing the relationship between the timing of the LED lighting of each color and the generation of the color image in the operation of the capsule endoscope 502 of the third embodiment in the fine color mode shown in FIG. 20. As shown in FIG. 19, a single-frame color image indicated by F1 in FIG. 21 is formed by the red image based on the red LED light emission started at t1, the green image based on the green LED light emission started at t3, and the blue image based on the blue LED light emission started at t5. Next, a single-frame color image indicated by F2 is formed by the green image based on the green LED light emission started at t3, the blue image based on the blue LED light emission started at t5, and the red image based on the red LED light emission started at t7. In similar fashion, a single-frame color image indicated by F3 is formed by the blue image based on the blue LED light emission started at t5, the red image based on the red LED light emission started at t7, and the green image based on the green LED light emission started at t9. A single-frame color image indicated by F4 is formed in similar fashion thereafter. In this manner, a smooth high-definition video can be recorded in the fine color mode because a single-frame color image is newly produced in cyclical fashion each time the LED colors newly emit light.

Figure 22:
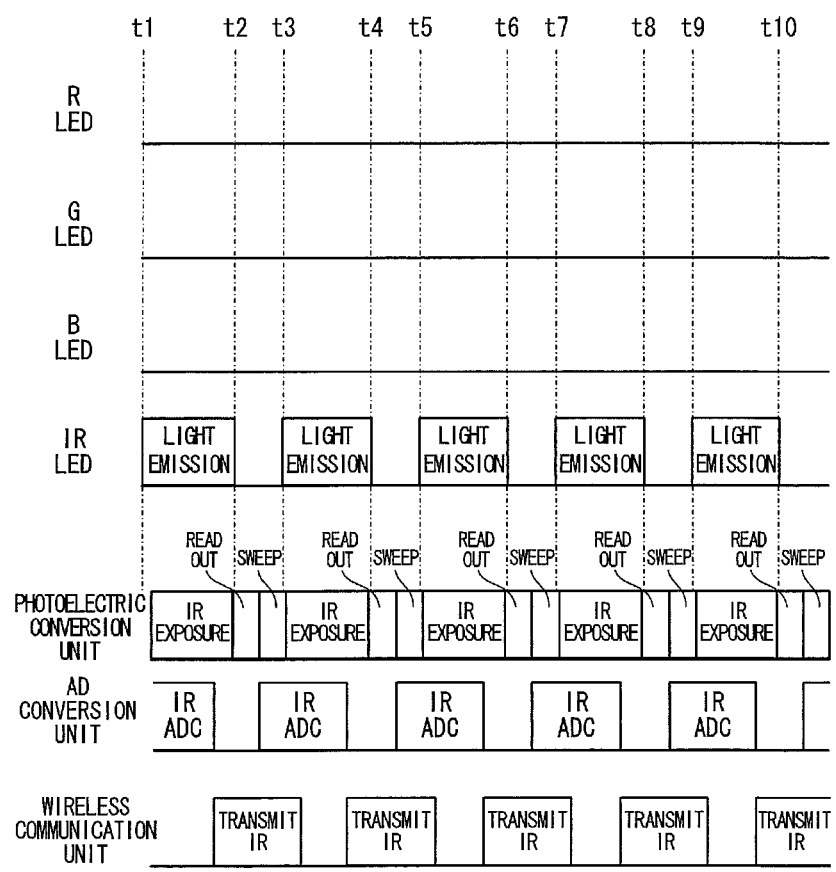
FIG. 22 is an operation timing chart in the infrared mode of the third embodiment.

FIG. 22 is a timing chart showing the relationship between the lighting timing of each LED color, the operation timing of the photoelectric conversion unit, the operation timing of the AD conversion unit, and the operation timing of the wireless communication unit in the operation of the capsule endoscope 502 in the infrared mode according to the third embodiment. In the infrared mode, only an infrared image is acquired, and the LEDs other than the infrared LED do not emit light. It is apparent from FIG. 22 that all of the infrared LEDs emit light during each exposure in the photoelectric conversion unit from t1 to t2 and t3 to t4. In accordance with this, a single-frame infrared image is produced in each cycle. A smooth infrared video can thereby be recorded.

As shown in FIG. 22, in the case that only infrared light is emitted in the infrared mode, the angle of view of the imaging lens 508 of FIG. 13 is set to a narrow angle (telescopic) by control of the lens drive unit 512, and the focal position is also set so that the focal point of the infrared light is formed on the imaging surface by control of the lens drive unit 512. In this manner, the infrared mode is suitable for observing the state inside a body in very high definition.

Figure 23:
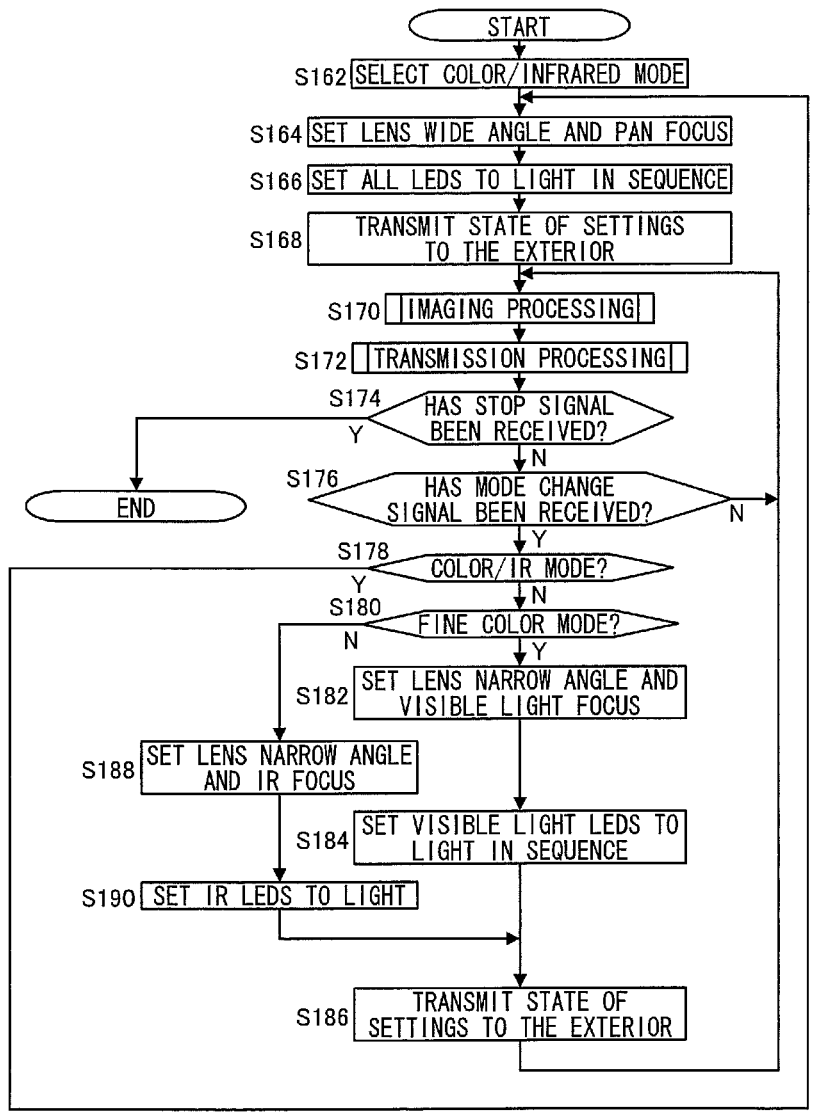
FIG. 23 is a flowchart of an endoscope control unit in the third embodiment.

FIG. 23 is a flowchart of the operation of the endoscope control unit 520 in the third embodiment of FIG. 13. Flow starts when the battery 532 is set in the capsule endoscope 502, and the color/infrared mode is initialized and set in step S162. In response, the imaging lens 508 is set to a wide angle and panfocal state in step S164. Next, in step S166, all of the red, green, blue, and infrared LEDS are set so as to emit light in a sequential cycle in a predetermined order. The fact that these settings are being carried out is transmitted to the exterior in step S168 and reported to the external monitor 504.

Next, image processing is carried out in step S170 and transmission processing is carried out in step S172. The details of these steps are described later. When transmission processing ends, the process proceeds to step S174, and a check is made to determine whether an operation stop signal has been received from the external monitor 504. If such a signal has been received, the flow is immediately ended. On the other hand, if a stop signal has not been received, the process proceeds to step S176, and a check is made to determine whether a mode change signal has been received. If such a signal has been received, the process proceeds to step S178, and a check is made to determine whether the mode thus changed is the color/infrared mode. If the color/infrared mode has been selected, the process returns to step S164, the lens is set to a wide angle and panfocal state, and the process then proceeds to operations in step S166 and thereafter which have already been described.

On the other hand, when the mode thus changed is not the color/infrared mode in step S178, the process proceeds to step S180, and a check is made to determine whether the selected mode is the fine color mode. If the mode is the mode is the fine color mode, the lens angle of view is set to a narrow angle (telescopic) and the visible light focus state is set in step S182. In step S184, only the visible light LEDs are set so as to emit light in a sequential cycle. The process returns to step S170 after these setting states have been transmitted to the exterior in step S186.

When the mode changed in step S180 is not the fine color mode, this indicates that the changed mode is the infrared mode, the process proceeds to step S188, the lens angle of view is set to a narrow angle (telescopic), and the state for focusing infrared light is set. Furthermore, in step S190, only the infrared LED is set to emit light. The process proceeds to step S186, the setting states are transmitted to the exterior, and the process proceeds to step S170.

Figure 24:
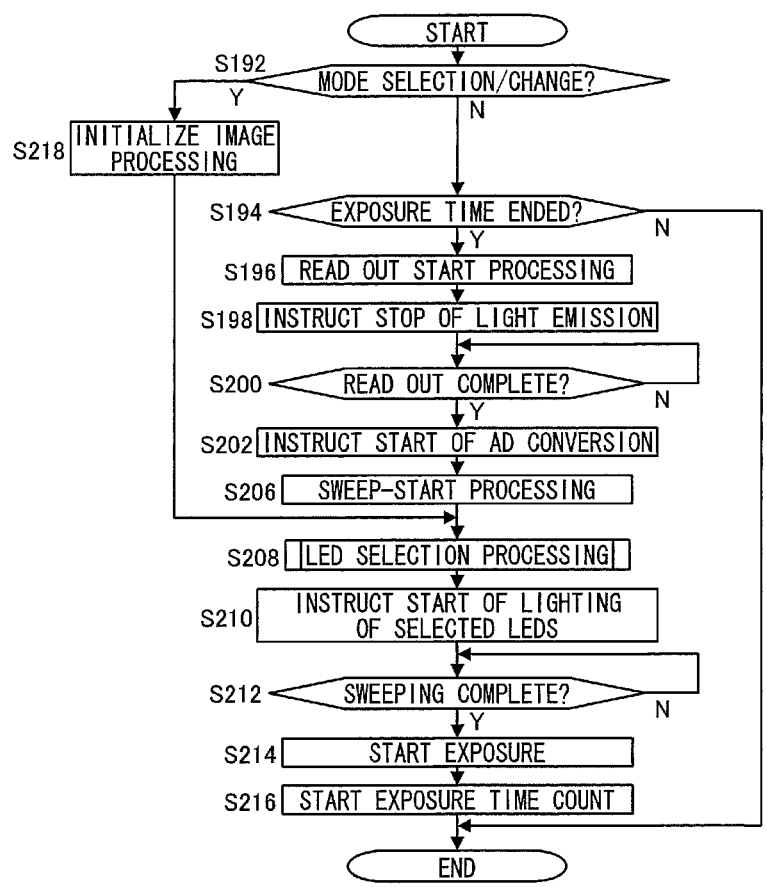
FIG. 24 is a flowchart showing the details of step S170 of FIG. 23.

FIG. 24 is a flowchart showing the details of image processing in step S170 of FIG. 23. When the flow starts, a check is made in step S192 to determine whether a mode has been selected or changed. When a mode has not been selected or changed, the process proceeds to step S194, and a check is made to determine whether exposure time has ended. If the end is detected, the process proceeds to step S196, processing for starting the reading out of stored-charge is carried out. The LEDs are furthermore instructed to stop emitting light in step S198. A check is made in step S200 to determine whether the reading out of the stored charge has been completed, and if not, step S200 is repeated until the reading out is complete.

When the reading out operation is detected to have ended in step S200, the process proceeds to step S202, and an instruction is issued to start AD conversion. The process proceeds to step S206, processing for starting the sweeping away of residual charge is carried out, and the process proceeds to step S208 for LED selection processing. This is processing for selecting LEDs that are to be subsequently lighted and the details are later described. In step S210, an instruction is issued to the LEDs selected in step S208 to start emitting light. Next, in step S212, a check is made to determine whether the sweeping away of stored charge has been completed, and if this is not the case, the process repeats step S212 until the sweeping operation has been completed.

When the operation for sweeping away the stored charge has been completed in step S212, the process proceeds to step S214, and exposure is then started. Exposure time counting is started in step S216, and the flow is ended. On the other hand, if the exposure time has not elapsed in step S194, the flow is immediately ended. When it has been detected that a mode has been selected or changed in step S192, the process proceeds to step S218 where imaging processing is initialized, and the process proceeds to the LED selection processing of step S208.

Figure 25:
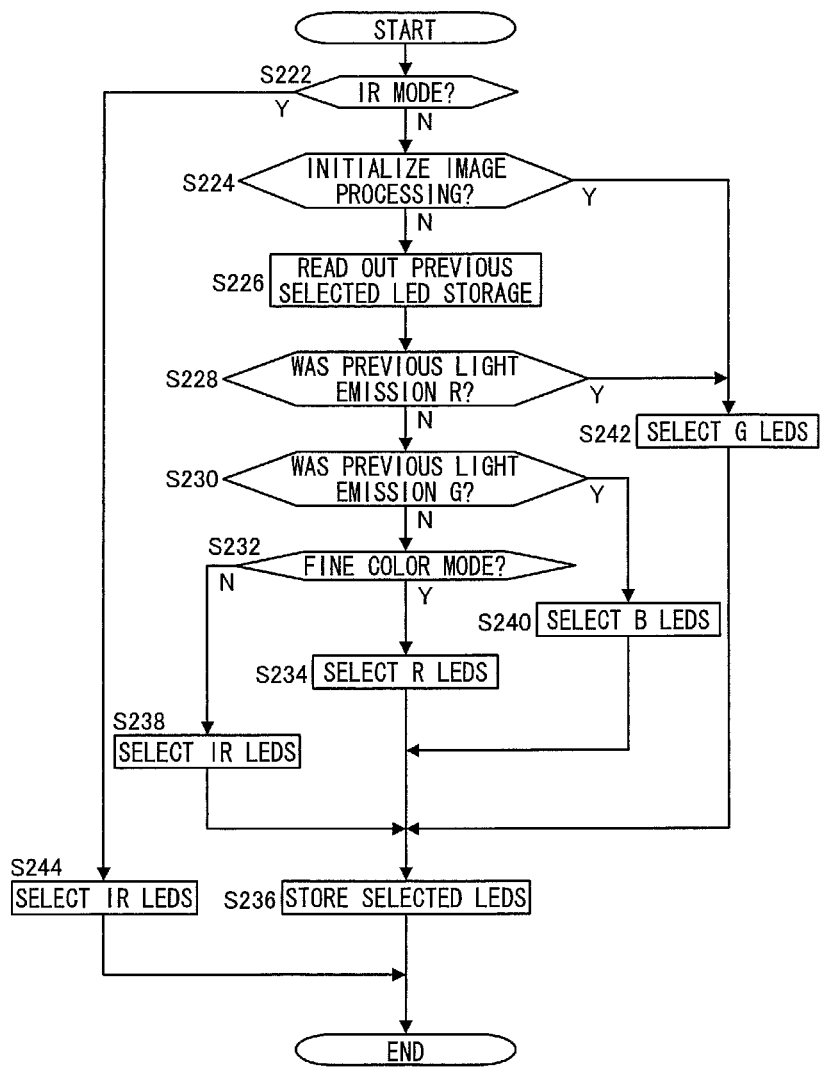
FIG. 25 is a flowchart showing the details of step S208 of FIG. 24.

FIG. 25 is a flowchart showing the details of LED selection processing in step S208 of FIG. 24. When the flow is started, a check is made in step S222 to determine whether the mode is the infrared mode. If not, the mode will be the color/infrared mode or the fine color mode. In this case, the process proceeds to step S224, and a check is made to determine whether image processing has been initialized by step S218 of FIG. 24. If not, the process proceeds to step S226, and the LED storage selected in the previous cycle is read out. In step S228, a check is made to determine on the basis of the storage thus read out whether the LEDs lighted in the previous cycle were the red LEDs. If not, a check is made in step S230 to determine whether the LEDs lighted in the previous cycle were the green LEDs.

In step S230, when the LEDs lighted in the previous cycle were not the green LEDs, the process proceeds to step S232, and a check is made to determine whether the mode is the fine color mode. If so, the red, green, and blue LEDs are being lighted in a cyclical fashion. In this case, if the LEDs lighted in the previous cycle were not the red LEDs or the green LEDs, it means that the blue LEDS were lighted, and the process therefore proceeds from step S232 to step S234 where the red LEDs as the next color in sequence are selected. The selection results are stored away in step S236 and the flow is ended.

On the other hand, the mode is the color/infrared mode when it is not detected that the mode is the fine color mode in step S232. In this case, the red, green, blue, and infrared LEDs are being lighted in a cyclical fashion. Also in this case, if the LEDs lighted in the previous cycle were not the red LEDs or the green LEDs, it means that the blue LEDS were lighted the process therefore proceeds from step S232 to step S238 where the infrared LEDs as the next color in sequence are selected. The selection results are stored away in step S236 and the flow is ended.

When it has been determined in step S228 that the LEDs lighted in the previous cycle were the red LEDs, the process proceeds to step S242, and the green LEDs as the next color in sequence are selected. The selection results are stored away in step S236 and the flow is ended. When it has been determined in step S230 that the LEDs lighted in the previous cycle were the green LEDs, the process proceeds to step S240, and the blue LEDs as the next color in sequence are selected. The selection results are stored away in step S236 and the flow is ended. When it has been determined that the mode is the infrared mode in step S222, the process proceeds to step S244 and the infrared LEDs are selected. Since the infrared LEDS are always selected in the infrared mode, the selection results are not particularly required to be stored and the flow is immediately ended. When the imaging processing has been in step S224, the process proceeds to step S242 and the green LEDs are selected the LEDs to be lighted first.

Figure 26:
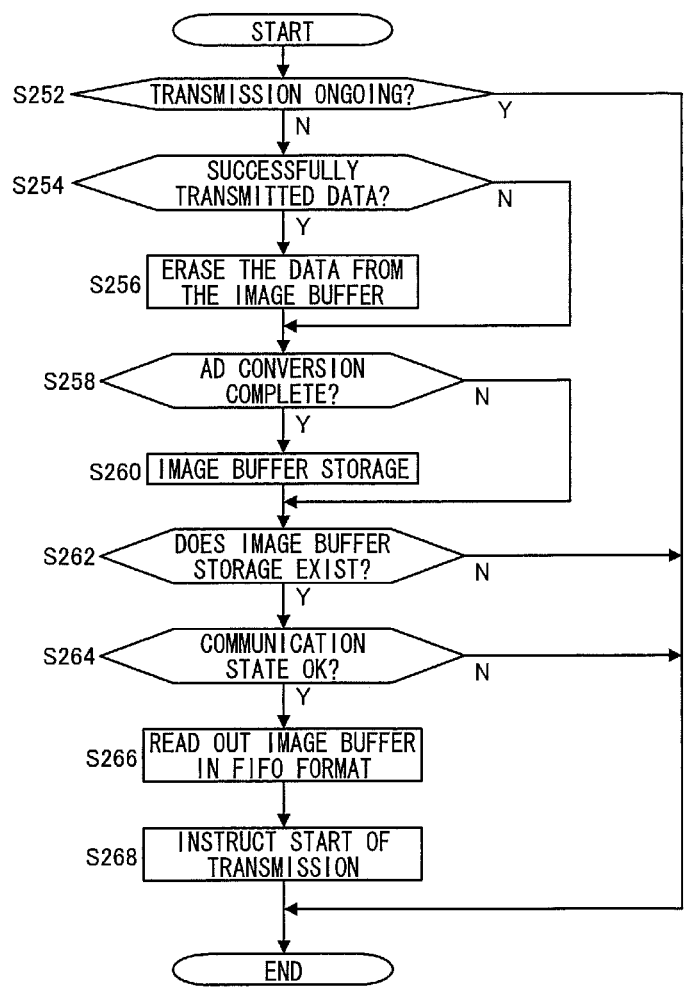
FIG. 26 is a flowchart showing the details of step S172 of FIG. 23.

FIG. 26 is a flowchart showing the details of the transmission processing of step S172 of FIG. 23. When the flow is started, a check is made in step S252 to determine whether data is being transmitted. If transmission is not ongoing, the process proceeds to step S254, and a check is made to determine whether data has been successfully transmitted. If so, the data is deleted from the image buffer in step S256 and the process proceeds to step S258. On the other hand, if there is no data that has been successfully transmitted as determined in step S254, the process proceeds directly to step S258.

In step S258, a check is made to determine whether AD conversion has been completed, and if so, the AD-converted data is stored in the image buffer in step S260, and the process proceeds to step S262. On the other hand, if AD conversion is not finished, the process proceeds directly to step S262. In step S262, a check is made to determine whether there is data stored in the image buffer, and if so, a check is made in step S264 to determine whether the communication state is OK. If so, the data is read out in FIFO (first in, first out) format from the image buffer in step S266, an instruction is issued in step S268 to start transmitting the data thus read out, and the flow is ended. The flow is immediately ended when data transmission is ongoing in step S252, when there is no data stored in the image buffer in step S262, or when the communication state is not OK in step S264.

Figure 27:
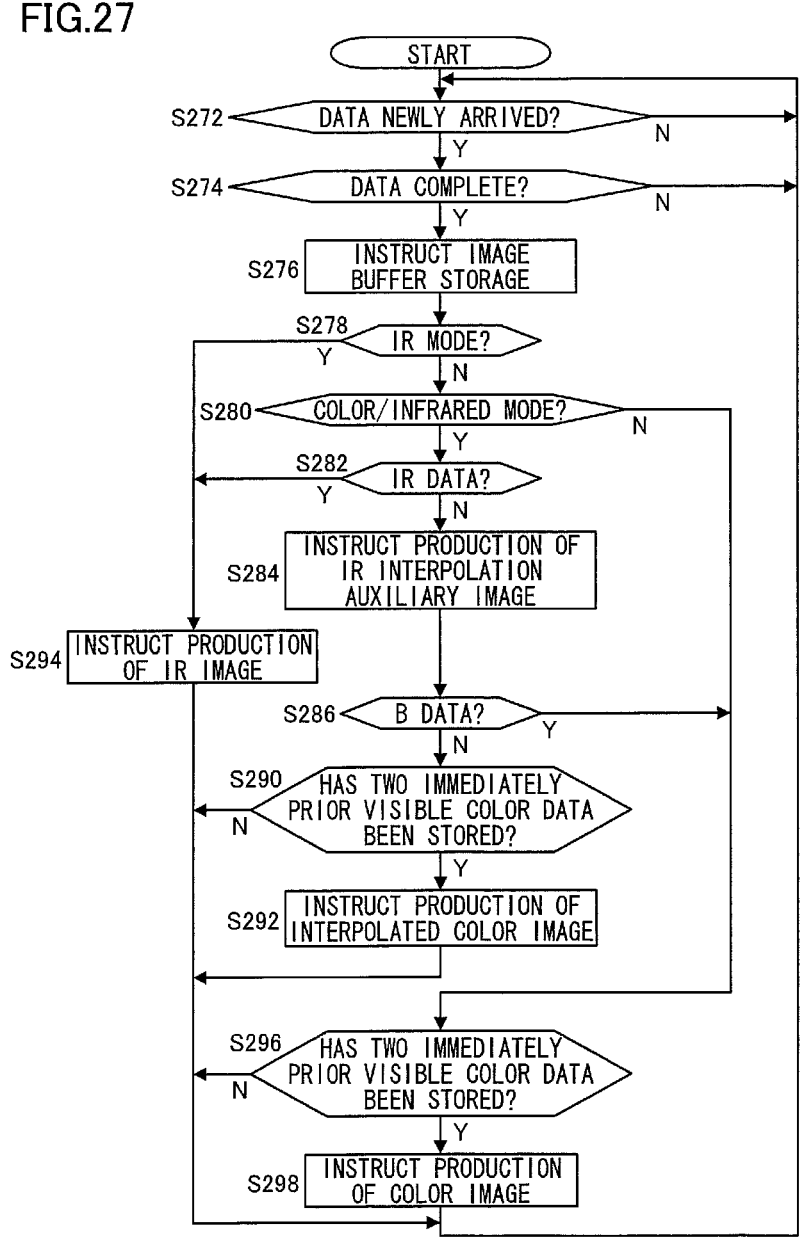
FIG. 27 is a flowchart showing the operation of the monitor control unit in the third embodiment.

FIG. 27 is a flowchart showing the operation of the monitor control unit 540 of the external monitor 504 in the third embodiment of FIG. 13. The flow starts when communication with the capsule endoscope 502 is started. When the flow starts, a check is made in step S272 to determine whether image data has newly arrived. If there is newly arrived data, the process proceeds to step S274, and a check is made to determine whether the newly arrived data is complete. If the data is complete, the process proceeds to step S276 where an instruction is issued to store the data in the image buffer 538, and the process proceeds to step S278. The process returns to step S272 when there is no newly arrived data in step S272 or when the newly arrived data is not complete in step S274.

In step S278, a check is made to determine whether the mode is the infrared mode, and if it is not, a check is made in step S280 to determine whether the mode is the color/infrared mode. If the mode is the color/infrared mode, the process proceeds to step S282, and a check is made to determine whether newly arrived data is infrared image data. If not, it means that the image data is red, green, or blue image data, and the process proceeds to step S284. An instruction is issued to produce an interpolated auxiliary image of the infrared image from these data, and the process proceeds to step S286. The instruction of step S284 is an instruction to use in an auxiliary fashion the information of the visible-light image data obtained with timing between infrared images when interpolation is carried out on the basis of the infrared image data in order to obtain a smooth infrared video.

In step S286, a check is made to determine whether the newly arrived data is blue image data. If not, it means that the newly arrived data is red image data or green image data, and the process proceeds to step S290 where a check is made to determine whether the two visible color data immediately prior to the newly arrived data have been stored. If such data has been stored, a set of three color data red, green, and blue is completed with the newly arrived data, whereupon the process proceeds to step S292 where an instruction is issued to produce an interpolated color image and the process returns to step S272. The image produced by the instruction of step S292 corresponds to the color interpolated images I1 and I2 of FIG. 19.

When the mode is determined to be the infrared mode in step S278, the newly arrived data is infrared image data and the process proceeds to step S294 where an instruction is issued to produce an infrared image. The process then returns to step S272. The process proceeds to step S294 also when the newly arrived data is infrared image data in step S282. On the other hand, the process proceeds to step S296 when the newly arrived data is determined to be blue image data, and a check is made to determine whether the image data of the two immediately prior colors (red and green in this case) is stored in the image buffer. If such data has been stored, a set of three continuous colors is complete and the process therefore proceeds to step S298. An instruction is issued to produce a color image and the process returns to step S272. The image produced by this instruction corresponds to the color image F1 or F2 of FIG. 19.

When the mode is not determined to be the color/infrared mode in step S280, this means that the mode is the color/infrared mode and the process proceeds to step S296 where a check is made to determine whether the two visible color data immediately prior have been stored. If the two colors are present, an instruction is issued to produce a color image in step S298. The image produced by this instruction corresponds to the color images F1, F2, F3, and so forth of FIG. 21. The process immediately returns to step S272 when two visible color data immediately prior have not been stored in step S290 or step S296.

Embodiment 4

Figure 28:
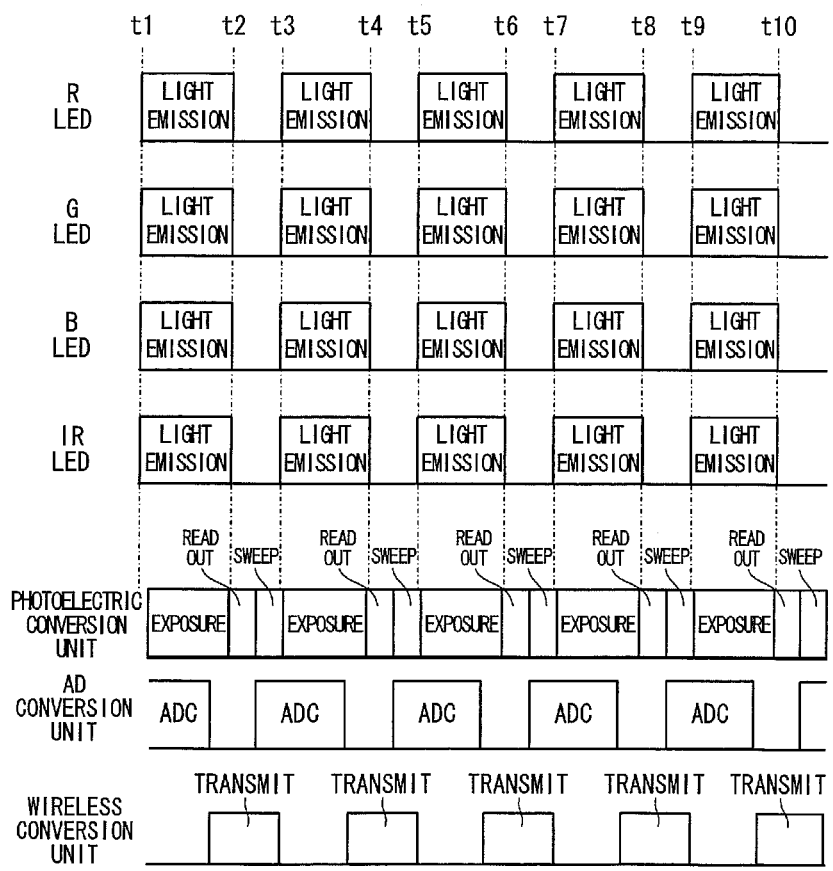
FIG. 28 is an operation timing chart in the color/infrared mode of the fourth embodiment of the present invention (Embodiment 4)

FIG. 28 is a timing chart showing the relationship between the operation timings of the fourth embodiment of the present invention. The fourth embodiment has essentially the same configuration as the endoscopic system shown in FIGS. 13 to 17, and in the description below, the reference numerals of the block diagram of FIG. 13 are used as the description requires. The difference between the third and fourth embodiments is the configuration of the CIGS imaging sensor and the timing of the lighting of the LEDs. More specifically, the CIGS imaging sensor 510 of the third embodiment does not have a color filter, and the color separation is determined by the time-sharing light emission of the LEDs. However, the CIGS imaging sensor 510 in the fourth embodiment has a color filter such as that shown in FIGS. 7 to 10, and the CIGS imaging sensor itself carries out color separation in the same manner as the first and second embodiments. The light emission of the LEDs is carried out simultaneously for all color rather than a time-sharing fashion.

FIG. 28 is a timing chart showing the relationship between the lighting timing of the LEDs, the operation timing of the photoelectric conversion unit, the operation timing of the AD conversion unit, and the operation timing of the wireless communication unit, in the operation of the color/infrared mode in the capsule endoscope 502 of the fourth embodiment. As described above, all of the red LEDs, all of the green LEDs, all of the blue LEDs, and all of the infrared LEDs are simultaneously lighted in the exposure timing of the photoelectric conversion unit. Each LED may continuously emit light instead of the on/off light emission configuration shown in FIG. 28. In the color/infrared mode of FIG. 28, the angle of view of the imaging lens 508 is set to a wide angle under the control of the lens drive unit 512, the focal depth is given a deeper setting, and the focal position is also set so as to form a pan focus to include visible light and infrared light by control of the lens drive unit 512. Such imaging lens control is the same as the color/infrared mode of FIG. 18.

Figure 29:
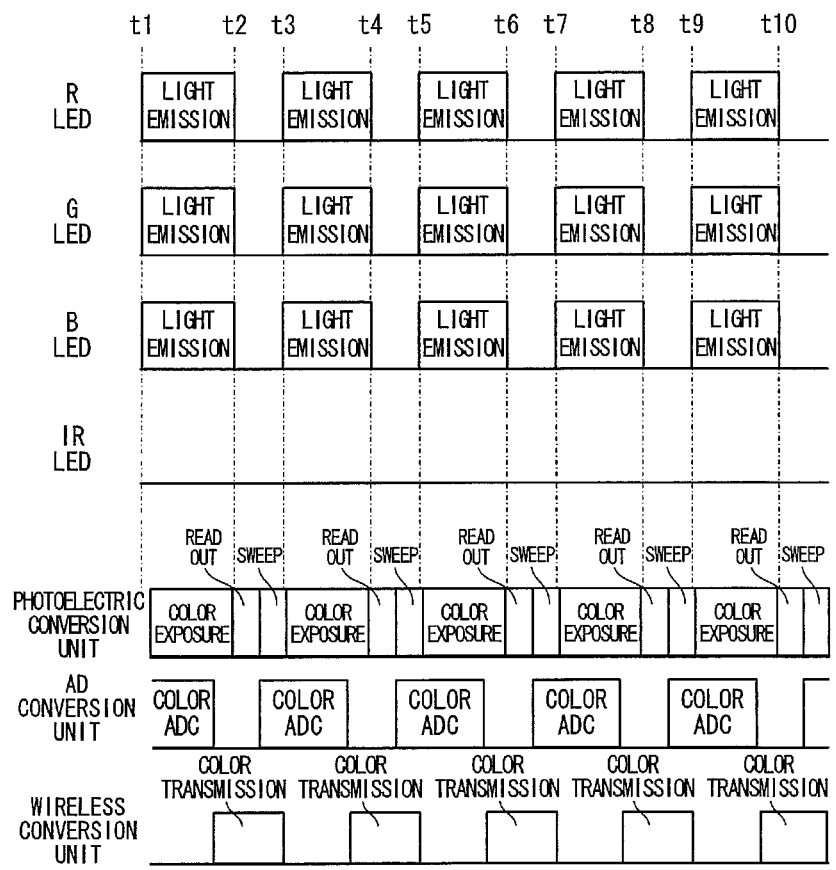
FIG. 29 is an operation timing chart in the fine color mode of the fourth embodiment.

FIG. 29 is a timing chart showing the relationship between the lighting timing of the LEDs, the operation timing of the photoelectric conversion unit, the operation timing of the AD conversion unit, and the operation timing of the wireless communication unit, in the operation of the fine color mode in the capsule endoscope 502 of the fourth embodiment. It is apparent in FIG. 29 that all of the red LEDs, all of the green LEDs, and all of the blue LEDs emit light simultaneously in the exposure timing of the photoelectric conversion unit. The infrared LEDs do not emit light. As shown in FIG. 29, the angle of view of the imaging lens 508 of FIG. 13 is set to a narrow angle (telescopic) under the control of the lens drive unit 512 in the case that only visible light is emitted simultaneously in the fine color mode, and the focal position is also set so as to form the focal point of the visible light on the imaging surface by control of the lens drive unit 512. Such imaging lens control is the same as the fine color mode of FIG. 20.

The timing chart of the infrared mode in the fourth embodiment is the same as FIG. 22 in the third embodiment. In the same manner as the infrared mode in FIG. 22, the angle of view of the imaging lens 508 in the infrared mode is set to a narrow angle (telescopic) under the control of the lens drive unit 512, and the focal position is also set so as to form the focal point of the infrared light on the imaging surface by control of the lens drive unit 512. The color/infrared mode in the fourth embodiment is suitable for roughly observing the overall state inside a body, and the fine color mode and the infrared mode are suitable for observing the state inside a body in very high definition. These points are the same as the third embodiment.

The endoscopic system in the third and fourth embodiments described above are configured having a capsule endoscope and an external monitor, but the implementation of the present invention is not limited thereto. For example, also possible is a configuration in which a tube connection is provided between the interior and exterior of the body as in an ordinary endoscope. In such a case, wired communication using cables inside the tube is used in place of wireless communication via the antennas 530 and S46 in FIG. 13, and it is also possible to provide known components such as vent tubes, fluid conduits, and tube-bending mechanisms inside the tube. It is also possible to transmit image information between the interior and exterior of the body by drawing out images acquired inside the body via fiber or other optical means in place of electrical signals. In such a case, the CIGS image sensor is disposed outside of the body. It is also possible to dispose the light-emitting part of the light source outside of the body and to direct the light into the body using a light guide. In such a configuration, the light source arrangement of FIGS. 14 to 17 is understood to be an emitter of a light source rather than a light-emitting part. In the case that a light guide is used, a light source emitter is not necessarily required for each color, and the light from each light-emitting part may be directed into the interior of the body using the light guide and then irradiated from a shared injection aperture. Implementation of the various aspects of the present invention described in the third and fourth embodiments described above is not limited to an endoscope, and suitable implementation is also possible in imaging, observation, and recording equipment in which various imaging sensors are used.

The various technical aspects disclosed above are described in summary below.

First, the first technical aspect disclosed in the present specification relates to a photoelectric conversion sensor.

Photoelectric conversion sensors with various characteristics are constantly being proposed. For example, in Patent Documents 1 and 2 and the like, there are proposals related to photoelectric conversion sensors that use a CIGS thin film.

However, the various characteristics being considered in photoelectric conversion sensors cannot be said to be sufficiently utilized, and there are many problems that require further research.

In view of the above, the first technical aspect disclosed in the present specification provides advantageous use of characteristics that are being studied in photoelectric conversion sensors.

More specifically, as an example of the first technical aspect in the present specification, a camera capable of live viewing is provided comprising an optical finder; an imaging sensor having a quantum efficiency of 60% or higher in the visible light region; optical splitting means for splitting light in the visible light region from a photographic object in order to observe the photographic object by the optical finder and form an image by the imaging sensor; and a display unit for displaying the photographic object on the basis of the output of the imaging sensor. Proposed as a sensor having a quantum efficiency of 60% or higher in the visible light region is a CIGS sensor (a light sensor composed the materials copper, indium, gallium, and selenium) or the like, and by using a configuration that uses such a high sensitivity imaging sensor, it is possible to prevent the photographic object being observed in the optical finder from becoming dark because only a small percentage of the luminous energy is required when a portion of the light in the visible light region from the photographic object is diverted to the imaging sensor by optical splitting means for live viewing. Therefore, the photographic object can be observed simultaneously using the optical finder and the display unit.

In accordance with a specific aspect disclosed in the present specification, the imaging sensor has a quantum efficiency of 60% or higher even in the infrared region, and the optical splitting means has wavelength selectivity for directing light in the infrared region from the photographic object to the imaging sensor. Light in the infrared region that is not required in the optical finder can thereby be used in an imaging sensor having high sensitivity in the infrared region, and the output of the imaging sensor can be used for a night vision camera.

In accordance with another specific aspect, the camera capable of live viewing disclosed in the present specification has an infrared cut-off filter for preventing light in the infrared region from being incident on the imaging sensor. This makes it possible to perform live viewing on the basis of light in the visible light region without affecting sensitivity in the infrared region. In accordance with another specific aspect, the camera capable of live viewing disclosed in the present specification has a visible light cut-off filter for preventing light in the visible light region from being incident on the imaging sensor that can be used in place of the infrared cut-off filter. This makes it possible to use the output of the imaging sensor for a night vision camera without affecting sensitivity in the infrared region.

In accordance with another aspect disclosed in the present specification, there is provided a camera capable of live viewing, characterized in having an optical finder; an imaging sensor having sensitivity in the visible light region and the infrared region; optical splitting means for splitting light in the visible light region from a photographic object in order to observe the photographic object by the optical finder and form an image by the imaging sensor, the optical splitting means having wavelength selectivity for directing light in the infrared region from the photographic object to the imaging sensor; and a display unit for displaying the photographic object on the basis of the output of the imaging sensor. Light in the visible light region from the photographic object can thereby be provided to an imaging sensor image and to photographic object observation via the optical finder. Light in the infrared region can be maximized by the imaging sensor and the output of the imaging sensor can be used for a night vision camera.

In accordance with the another specific aspect, the camera capable of live viewing disclosed in the present specification has a recording imaging unit for forming an image in order to record light in the visible light region from the photographic object. This allows the imaging sensor to function as an imaging unit for a night vision camera and can record the output.

A specific aspect disclosed in the present specification is a camera capable of live viewing provided with an infrared cut-off filter for preventing light in the infrared region from being incident on the imaging sensor, whereby live viewing based on light in the visible light region is made possible without sensitivity in the infrared region being affected; and another detailed aspect is that there is provided a visible light cut-off filter for preventing light in the visible light region from being incident on the imaging sensor that can be used in place of the infrared cut-off filter, whereby the output of the imaging sensor can be used for a night vision camera without sensitivity in the visible light region being affected. In the case that the configuration is a night vision camera, recording means for recording the images of the imaging sensor can be provided.

In accordance with another aspect disclosed in the present specification, there is provided a camera for live viewing, characterized in comprising an optical finder; an imaging sensor having a quantum efficiency of 60% or higher in a visible light region; optical splitting means for splitting light from a photographic object in order to observe the photographic object by the optical finder and form an image by the imaging sensor; and a display unit for displaying the photographic object for live viewing on the basis of the output of the imaging sensor. This makes it possible to provide a camera for live viewing that is capable of directing light from a photographic object to an imaging sensor by using optical path switching means, and observing images invisible to the unaided eye by using a highly sensitive imaging sensor when the photographic object is dark and difficult to observe through the optical finder. This characteristic is useful in camera composition or the like during flash photography of a dark object.

In accordance with a specific aspect disclosed in the present specification, the imaging sensor has a quantum efficiency of 60% or higher even in an infrared region. Such high sensitivity in the infrared region in an imaging sensor is useful for an night vision camera. A specific aspect of the camera described above is that an infrared cut-off filter is provided for preventing light in the infrared region from being incident on the imaging sensor, thereby making live viewing possible on the basis of visible light without affecting the infrared region sensitivity of the imaging sensor. In another specific aspect, a visible light cut-off filter is provided for preventing light in the visible light region from being incident on the imaging sensor, the visible light cut-off filter being capable of being used in place of the infrared cut-off filter. It is thereby possible to use the output of the imaging sensor for a night vision camera without affecting sensitivity in the visible light region.

In accordance with another specific aspect disclosed in the present specification, recording means is provided for recording images from the imaging sensor. This makes it possible to carry out image recording of images in the visible light region invisible to the unaided, and to record the images of a night vision camera. In accordance with another specific aspect, the camera capable of live viewing disclosed in the present specification is provided with automatic focusing means for adjusting the focus on the imaging sensor, and imaging by the imaging sensor in the various aspects described above is carried out in a state in which the focus has been automatically adjusted. All of the various aspects described above have a recording and imaging unit in which imaging is carried out for recording visible light from the photographic object, and is advantageous for use in a autofocus digital single-lens reflex camera in which light from the photographic object is not incident on the recording and imaging unit when the light from the photographic object is incident on the imaging sensor.

Next, the second technical aspect disclosed in the present specification relates to a photoelectric conversion sensor.

Photoelectric conversion sensors with various characteristics are constantly being proposed. For example, in Patent Documents 1 and 2 and the like, there are proposals related to photoelectric conversion sensors that use a CIGS thin film.

However, the various characteristics being considered in photoelectric conversion sensors cannot be said to be sufficiently utilized, and there are many problems that require further research.

In view of the above, the second technical aspect disclosed in the present specification provides advantageous use of characteristics that are being studied in photoelectric conversion sensors.

More specifically, as an example of the second technical aspect in the present specification, an autofocus camera is provided comprising an imaging unit; a sensor having a quantum efficiency of 60% or higher in a visible light range for detecting a focal point adjustment state in the imaging unit; and a control unit for outputting a control signal for adjusting the focal point on the imaging unit on the basis of the output from the sensor. Proposed as a sensor having a quantum efficiency of 60% or higher in the visible light region is a CIGS sensor (a light sensor composed of the materials copper, indium, gallium, and selenium) or the like, and by using a configuration in which the control signal of the autofocus is outputted on the basis of the output of such a high sensitivity sensor, it is possible to automatically focus a dark photographic object where focus point detection by conventional means is impossible. The speed and reliability of focus detection for a dark photographic object are thereby improved, and conventionally required auxiliary illumination or the like for focal adjustments is not needed.

In accordance with a specific aspect disclosed in the present specification, the sensor has a quantum efficiency of 60% or higher even in the infrared region, and has an infrared cut-off filter for preventing light in the infrared region from being incident on the sensor. High-sensitivity characteristics in the visible light region of the sensor can thereby be used without affecting focus detection performance. In accordance with another specific aspect of the camera described above, the infrared cut-off filter can be removed from the optical path to the sensor, and the quantum efficiency of 60% or higher in the infrared region of the sensor is used when the infrared cut-off filter is removed. More specifically, the quantum efficiency of 60% or higher in the infrared region of the sensor is used by making use of the visible light cut-off filter that is used in place of the infrared cut-off filter, and the sensor can be used as a focus detection sensor when imaging in the infrared region.

In accordance with another specific aspect disclosed in the present specification, dimming means is provided for limiting the amount of incident light on the sensor. A sensor having a quantum efficiency of 60% or higher in the visible light region can thereby be used in a wide dynamic range. In accordance with another specific aspect, the sensor has gain control means, and the sensor sensitivity is adjusted by the dimming means and the gain control means.

In accordance with another specific aspect disclosed in the present specification, an autofocus camera is provided comprising an imaging unit; a sensor having a wide sensitivity range from the visible light region to infrared for detecting the state of focal point adjustment on the imaging unit; a control unit for outputting a control signal for adjusting the focal point on the imaging unit on the basis of the output from the sensor; and an infrared cut-off filter and a visible light cut-off filter that are inserted into the optical path to the sensor and are mutually interchangeable in order to switch the sensitivity region of the sensor. This makes it possible to use a sensor having a wide sensitivity region and to detect the focal point in the visible light region or the infrared region in accordance with the condition of the imaging unit.

In accordance with another specific aspect disclosed in the present specification, the imaging unit has a wide sensitivity region from the visible light region to infrared, the infrared cut-off filter is inserted into the optical path to the sensor when the imaging unit forms an image in the visible light region, and the visible light cut-off filter is inserted into the optical path to the sensor when the imaging unit forms an image in the infrared region.

In accordance with another aspect disclosed in the present specification, there is provided an autofocus camera characterized in comprising an imaging unit; a sensor for detecting the state of focal point adjustment on the imaging unit, a control unit for outputting control signals for adjusting the focal point to the imaging unit on the basis of the output from the sensor; and dimming means for limiting the amount of incident light on the sensor. This makes it possible to detect the focal point in a wide dynamic range while using a sensor with high sensitivity.

In accordance with a more specific aspect disclosed in the present specification, usage means is provided for using the luminous energy that is no longer incident on the sensor due to the dimming means. An example of usage is measurement means, or estimation means of the focal point detection area in the photographic object region. The output of such usage means may be used in combination for more advantageous focal point adjustment.

In accordance with another aspect disclosed in the present specification, there is provided an autofocus camera characterized in comprising an imaging unit having sensitivity in the visible light region; a visible light sensor having sensitivity in the visible light region for detecting the state of adjustment of the focal point on the imaging unit; an infrared sensor having sensitivity in the infrared region; a processing unit for estimating the portion for which focal point detection is to be carried out using the visible light sensor in the photographic object region on the basis of the output of the infrared sensor; and a control unit for outputting control signals for adjusting the focal point on the imaging unit on the basis of the output of the visible light sensor. Therefore, more suitable focus point detection is possible.

In accordance with a more specific aspect disclosed in the present specification, a visible light sensor and an infrared sensor having sensitivity in the infrared region are not necessarily required to be separately provided, and it is also possible to interchangeably use a single sensor having a sensitivity region from visible light to infrared.

Next, a third technical aspect disclosed in the present specification relates to a camera capable of imaging visible light images and infrared light images.

Various uses for visible light images and infrared light images are being studied for various objectives. In order to achieve these objectives, color sensors that are capable of sensing light in the visible light region as well as light in the infrared region have been proposed.

However, there are many problems that require further research in relation to the acquisition and use of visible light images and infrared light images.

In view of the above, the third technical aspect disclosed in the present specification provides a camera capable of imaging visible light images and infrared light images, the camera being capable of acquiring and using visible light images and infrared light images in a practical manner.

More specifically, as an example of the third technical aspect in the present specification, a camera capable of imaging visible light images and infrared light images is disclosed, characterized in comprising a lens optical system; an imaging unit for receiving light from the lens optical system, the imaging unit having a wide sensitivity range from the visible light region to infrared; a focal position detection unit for detecting the position of the lens optical system adapted to form a visible light image on the imaging sensor when the imaging unit forms an image in the visible light region, and for detecting the position of the lens optical system adapted to form an infrared light image on the imaging unit when the imaging unit forms an image in the infrared region; and a control unit for switching, in a coordinated manner, the functions of the imaging unit and the functions of the focal position detection unit between forming a visible light image and forming an infrared light image. This makes it possible to acquire a focused image regardless of the difference in wavelength by using a single-plate imaging unit having a wide sensitivity region from the visible light region to infrared.

In accordance with a more specific aspect disclosed in the present specification, the focal point detection unit comprises a sensor having a wide sensitivity region from the visible light region to infrared, an infrared cut-off filter capable of being inserted into the optical path to the sensor, and a visible light cut-off filter capable of being inserted into the optical path to the sensor; and the control unit inserts the infrared cut-off filter into the optical path to the sensor when the imaging unit forms an image in the visible light region, and inserts the visible light cut-off filter into the optical path to the sensor when said imaging unit forms an image in the infrared region. The sensor of the focal point detection unit may also use the same configuration for detecting the focal point of the visible light image and the infrared light image. In accordance with a more specific aspect, in the implementation of the present invention described above, the imaging unit or the focal point detection unit or both preferably have a quantum efficiency of 60% or higher in the visible light region.

In accordance with another aspect disclosed in the present specification, a camera capable of imaging visible light images and infrared light images is disclosed, characterized in comprising a lens optical system; an imaging unit for receiving light from the lens optical system, the imaging unit having a wide sensitivity range from the visible light region to infrared; a focal position detection unit for detecting the position of the lens optical system adapted to form a visible light image on the imaging sensor, or the position of the lens optical system adapted to form an infrared light image on the imaging sensor; and a control unit for the corrective driving of the lens optical system from the focal point detection position over a distance equal to the difference between the focal position of the visible light image and the infrared light image; and a recording unit for recording one among the visible light image and the infrared light image on the basis of the output of the imaging unit prior to the corrective driving by the control unit, and recording the other among the visible light image and the infrared light image on the basis of the output of the imaging unit after corrective driving by the control unit. This makes it possible to substantially simultaneously acquire a focused visible light image and infrared light image regardless of the wavelength by using a single-plate imaging unit having a wide sensitivity region from the visible light region to infrared. As a specific aspect in the camera described above as well, the imaging unit preferably has a quantum efficiency of 60% or higher in the visible light region.

In accordance with another specific aspect disclosed in the present specification, an image processing unit is provided for processing the visible light image and the infrared light image recorded by the imaging unit, and in a more specific aspect, the image processing unit blends the visible light image and the infrared light image. The photographic object can be advantageously analyzed by blending the visible light image and the infrared light image substantially simultaneously imaged in a state with both images in focus.

In accordance with another specific aspect disclosed in the present specification, the recording unit records both the visible light image and the infrared light image on the basis of the output of the imaging unit prior to the corrective driving by the control unit, and records both the visible light image and the infrared light image on the basis of the output of the imaging unit after the corrective driving by the control unit.

For example, the image processing unit is provided for processing the visible light image recorded by the recording unit prior to the corrective driving by the control unit and the visible light image recorded by the recording unit after the corrective driving by the control unit; more specifically, it is possible to obtain a focused visible light image in a compact soft-focus state by blending these two visible light images.

Similarly, the image processing unit is provided for processing the infrared light image recorded by the recording unit prior to correction driving by the control unit and the infrared light image recorded by the recording unit after the corrective driving by the control unit; more specifically, it is possible to obtain a focused visible light image in a compact soft-focus state by blending these two infrared light images.

On the other hand, it is possible to correct the focused image using the unfocused image by providing an image processing unit for processing the visible light image and infrared light image recorded by the recording unit prior to the corrective driving by the control unit. For example, the visible light image can be corrected using the infrared light image when the visible light image is in focus.

Similarly, it is possible to correct the focused image using the unfocused image by providing an image processing unit for processing the infrared light image and visible light image recorded by the recording unit after the corrective driving by the control unit. For example, the infrared light image can be corrected using the visible light image when the infrared light image is in focus.

Next, a fourth technical aspect disclosed in the present specification relates to an imaging sensor.

Photoelectric conversion means with various characteristics are constantly being proposed. Various imaging sensors for color images and various imaging sensors for infrared light images have been conventionally proposed.

However, there are many problems that require further research in relation to the imaging sensors in which the characteristics of photoelectric conversion means are efficiently used.

In view of the above, the fourth technical aspect disclosed in the present specification provides an imaging sensor that efficiently uses the characteristics of photoelectric conversion means.

More specifically, as an example of the fourth technical aspect in the present specification, there is provided an imaging sensor characterized in comprising a plurality of photoelectric conversion units arrayed in an orderly fashion, each having a quantum efficiency of 60% or higher in the visible light region; a first color filter provided to each member of a first group selected in an orderly fashion from the plurality of photoelectric conversion units; and a second color filter provided to each member of a second group selected in an orderly fashion from the plurality of photoelectric conversion units, the second color filter having a smaller light-transmitting surface area than the first color filter. This makes it possible to make use of high-sensitivity characteristics in the visible light region, and to provide an imaging sensor in which the characteristics for matching the visual sensitivity can be adjusted in pixel units by reducing a portion of the light-receiving surface area of the color filter.

In accordance with another specific aspect disclosed in the present specification, the imaging sensor has a third color filter provided to each member of a third group selected in an orderly fashion from the plurality of photoelectric conversion units, the third color filter having a smaller light-transmitting surface area than the first color filter. More specifically, the first, second, and third color filters are a green transparent color filter, a red transparent color filter, and a blue transparent color filter, respectively. In accordance with another specific aspect disclosed in the present specification, the plurality of photoelectric conversion units has a quantum efficiency of 60% or higher even in the infrared region, and have an infrared light transmitting filter provided to each infrared group selected in an orderly fashion from the plurality of photoelectric conversion units. Image data of both visible light and infrared light can thereby be obtained, and it is possible to provide an imaging sensor in which the visual light image is matched to visual sensitivity.

In accordance with another aspect disclosed in the present specification, there is provided an imaging sensor comprising a plurality of photoelectric conversion units arrayed in an orderly fashion, each having a quantum efficiency of 60% or higher in the visible light region and the infrared region; a first visible light transmitting color filter provided to each member of a first group selected in an orderly fashion from the plurality of photoelectric conversion units; an infrared light transmitting filter provided to each member of a second group selected in an orderly fashion from the plurality of photoelectric conversion units; and an interpolation unit for adding the data of the second photoelectric conversion units to the output from the photoelectric conversion units of the first group when the visible light data in positions that correspond to the photoelectric conversion units of the second group are interpolated. This makes it possible to efficiently use a portion of the plurality of photoelectric conversion units in the interpolation of the visible light data, even though the portion of the plurality of photoelectric conversion units is provided for acquiring an infrared image.

In accordance with a specific aspect disclosed in the present specification, the interpolation unit adds the data of the first photoelectric conversion units to the output from the photoelectric conversion units of the second group when the visible light data in positions that correspond to the photoelectric conversion units of the first group are interpolated. This makes it possible to efficiently use the output of the photoelectric conversion units for acquiring a visible light image in the interpolation of the infrared data.

In accordance with another aspect disclosed in the present specification, the imaging sensor comprises a plurality of photoelectric conversion units arrayed in an orderly fashion, each having a quantum efficiency of 60% or higher in the visible light region and in the infrared region; a green transmitting color filter provided to each member of a first group selected in an orderly fashion from the plurality of photoelectric conversion units; a red transmitting filter provided to each member of a second group selected in an orderly fashion from the plurality of photoelectric conversion units; a blue transmitting filter provided to each member of a third group selected in an orderly fashion from the plurality of photoelectric conversion units; and an infrared light transmitting filter provided to each member of a fourth group selected in an orderly fashion from the plurality of photoelectric conversion units so that the density is less than the second group. Sufficient visible light data can be acquired even though a portion of the photoelectric conversion units is provided for acquiring an infrared image.

In accordance with a specific aspect disclosed in the present specification, the interpolation unit for weighting and interpolating the output from the photoelectric conversion units of the fourth group when the infrared data in positions that corresponds to the photoelectric conversion units of the second group are interpolated. Therefore, interpolation that produces a smooth video is made possible even with a sparse arrangement of the photoelectric conversion units provided for acquiring an infrared image.

In accordance with another aspect disclosed in the present specification, there is provided an imaging sensor, characterized in comprising a plurality of photoelectric conversion units arrayed in an orderly fashion, each having a quantum efficiency of 60% or higher in the visible light region; a first color filter provided to each member of a first group selected in an orderly fashion from the plurality of photoelectric conversion units asymmetrically about some directions; and a second color filter provided to each member of a second group selected in an orderly fashion from the plurality of photoelectric conversion units asymmetrically about all directions. Therefore, a color filter having other optical characteristics can be arranged in the surplus portions of the asymmetrically arranged color filter. For example, it is possible to provide an imaging sensor capable of acquiring a visible light image and an infrared light image by further adding a third color filter provided to each member of a third group selected in an orderly fashion with asymmetry about all directions from the plurality of photoelectric conversion units; using the first, second, and third color filters as a green transparent color filter, a red transparent color filter, and a blue transparent color filter, respectively; and furthermore embedding an infrared color filter in the asymmetric portion of the arrangement of the green transparent color filter when the plurality of photoelectric conversion units has a quantum efficiency of 60% or higher in the infrared region.

In accordance with another aspect disclosed in the present specification, there is provided an imaging sensor, characterized in comprising a plurality of photoelectric conversion units arrayed in an orderly fashion, each having a quantum efficiency of 60% or higher in the visible light region; a first color filter provided to each member of a first group selected in an orderly fashion from the plurality of photoelectric conversion units; a second color filter provided to each member of a second group selected in an orderly fashion from the plurality of photoelectric conversion units; and an interpolation unit for weighting and interpolating the output from the photoelectric conversion units of the first group when the color data of the first color filter in positions that corresponds to the photoelectric conversion units of the second group are interpolated. Suitable interpolation can therefore be carried out even when the photoelectric conversion units of the first group are selected in an asymmetrical fashion.

In accordance with a specific aspect disclosed in the present specification, a third color filter is provided to each member of a third group selected in an orderly fashion from the plurality of photoelectric conversion units, and the interpolation unit weighs and interpolates the output from the photoelectric conversion units of the first group when the color data of the first color filter in positions that corresponds to the photoelectric conversion units of the third group are interpolated. Suitable interpolation of various pixels can therefore be carried out even when the photoelectric conversion units of the first group are selected in an asymmetrical fashion. In this case, advantageous examples of the first, second, and third color filters are a green transparent color filter, a red transparent color filter, and a blue transparent color filter.

Next, a fifth technical aspect disclosed in the present specification relates to an imaging sensor and effective use thereof.

Photoelectric conversion means with various characteristics are constantly being proposed. Various imaging sensors for color images and various imaging sensors for infrared light images have been conventionally proposed. There have also been proposed an endoscope and various other equipment for imaging, observation, and recording in which such imaging sensors are efficiently used.

However, the various characteristics being considered in photoelectric conversion sensors cannot be said to be sufficiently utilized, and there are many problems that require further research.

In view of the above, a fifth technical aspect, which is designed to allow the characteristics proposed for photoelectric conversion means to be appropriately used in imaging, observation, and recording equipment, is disclosed in the present specification.

More specifically, as an example of the fifth technical aspect in the present specification, there is provided an endoscope comprising a plurality of photoelectric conversion units arrayed in an orderly fashion, each having a quantum efficiency of 60% or higher in the visible light region and in the infrared region; a visible-light illuminating light source; an infrared illuminating light source; and a control unit for acquiring as visible-light image data an image obtained when the photoelectric conversion units have received light under illumination by a visible-light illuminating light source, and for acquiring as infrared-light image data obtained when the photoelectric conversion units have received light under illumination by an infrared illuminating light source. This makes it possible to acquire visible-light image data and infrared-light image data by switching the illuminating light source and using the same photoelectric conversion units.

In accordance with another aspect disclosed in the present specification, the endoscope comprises a plurality of photoelectric conversion units arrayed in an orderly fashion, each having a quantum efficiency of 60% or higher in the visible light region; three different monochromatic visible-light illuminating light sources; and a control unit for acquiring, as the image data for three different types of monochromatic visible light, images obtained by the photoelectric conversion units under illumination produced by the three different monochromatic visible-light illuminating light sources. This makes it possible to acquire the image data for three different types of monochromatic visible light by switching the illuminating light source and using the same photoelectric conversion units.

In accordance with specific aspects such as those described above, the control unit causes three different monochromatic visible-light illuminating light sources and an infrared illuminating light source, or three different monochromatic visible-light illuminating light sources to emit light in a cyclical time sharing fashion. In accordance with a more specific aspect, each time the image data of monochromatic visible light is acquired under a single new light emission of the three monochromatic visible-light illuminating light sources, the control unit provides a color image data obtained by combining the newly received data with the image data of monochromatic visible light already acquired under illumination by the other two monochromatic visible-light illuminating light sources. This makes it possible to obtain smooth video data.

In accordance with another specific aspect disclosed in the present specification, the control unit changes the manner in which a color image as a combination of image data for three types of monochromatic visible light is handled in the case that an infrared illuminating light source is used, and different handling patterns are used in the case in which the light emission timing for an infrared illuminating light source is included in the light emission timing of the three different monochromatic visible-light illuminating light sources for acquiring the image data for three types of monochromatic visible light, and the case in which the light emission timing for an infrared illuminating light source is not included. Therefore, the handling of a color image can be suitably varied by using an arrangement in which an interpolated image has the image data for three types of monochromatic visible light arranged in unequal intervals, an arrangement in which the main image has image data arranged in equal intervals, and the like.

In accordance with another aspect disclosed in the present specification, when photoelectric conversion units receive the light of an image under the illumination of one among the visible-light illuminating light source and the infrared illuminating light source, an endoscope is provided for processing images formed by the photoelectric conversion units under illumination of the other light source. This makes it possible to acquire visible-light image data and infrared-light image data with proximate timing. A specific example of the processing is AD conversion, and another specific example is data transmission. Either of these examples requires a relatively large amount of time and can be carried out in concurrent fashion to the receiving of light by the photoelectric conversion units, whereby visible-light image data and infrared-light image data can be efficiently acquired with proximate timing.

In accordance with another aspect disclosed in the present specification, there is provided an endoscope comprising a capsule unit having a plurality of photoelectric conversion units arrayed in an orderly fashion, an illuminating light source, a control unit for acquiring as raw data an image obtained when the photoelectric conversion units receive light under illumination by the illuminating light source, and a wireless transmission unit for transmitting the raw data; as well as an external monitor unit having a wireless receiving unit for receiving the raw data from the wireless transmission unit, an image processing unit for processing the raw data thus received, and a display unit for displaying images processed by the image processing unit. A color image can thereby be produced outside the body, for example, and the load on the capsule configuration swallowed inside the body can be reduced.

Next, a sixth technical aspect disclosed in the present specification relates to an imaging sensor and effective use thereof.

Photoelectric conversion means with various characteristics are constantly being proposed. Various imaging sensors for color images and various imaging sensors for infrared light images have been conventionally proposed. There have also been proposed an endoscope and various other equipment for imaging, observation, and recording in which such imaging sensors are efficiently used.

However, the various characteristics being considered in photoelectric conversion sensors cannot be said to be sufficiently utilized, and there are many problems that require further research.

In view of the above, the present specification discloses the sixth technical aspect, which is designed to allow the characteristics proposed for photoelectric conversion means to be appropriately used in imaging, observation, and recording equipment.

More specifically, as an example of the sixth technical aspect in the present specification, there is provided an endoscope comprising a plurality of photoelectric conversion units arrayed in an orderly fashion, each having a quantum efficiency of 60% or higher in the visible light region and in the infrared region; an imaging lens for forming an image of the photographic object on the photoelectric conversion units; a visible-light illuminating light source having three monochromatic visible-light illuminating light sources arranged in pairs or greater about the optical axis of the imaging lens; and an infrared illuminating light source arranged in pairs or greater about the optical axis of the imaging lens. This makes it possible to form an image of visible light and infrared light in which the characteristics of photoelectric conversion units are efficiently used. In accordance with a specific aspect of the present invention, the image information of each color is obtained by causing three different monochromatic visible-light illuminating light sources and an infrared illuminating light source to emit light in a cyclical time sharing fashion.

In accordance with another specific aspect disclosed in the present specification, the visible-light illuminating light source and the infrared illuminating light source are arranged about the optical axis of the imaging lens so as to have a two or more line symmetry axes. Therefore, each light source is arranged in line symmetry with two or more axial lines about the optical axis, and good symmetry of illumination about the optical axis is maintained for each color. In accordance with another specific aspect of the present invention, three monochromatic visible-light illuminating light sources are arranged as a group so as to remain undivided by the infrared illuminating light source. The illuminating light sources of the visible light region are thereby arranged in close proximity, and it is possible to reduce the color nonuniformity of illumination shading caused when the illuminating light sources of different colors are in a displaced arrangement.

In accordance with another specific aspect disclosed in the present specification, the three different monochromatic visible-light illuminating light sources have a plurality of green illuminating light sources, and fewer but mutually equal numbers of red illuminating light sources and blue illuminating light sources. The green luminous energy is therefore greater in relative terms, and a color image that matches visual sensitivity can be obtained. In accordance with another specific aspect disclosed in the present specification, the visible-light illuminating light sources and the infrared illuminating light source are arranged about the optical axis of the imaging lens in rotational symmetry. Therefore, the arrangement of the colors about the optical axis is rotationally symmetric, and it is possible to reduce nonuniformity of illumination shading along the rotational direction.

In accordance with another aspect disclosed in the present specification, there is provided an endoscope comprising a plurality of photoelectric conversion units arrayed in an orderly fashion, each having a quantum efficiency of 60% or higher in the visible light region and in the infrared region; an imaging lens for forming an image of a photographic object on the photoelectric conversion units; a visible-light illuminating light source; an infrared illuminating light source; and a control unit for adjusting the angle of view of the imaging lens in accordance with the difference between the positions in which an image is formed by the visible-light illuminating light source and the infrared illuminating light source. This makes it possible to accommodate differences in the image formation positions due to the wavelength.

In accordance with another aspect disclosed in the present specification, there is provided an endoscope comprising a plurality of photoelectric conversion units arrayed in an orderly fashion, each having a quantum efficiency of 60% or higher in the visible light region and in the infrared region; an imaging lens for forming an image of a photographic object on the photoelectric conversion units; a visible-light illuminating light source; an infrared illuminating light source; and a control unit for adjusting the focal position of the imaging lens in accordance with the difference between the positions in which an image is formed by the visible-light illuminating light sources and the infrared illuminating light source. This makes it possible to accommodate differences in the image formation positions due to the wavelength. It is also possible to use a configuration in which the focal position is adjusted and the angle of view described above is adjusted.

More specifically, adjustments such as those described above are adjustments of the imaging lens between a state having a substantially adequate difference between the positions in which an image is formed by the visible-light illuminating light sources and the infrared illuminating light source, and a state having adequate positions in which an image is formed by the visible-light illuminating light sources or the infrared illuminating light source. This makes it possible to simultaneously acquire a visible light image and an infrared light image, or to acquire a visible light image or an infrared light image with a higher degree of image quality.

INDUSTRIAL APPLICABILITY

The present invention is art that can be used in a camera capable of live viewing, an autofocus camera, or an endoscope or the like capable of observing, recording, diagnosing, and otherwise processing images in a body.

LIST OF REFERENCE SIGNS 12, 14 Optical finders
54, 114 Imaging sensors
12a Optical splitting means
32 Display unit
20 Recording imaging unit
58 Infrared cut-off filter
60 Visible light cut-off filter
26, 28 Recording means
106 Optical path switching means
110 Infrared cut-off filter
112 Visible light cut-off filter
20 Imaging unit
70 Sensor
24 Control unit
68 Infrared cut-off filter
76 Visible light cut-off filter
66 Dimming means
72 Usage means
72 Photometric means
70, 72 Estimation means
68, 70 Visible light sensors
54, 60, 70, 76 Infrared sensors
6 Lens optical system
102 Imaging unit
34 Focal point detection unit
116 Control unit
70 Sensor
68 Infrared light cut-off filter
76 Visible light cut-off filter
26 Recording unit
116 Image processing unit
408, 410 Photoelectric conversion units
G22 First color filter
R21 Second color filter
B12 Third color filter
IR11 Infrared light transmitting filter
116 Interpolation unit
G22 Green transparent filter
R21 Red transparent filter
B12 Blue transparent filter
R11 Fourth group selected so the density is reduced
G22, G31, G42 First groups selected with asymmetry in some directions
R23 Second group selected with symmetry in all directions
B32 Third group selected with symmetry in all directions
IR11 Infrared light group selected with symmetry in all directions
510 Photoelectric conversion units
508 Imaging unit
514, 562, 566 Visible-light illuminating light sources
516 Infrared illuminating light source
520 Control unit
540 Control unit
528, 530 Wireless transmitting units
502 Capsule unit
534, 536 Wireless receiving units
544 Image processing unit
548 Display unit

The invention claimed is:
1. A camera comprising:
a lens optical system; and
an imaging unit for receiving light from said lens optical system, said imaging unit having a wide sensitivity range from the visible light region to infrared light region,
wherein said imaging unit comprises:
a plurality of photoelectric conversion units arrayed in an orderly fashion;
a first visible light transmitting color filter provided to each member of a first group selected in an orderly fashion from said plurality of photoelectric conversion units;
an infrared light transmitting filter provided to each member of a second group selected in an orderly fashion from said plurality of photoelectric conversion units; and
an interpolation unit for adding the data of said second photoelectric conversion units to the output from the photoelectric conversion units of said first group when the visible light data in positions that correspond to the photoelectric conversion units of said second group are interpolated.

2. The camera according to claim 1 further comprising:
a focal position detection unit for detecting the position of said lens optical system adapted to form a visible light image on said imaging unit when said imaging unit forms an image in the visible light region, and for detecting the position of said lens optical system adapted to form an infrared light image on said imaging unit when said imaging unit forms an image in the infrared light region; and
a control unit for switching, in a coordinated manner, the functions of said imaging unit and the functions of said focal position detection unit between forming a visible light image and forming an infrared light image.

3. The camera according to claim 1, wherein each of plurality of photoelectric conversion units has a quantum efficiency of 60% or higher in the visible light region and in the infrared light region.

4. A camera comprising:
a lens optical system; and
an imaging unit for receiving light from said lens optical system, said imaging unit having a wide sensitivity range from the visible light region to infrared light region,
wherein said imaging unit comprises:
a plurality of photoelectric conversion units arrayed in an orderly fashion;
a green transmitting color filter provided to each member of a first group selected in an orderly fashion from said plurality of photoelectric conversion units;
a red transmitting filter provided to each member of a second group selected in an orderly fashion from said plurality of photoelectric conversion units;
a blue transmitting filter provided to each member of a third group selected in an orderly fashion from said plurality of photoelectric conversion units; and
an infrared light transmitting filter provided to each member of a fourth group selected in an orderly fashion from said plurality of photoelectric conversion units so that the density is less than said second group.

5. The camera according to claim 4 further comprising:
a focal position detection unit for detecting the position of said lens optical system adapted to form a visible light image on said imaging unit when said imaging unit forms an image in the visible light region, and for detecting the position of said lens optical system adapted to form an infrared light image on said imaging unit when said imaging unit forms an image in the infrared light region; and a control unit for switching, in a coordinated manner, the functions of said imaging unit and the functions of said focal position detection unit between forming a visible light image and forming an infrared light image.

6. The camera according to claim 4, wherein each of plurality of photoelectric conversion units has a quantum efficiency of 60% or higher in the visible light region and in the infrared light region.

7. A camera comprising:
a lens optical system; and
an imaging unit for receiving light from said lens optical system, said imaging unit having a wide sensitivity range from the visible light region to infrared light region,
wherein said imaging unit comprises:
a plurality of photoelectric conversion units arrayed in an orderly fashion;
a first color filter provided to each member of a first group selected in an orderly fashion from said plurality of photoelectric conversion units asymmetrically about some directions; and
a second color filter provided to each member of a second group selected in an orderly fashion units from said plurality of photoelectric conversion symmetrically about all directions.

8. The camera according to claim 7 further comprising:
a focal position detection unit for detecting the position of said lens optical system adapted to form a visible light image on said imaging unit when said imaging unit forms an image in the visible light region, and for detecting the position of said lens optical system adapted to form an infrared light image on said imaging unit when said imaging unit forms an image in the infrared light region; and
a control unit for switching, in a coordinated manner, the functions of said imaging unit and the functions of said focal position detection unit between forming a visible light image and forming an infrared light image.

9. The camera according to claim 7, wherein each of plurality of photoelectric conversion units has a quantum efficiency of 60% or higher in the visible light region.

10. A camera comprising:
a lens optical system; and
an imaging unit for receiving light from said lens optical system, said imaging unit having a wide sensitivity range from the visible light region to infrared light region,
wherein said imaging unit comprises:
a plurality of photoelectric conversion units arrayed in an orderly fashion;
a first color filter provided to each member of a first group selected in an orderly fashion from said plurality of photoelectric conversion units;
a second color filter provided to each member of a second group selected in an orderly fashion from said plurality of photoelectric conversion units; and
an interpolation unit for weighting and interpolating the output from the photoelectric conversion units of said first group when the color data of the first color filter in positions that correspond to the photoelectric conversion units of said second group are interpolated.

11. The camera according to claim 10 further comprising:
a focal position detection unit for detecting the position of said lens optical system adapted to form a visible light image on said imaging unit when said imaging unit forms an image in the visible light region, and for detecting the position of said lens optical system adapted to form an infrared light image on said imaging unit when said imaging unit forms an image in the infrared light region; and
a control unit for switching, in a coordinated manner, the functions of said imaging unit and the functions of said focal position detection unit between forming a visible light image and forming an infrared light image.

12. The camera according to claim 10, wherein each of plurality of photoelectric conversion units has a quantum efficiency of 60% or higher in the visible light region.

13. An imaging unit for a camera having a lens optical system for receiving light from the lens optical system and having a wide sensitivity range from the visible light region to infrared light region, comprising:
a plurality of photoelectric conversion units arrayed in an orderly fashion;
a first visible light transmitting color filter provided to each member of a first group selected in an orderly fashion from said plurality of photoelectric conversion units;
an infrared light transmitting filter provided to each member of a second group selected in an orderly fashion from said plurality of photoelectric conversion units; and
an interpolation unit for adding the data of said second photoelectric conversion units to the output from the photoelectric conversion units of said first group when the visible light data in positions that correspond to the photoelectric conversion units of said second group are interpolated.

14. An imaging unit for a camera having a lens optical system for receiving light from the lens optical system and having a wide sensitivity range from the visible light region to infrared light region, comprising:
a plurality of photoelectric conversion units arrayed in an orderly fashion;
a green transmitting color filter provided to each member of a first group selected in an orderly fashion from said plurality of photoelectric conversion units;
a red transmitting filter provided to each member of a second group selected in an orderly fashion from said plurality of photoelectric conversion units;
a blue transmitting filter provided to each member of a third group selected in an orderly fashion from said plurality of photoelectric conversion units; and
an infrared light transmitting filter provided to each member of a fourth group selected in an orderly fashion from said plurality of photoelectric conversion units so that the density is less than said second group.

15. An imaging unit for a camera having a lens optical system for receiving light from the lens optical system and having a wide sensitivity range from the visible light region to infrared light region, comprising:
a plurality of photoelectric conversion units arrayed in an orderly fashion;
a first color filter provided to each member of a first group selected in an orderly fashion from said plurality of photoelectric conversion units asymmetrically about some directions; and
a second color filter provided to each member of a second group selected in an orderly fashion units from said plurality of photoelectric conversion symmetrically about all directions.

16. An imaging unit for a camera having a lens optical system for receiving light from the lens optical system and having a wide sensitivity range from the visible light region to infrared light region, comprising:
a plurality of photoelectric conversion units arrayed in an orderly fashion;

a first color filter provided to each member of a first group selected in an orderly fashion from said plurality of photoelectric conversion units;

a second color filter provided to each member of a second group selected in an orderly fashion from said plurality of photoelectric conversion units; and an interpolation unit for weighting and interpolating the output from the photoelectric conversion units of said first group when the color data of the first color filter in positions that correspond to the photoelectric conversion units of said second group are interpolated.

* * * * *